(12) United States Patent
Washisu

(10) Patent No.: US 6,272,289 B1
(45) Date of Patent: Aug. 7, 2001

(54) CAMERA

(75) Inventor: Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/393,292

(22) Filed: Sep. 10, 1999

(30) Foreign Application Priority Data

| Sep. 14, 1998 | (JP) | ................................................ 10-276419 |
| Sep. 14, 1998 | (JP) | ................................................ 10-276420 |
| Sep. 14, 1998 | (JP) | ................................................ 10-276421 |

(51) Int. Cl.$^7$ .............................. G03B 15/05; G03B 17/00
(52) U.S. Cl. ................................ 396/55; 396/61; 396/63; 396/67; 396/165; 396/169
(58) Field of Search ................................ 396/61, 63, 65, 396/67, 69, 52, 55, 169, 165

(56) References Cited

U.S. PATENT DOCUMENTS

| 4,869,108 | 9/1989 | Washisu | 73/517 |
| 4,965,619 | 10/1990 | Shikaumi et al. | 354/410 |
| 5,020,369 | 6/1991 | Washisu et al. | 73/517 |
| 5,402,202 | 3/1995 | Washisu et al. | 354/435 |
| 5,608,703 | 3/1997 | Washisu | 369/55 |
| 5,774,266 | 6/1998 | Otani et al. | 359/554 |
| 5,835,799 | 11/1998 | Washisu | 396/55 |
| 5,848,300 | * 12/1998 | Imura | 396/55 |
| 5,940,630 | 8/1999 | Washisu | 396/55 |
| 5,974,269 | 10/1999 | Sato et al. | 396/55 |

* cited by examiner

Primary Examiner—W. B. Perkey
(74) Attorney, Agent, or Firm—Fitzpatrick, Cella, Harper and Scinto

(57) ABSTRACT

A camera using an image blur prevention device including exposure time calculating apparatus which calculates a first exposure time from at least photometry data, sensitivity data of a recording medium and brightness of a photographic lens, a strobe lighting designating apparatus to forcibly light a strobe when the first exposure time calculated by the exposure time calculating apparatus is longer than a predetermined value, shutter closing time setting apparatus which forcibly fixes the first exposure time calculated by the exposure time calculating apparatus at a predetermined exposure closing time Tb or Td regardless of a calculated result of the exposure time calculating means when the first exposure time is longer than the second exposure time and changing apparatus which changes a combination of the first exposure time and the second exposure time dependently on whether or not the image blur prevention device is to be used for photographing, whereby the camera is capable of taking a photograph on which not only a main object but also a background is exposed adequately by making most of the image blur prevention device.

11 Claims, 33 Drawing Sheets

FIG. 3

| EXAMPLES OF CONTROLLED PHOTOGRAPHING CONDITION | BLUR PREVENTION DEVICE ON | | BLUR PREVENTION DEVICE OFF | |
|---|---|---|---|---|
| | STROBE LIGHTING START TIME IS Tc | SHUTTER CLOSING TIME IS Td | STROBE LIGHTING START TIME IS Ta | SHUTTER CLOSING TIME IS Tb |
| CONDITION (1): STROBE LIGHTING START TIME IN CASE THAT BLUR PREVENTION DEVICE ON IS SET THE SAME TIME IN CASE THAT BLUR PREVENTION DEVICE OFF | 1/60 | 1/4 | 1/60 | 1/60 |
| CONDITION (2): STROBE LIGHTING START TIME IN CASE THAT BLUR PREVENTION DEVICE ON IS SET DIFFERENT FROM TIME IN CASE THAT BLUR PREVENTION DEVICE OFF, AND IN CASE THAT BLUR PREVENTION DEVICE ON, STROBE LIGHTING START TIME IS SET DIFFERENT FROM SHUTTER CLOSING TIME | 1/30 | 1/4 | 1/60 | 1/60 |

FIG. 6

| EXAMPLES OF CONTROLLED PHOTOGRAPHING CONDITION | DISTANCE FROM CAMERA TO OBJECT | BLUR PREVENTION DEVICE ON | | BLUR PREVENTION DEVICE OFF | |
|---|---|---|---|---|---|
| | | STROBE LIGHTING START TIME | SHUTTER CLOSING TIME | STROBE LIGHTING START TIME | SHUTTER CLOSING TIME |
| CONDITION (1): IF OBJECT IS IN STROBE LIGHT REACHABLE AREA, PHOTOGRAPHING CONDITION IS NOT DIFFERENT BETWEEN IN CASE THAT BLUR PREVENTION DEVICE ON AND IN CASE THAT BLUR PREVENTION DEVICE OFF | STROBE LIGHT REACHABLE AREA | 1/100 (Tg) | 1/100 (Th) | 1/100 (Te) | 1/100 (Tf) |
| | STROBE LIGHT UNREACHABLE AREA | 1/30 (Tc) | 1/4 (Td) | 1/30 (Ta) | 1/30 (Tb) |
| CONDITION (2): REGARDLESS THAT OBJECT IS IN STROBE LIGHT REACHABLE AREA, IF BLUR PREVENTION DEVICE ON, SHUTTER CLOSING TIME IS SET LONGER THAN STROBE LIGHTING START TIME | STROBE LIGHT REACHABLE AREA | 1/100 (Tg) | 1/15 (Th) | 1/100 (Te) | 1/100 (Tf) |
| | STROBE LIGHT UNREACHABLE AREA | 1/30 (Tc) | 1/4 (Td) | 1/30 (Ta) | 1/30 (Tb) |

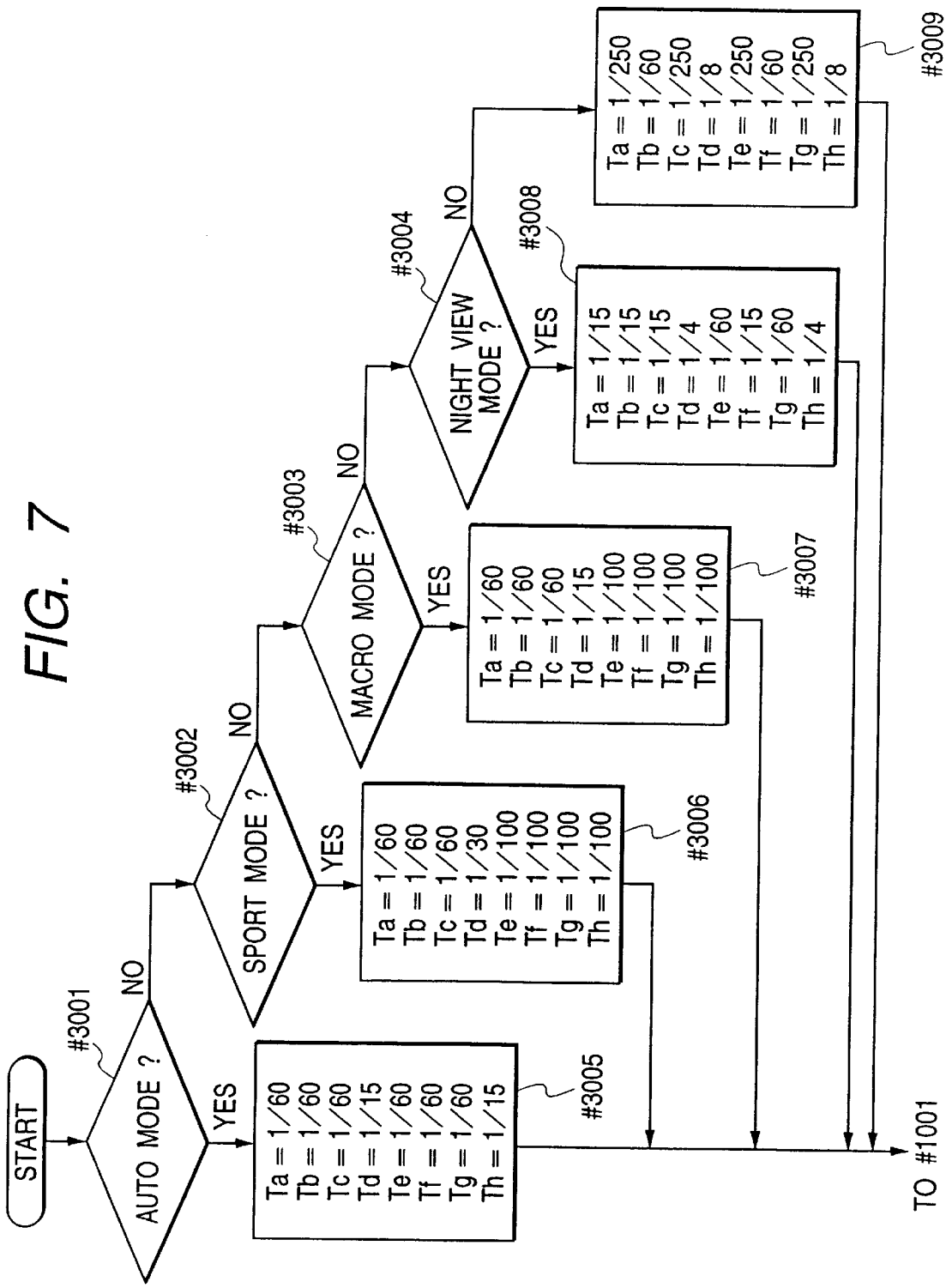

FIG. 8

| EXAMPLES OF CONTROLLED PHOTOGRAPHING CONDITION | DISTANCE FROM CAMERA TO OBJECT | BLUR PREVENTION DEVICE ON | | BLUR PREVENTION DEVICE OFF | |
|---|---|---|---|---|---|
| | | STROBE LIGHTING START TIME | SHUTTER CLOSING TIME | STROBE LIGHTING START TIME | SHUTTER CLOSING TIME |
| AUTO MODE | STROBE LIGHT REACHABLE AREA | 1/60 | 1/15 | 1/60 | 1/60 |
| | STROBE LIGHT UNREACHABLE AREA | 1/60 | 1/15 | 1/60 | 1/60 |
| SPORT MODE | STROBE LIGHT REACHABLE AREA | 1/100 | 1/100 | 1/100 | 1/100 |
| | STROBE LIGHT UNREACHABLE AREA | 1/60 | 1/30 | 1/60 | 1/60 |
| MACRO MODE | STROBE LIGHT REACHABLE AREA | 1/100 | 1/100 | 1/100 | 1/100 |
| | STROBE LIGHT UNREACHABLE AREA | 1/60 | 1/15 | 1/60 | 1/60 |
| NIGHT VIEW MODE | STROBE LIGHT REACHABLE AREA | 1/60 | 1/4 | 1/60 | 1/15 |
| | STROBE LIGHT UNREACHABLE AREA | 1/15 | 1/4 | 1/15 | 1/15 |
| PORTRAIT MODE | STROBE LIGHT REACHABLE AREA | 1/250 | 1/8 | 1/250 | 1/60 |
| | STROBE LIGHT UNREACHABLE AREA | 1/250 | 1/8 | 1/250 | 1/60 |

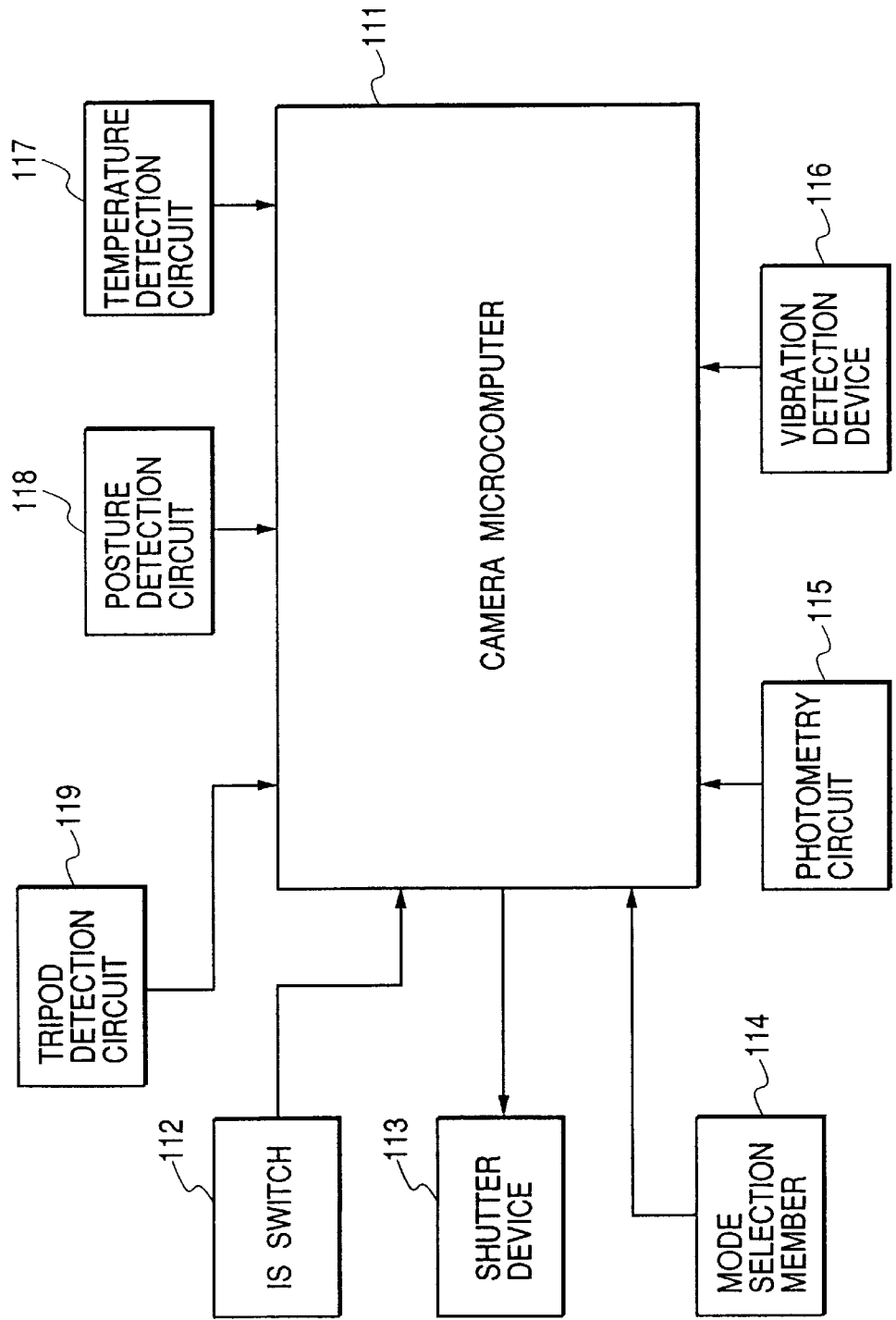

FIG. 12

| PHOTOGRAPHING CONDITION | SHUTTER CLOSING TIME IN CASE THAT BLUR PREVENTION DEVICE ON | | SHUTTER CLOSING TIME IN CASE THAT BLUR PREVENTION DEVICE OFF | |
|---|---|---|---|---|
| | NIGHT VIEW MODE | EXCEPT FOR NIGHT VIEW MODE | NIGHT VIEW MODE | EXCEPT FOR NIGHT VIEW MODE |
| WITH TRIPOD | 2 | 1/15 | 2 | 1/60 |
| HAND VIBRATION IS SMALLER THAN PREDETERMINED VALUE | 2 | 1/15 | 2 | 1/60 |
| CAMERA IS SET IN VERTICAL POSTURE | 1/8 | 1/15 | 2 | 1/60 |
| CIRCUMSTANCE TEMPERATURE IS LOW | 1/8 | 1/15 | 2 | 1/60 |
| CONDITION EXCEPT FOR ABOVE | 1/4 | 1/15 | 2 | 1/60 |

FIG. 14

| PHOTOGRAPHING MODE | | SHUTTER CLOSING TIME | |
|---|---|---|---|
| | | BLUR PREVENTION DEVICE ON | BLUR PREVENTION DEVICE OFF |
| NIGHT VIEW MODE | HAND HELD NIGHT VIEW MODE | 1/4 | 1/15 |
| | TRIPOD NIGHT VIEW MODE | 2 | 2 |
| MODE EXCEPT FOR NIGHT VIEW MODE | | 1/15 | 1/60 |

FIG. 25

| MODE | WHETHER STROBE LIGHT REACH TO OBJECT | BLUR PREVENTION DEVICE ON | | | | BLUR PREVENTION DEVICE OFF | | | |
|---|---|---|---|---|---|---|---|---|---|
| | | WIDE | | TELE | | WIDE | | TELE | |
| | | STROBE LIGHTING START TIME Tb | SHUTTER CLOSING TIME Tc | STROBE LIGHTING START TIME Tb | SHUTTER CLOSING TIME Tc | STROBE LIGHTING START TIME Tb | SHUTTER CLOSING TIME Tc | STROBE LIGHTING START TIME Tb | SHUTTER CLOSING TIME Tc |
| SPORT MODE | REACHABLE | 1/60 | 1/60 | 1/125 | 1/125 | 1/60 | 1/60 | 1/250 | 1/250 |
| | UNREACHABLE | OFF | 1/15 | OFF | 1/60 | 1/60 | 1/60 | 1/250 | 1/250 |
| PORTRAIT MODE | REACHABLE | ON | 1/30 | ON | 1/60 | ON | 1/45 | ON | 1/250 |
| | UNREACHABLE | ON | 1/15 | ON | 1/30 | ON | 1/45 | ON | 1/250 |
| MACRO MODE | REACHABLE | 1/125 | 1/125 | 1/125 | 1/125 | 1/125 | 1/125 | 1/250 | 1/250 |
| | UNREACHABLE | OFF | 1/15 | OFF | 1/60 | 1/125 | 1/125 | 1/250 | 1/250 |
| NIGHT VIEW MODE IN CASE THAT VIBRATION IS SMALLER THAN PREDETERMINED VALUE | REACHABLE | 1/45 | 2 | 1/45 | 2 | 1/45 | 2 | 1/250 | 2 |
| | UNREACHABLE | OFF | 2 | OFF | 2 | 1/45 | 2 | 1/250 | 2 |
| NIGHT VIEW MODE IN CASE THAT VIBRATION IS NOT SMALLER THAN PREDETERMINED VALUE | REACHABLE | 1/45 | 1/2 | 1/45 | 1/8 | 1/45 | 2 | 1/250 | 2 |
| | UNREACHABLE | OFF | 1/2 | OFF | 1/8 | 1/45 | 2 | 1/250 | 2 |
| AUTO MODE | REACHABLE | 1/15 | 1/15 | 1/60 | 1/60 | 1/45 | 1/45 | 1/250 | 1/250 |
| | UNREACHABLE | 1/15 | 1/15 | 1/60 | 1/60 | 1/45 | 1/45 | 1/250 | 1/250 |

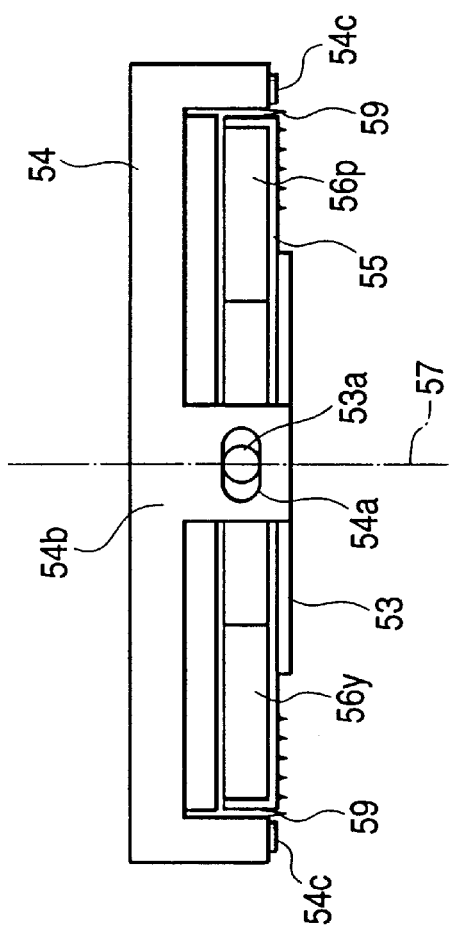
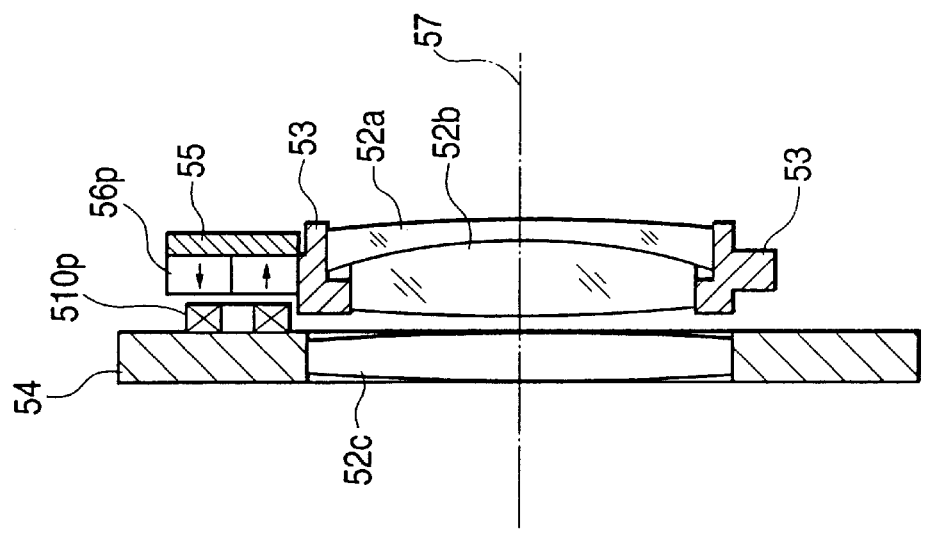
FIG. 32A
FIG. 32B

CAMERA

BACKGROUND OF THE INVENTION

1. Field of the Invention

The present invention relates to a camera which uses an image blur prevention apparatus such as an image blur correction apparatus.

2. Related Background Art

Cameras are currently automated in all important photographing operations such an exposure determining operation and a focusing operation, thereby allowing even unskilled persons to make photographing errors at remarkably low possibilities.

In the recent years where researches have been made for systems which prevent hand vibrations from being applied to cameras, there remains few causes to induce photographers to erroneous photographing.

Brief description will be made of the system which prevents the hand vibration from being applied to a camera.

The hand vibration which is caused at a photographing time usually has a frequency of 1 Hz to 10 Hz, and a basic concept for enabling to obtain a photograph free from image blur regardless of the hand vibration lies in detecting a camera vibration caused by the hand vibration and displacing a correction lens in accordance with a detected value of the camera vibration. In order to obtain the photograph free from the image blur regardless of the hand vibration, it is therefore necessary first to accurately detect the camera vibration and secondly to correct a variation of an optical axis caused by the hand vibration.

The vibration (camera vibration) can be detected in principle with a camera equipped with a vibration detection apparatus comprising a vibration sensor which detects an acceleration, an angular acceleration, an angular velocity and an angular displacement, and a calculation device which adequately calculates outputs of the vibration sensor in order to correct the camera vibration. The image blur is suppressed by driving correction means which makes a photographing optical axis eccentric on the basis of detection data.

FIG. 28 is a perspective view showing an appearance of a compact camera having a vibration prevention system which has functions to correct a vertical vibration indicated by an arrow 42p and a horizontal vibration indicated by an arrow 42y relative to an optical axis 41.

A camera body 43 comprises a release button 43a, a mode dial (including a main switch) 43b, a retractable strobe 43c and a finder window 43d.

An internal configuration of the camera shown in FIG. 28 is illustrated in FIG. 29, wherein a reference numeral 44 denotes a camera body, a reference numeral 51 denotes correction means, a reference numeral 52 denotes a correction lens, a reference numeral 53 denotes a support frame which corrects the vibrations in directions indicated by the arrows 42p and 42y shown in FIG. 28 by freely driving the correction lens 52 in directions indicated by arrows 58p and 58y in FIG. 29 and will be described later in detail. Reference numerals 45p and 45y denote vibration detection devices such as an accelerometer and an angular velocity sensor which detect vibrations around arrows 46p and 46y respectively.

Outputs from the vibration detection devices 45p and 45y are converted by calculation devices 47p and 47y described later into driving target values for the correction means 51 and input into a coil of the correction means 51 for correcting the vibrations. In addition, a reference numeral 54 denotes a base plate, reference numeral 56p and 56y denote permanent magnets, and reference numeral 510p and 510y denote coils.

FIG. 30 is a block diagram illustrating in detail a configuration of the above described calculation device 47p and 47y, which are similarly configurated, therefore explanation will be made by using only the calculation device 47p.

The calculation device 47p comprises a DC cut filter 48p, a low pass filter 49p, and analog/digital converter circuit (hereinafter referred to as an A/D converter) 410p and a driving device 419p which are enclosed by a chain line, and a camera microcomputer 411 which is enclosed by a dashed line. The camera microcomputer 411 comprises a memory circuit 412p, a differential circuit 413p, a DC cut filter 414p, an integral circuit 415p, a memory circuit 416p, a differential circuit 417p and a PWM duty changing circuit 418p.

A vibrating gyroscope which detects a vibration angular velocity of the camera is used as the vibration detection device 45p, and the vibrating gyroscope is driven when a camera main switch is turned on and starts detecting the vibration angular velocity applied to the camera.

The DC cut off filter 48p configured by an analog circuit cuts off DC bias components which are overlapped with an output signal from the vibration detection device 45p. The DC cut filter 48p is configured by having a characteristic to cut off signal components having frequencies not higher than 0.1 Hz so that these components do not influence on the hand vibration having the frequencies from 1 to 10 Hz applied to the camera. However, the characteristic which cuts off the signal components having frequencies not higher than 0.1 Hz poses a problem that it requires about 10 seconds to cut off the DC components completely after a vibration signal is inputted from the vibration detection device 45p. Accordingly, a time constant of the DC cut filter 48p is shortened (to obtain a characteristic to cut off signal components having frequencies, for example, not higher than 10 Hz) for 0.1 second, for example, after the camera main switch is turned on so that the DC components are cut off in a short time of about 0.1 second and then the time constant is prolonged (to obtain a characteristic to cut off signal components having frequencies not higher than 0.1 Hz) so that a vibration angular velocity signal is not degraded by the DC cut filter 48p.

The low pass filter 49p which is configured by an analog circuit amplifies an output signal from the DC cut filter 48p adequately in accordance with resolution of the A/D converter circuit 410p and cuts off high-frequency noise overlapped with the vibration angle velocity signal from the output signal from the DC cut filter 48p. The noise is cut off from the vibration angular velocity signal so that it will not cause the A/D converter circuit 410p to erroneously sample or read at a step to input the vibration angular velocity signal into the camera microcomputer 411. Furthermore, an output signal from the low pass filter 49p is sampled by the A/D converter circuit 410p and input into the camera microcomputer 411.

Though the DC bias components have been cut off by the DC cut filter 48p, subsequent amplification with the low pass filter 49p allows DC bias components to be overlapped with the vibration angular velocity signal and the DC components must be cut off once again in the camera microcomputer 411.

The memory circuit 412p stores a vibration angular velocity signal which is sampled after 0.2 second, for example, elapses from turning on the camera main switch, and the differential circuit 413p calculates a difference between a stored value and the vibration angular velocity signal so that the DC components are cut off. The DC components can be cut off only roughly by these operations (since not only the DC components but also actual hand vibrations are contained in the vibration angular velocity signal stored after 0.2 second elapses from turning on the camera main switch) and the DC components are cut off sufficiently at a later step with the DC cut filter 414p which is configured by a digital filter. A time constant of this DC cut filter 414p can also be changed in like manner of the analog DC cut filter 48p and gradually prolonged for 0.2 second as measured after 0.2 second elapses from the camera main switch is turned on. Speaking concretely, the DC cut filter 414p has a characteristic as to cut off DC signal components having frequencies not higher than 10 Hz after 0.2 second elapses from turning on the main switch, and then lower the cut off frequency to 5 Hz, 1 Hz, 0.5 Hz and 0.2 Hz at intervals of 50 msec.

However, it may not be desirable to change the time constant while consuming time since a photographer may half depresses the camera main switch (turns on sw1) while the time constant is being changed, whereby the camera may take a photograph upon completing photometry and a distance measurement. In such a case, the camera intercepts the changing of the time constant dependently on photographing conditions. When the photometry indicates a photographing shutter speed of 1/60 at a photographing focal length of 150 mm at which blur prevention may not be so accurate, for example, the camera terminates the changing of the time constant upon obtaining a characteristic to cut off the DC components having frequencies not higher than 0.5 Hz with the DC cut filter 414p (controls the changing of the time constant dependently on a product of the shutter speed multiplied by a photographing focal length). Therefore, the camera is capable of shortening the time required for changing the time constant, thereby making a shutter chance preferential. At a faster shutter speed or a shorter focal length, the camera terminates the changing of the time constant needless to say when the time constant is changed to obtain a characteristic to cut off the DC components having frequencies not higher than 1 Hz with the DC cut filter 414p or at a slower shutter speed or a longer focal length, the camera inhibits photographing until the time constant is changed to the final level.

The integral circuit 415p starts integrating output signals from the DC cut filter 414p when the release button 43a is half depressed (sw1 is turned on), thereby converting an angular velocity signal into an angle signal. When changing of the time constant of the DC cut filter is not completed as described above, however, the integral circuit 415p does not integrate the output signals until the changing of the time constant completes. Though not shown in FIG. 30, the integrated angle signal is adequately amplified dependently on data of a focal length and an object distance at that time, and converted so as to drive correction means 51 in an adequate amount corresponding to a vibration angle. (This correction is required since the photographing optical system is varied and an eccentricity of the optical axis is changed dependently on a driven amount of the correction means 51.)

Upon completely depressing the release button 43a (turning on sw2), the driving of the correction means 51 is started in correspondence to a vibration angle signal but care must be taken to prevent the correction means 51 from abruptly starting a vibration preventive operation. The memory circuit 416p and the differential circuit 417p are provided to prevent the correction means 51 from abruptly starting the vibration preventive operation. When the release button 43a is depressed completely (sw2 is turned on), the memory circuit 416p stores the vibration angle signal from the integral circuit 415p. The differential circuit 417p calculates a difference between the signal from the integral circuit 415p and a signal from the memory circuit 416p. Accordingly, the differential circuit 417p receives two signals which are equal to each other and provides a driving target value signal of 0 to the correction means 51 at a step where the switch SW2 is turned on, thereafter outputting signals successively increasing from 0. (The memory circuit 416p has a role to take an integral signal as an origin at a step where the switch sw2 is turned on.) Accordingly, the correction means 51 is not driven abruptly.

The target value signal from the differential circuit 417p is inputted into the PWM duty changing circuit 418p. Though the correction lens 52 is driven in correspondence to the vibration angle by applying a voltage or a current corresponding to the vibration angle to the coil 510p of the correction means 51 (see FIG. 29), PWM drive is desirable to save electric power to be consumed by the correction means 51 and a driving transistor of the coil.

The PWM duty changing circuit 418p changes a coil driving duty dependently on a target value. When a PWM has a frequency of 20 kHz, for example, the PWM duty changing circuit sets duties "0" and "100" for target values "2048" and "4096" respectively provided from the differential circuit 417p, and determines duties at equal intervals between "0" and "100" in correspondence to target values. The determination of the duties are finely controlled dependently not only on the target values but also photographing conditions of the camera (temperature, camera posture and condition of power supply) so that the vibration is corrected with a high accuracy.

An output from the PWM duty changing circuit 418p is inputted into the driving device 419p which is a known driving device such as a PWM driver and an output from the driving device 419p is applied to the coil 510p (see FIG. 29) of the correction means 51 to correct the vibration. The driving device 419p is turned on in synchronization with the switch sw2 and turned off upon completion of film exposure. So long as the release button 43a is half depressed (sw1 is turned on), the integral circuit 415p continues integration even after the completion of the exposure and the memory circuit 416p stores a new integral output when the switch sw2 is turned on next time.

When the photographer stops half depressing the release button 43a, the integral circuit 415p stops integrating the output from the DC cut filter 414p and resets itself. Resetting means to erase data which has been so far accumulated by integration.

When the main switch is turned off, the vibration detection device 45p is turned off to terminate a vibration prevention sequence.

When the output signal from the integral circuit 415p exceeds a predetermined value, it is judged that the camera has been panned and the time constant of the DC cut filter 414p is changed. For example, a characteristic to cut off DC components having frequencies not higher than 0.2 Hz is changed to a characteristic to cut off DC components having frequencies not higher than 1 Hz and an original time constant is resumed in a predetermined time. An amount of this change of the time constant is controlled dependently on a level of the output from the integral circuit 415p. Speaking concretely, the DC cut filter 414p has a characteristic so as to cut off DC components having frequencies not higher than 0.5 Hz when the output signal exceeds a first threshold value, a characteristic so as to cut off DC components having frequencies not higher than 1 Hz when the output signal exceeds a second threshold value or a characteristic so as to cut off DC components having frequencies not higher than 5 Hz when output signal exceeds a third threshold value.

When the output of the integral circuit 415p is remarkably high, the integral circuit is once reset to prevent a calculation from being saturated (overflowing).

Though the DC cut filter 414p is configured by starting operating after 0.2 second elapses from the main switch is turned on in FIG. 30, this configuration is not limitative and the DC cut filter 414p may be configured by starting operating when the release button 43a is half depressed. In such a case, the integral circuit 415p is operated upon completion of the change of the time constant of the DC cut filter.

Though the integral circuit 415p is also configured by starting operating when the release button 43a is half depressed (when sw1 is turned on), it may be configured by starting operating when the release button 43a is completely depressed (when sw2 is turned on). In such a case, the memory circuit 416p and the differential circuit 417p are unnecessary.

Though the DC cut filter 48p and the low pass filter 49p are disposed in the calculation device 47p in FIG. 30, it is needless to say that these filters may be disposed in the vibration detection device 45p.

FIGS. 31 through 33 are diagrams illustrating the correction means 51 in detail: FIG. 31 is a front view of the correction means 51, FIG. 32A is a side view as seen from a direction indicated by an arrow 32A in FIG. 31, FIG. 32B is a sectional view taken along a 32B—32B line in FIG. 31 and FIG. 33 is a perspective view of the correction means 51.

In FIG. 31, a correction lens 52 is fixed to a support frame 53 (the correction lens 52 comprises two lenses 52a and 52b which are fixed to a support frame 53, and a lens 52c which is fixed to a base plate 54 as shown in FIG. 32B, thereby composing a lens group of a photographing optical system).

A yoke 55 which is made of a ferromagnetic material is attached to the support frame 53, and permanent magnets 56p and 56y which are made of neodymium or the like are adsorbed and fixed (indicated by hidden lines) to a rear surface of the yoke 55 in FIG. 31. Furthermore, three pins 53a which extend radially from the support frame 53 are fitted into elongated holes 54a formed in a side wall 54b of the base plate 54.

The pins 53a are fitted in the elongated holes 54a with no play in a direction along an optical axis 57 of the correction lens 52 but the elongated holes 54a extend in a direction perpendicular to the optical axis 57 as shown in FIGS. 32A and 33, whereby the support frame 53 is freely movable along a plane perpendicular to the optical axis (as indicated by arrows 58p, 58y and 58r) though it is restricted by the base plate 54 in the direction along the optical axis 57. However, the support frame 53 is elastically restricted in each of the directions (58p, 58y and 58r) by a tension spring 59 which is stretched between a hook 53b on the support frame 53 and a hook 54c on the base plate as shown in FIG. 31.

Coils 510p and 510y are disposed on the base plate 54 so as to oppose to the permanent magnets 56p and 56y (indicated by partially hidden lines). The yoke 55, the permanent magnet 56p and the coil 510p are arranged as shown in FIG. 32B (the permanent magnet 56y and the coil 510y are similarly arranged) so that the support frame 53 is driven in the direction indicated by the arrow 58p when a current is supplied to the coil 510p or in the direction indicated by the arrow 58y when a current is supplied to the coil 510y.

A driven amount of the support frame 53 is determined by balance between a spring constant of the tension springs 59 and a thrust which is generated by correlation between the coil 510p, 510y and the permanent magnet 56p, 56y in each directions. That is, an amount of eccentricity of the correction lens 52 can be controlled on the basis of levels of currents supplied to the coils 510p and 510y.

A photographing control described below is conceivable as a hand vibration preventive measure other than the vibration prevention system described above.

A camera determines an exposure time (shutter speed) from luminance of an object, brightness (an F value) of a photographic lens and a film sensitivity, but when the exposure time exceeds a predetermined time, the exposure time is fixed at the predetermined time (the film is not exposed for a time longer than the predetermined time) to prevent an image from being degraded due to the hand vibration and a strobe is lighted to compensate for under-exposure caused by the photographing control. Speaking concretely, the exposure time is fixed at 1/60 second and the strobe is lighted at luminance of an object which requires an exposure time longer than 1/60 second (for example 1/15 second). This photographing control is capable of preventing at a certain degree an image from being degraded due to the hand vibration of a photographer.

However, the photographing control described above does not make it possible of take a favorable image of a photographic scene where strobe light does not reach a main object. When the exposure time is fixed at the predetermined time for a photographic scene where a main object is apart about 7 meters from the camera, for example, the strobe light cannot reach the main object, thereby making the main object under-exposed. Even when the strobe light reaches the main object, the strobe light may not reach a background, thereby making it under-exposed.

Though the hand vibration preventive measure can be improved by equipping a camera which performs the photographing control described above with the vibration prevention system, such a camera cannot cope with the photographing condition where the strobe light does not reach the main object and expose the background adequately.

However, if the strobe light is not used, by using a camera which performs the photographing control described above and is equipped with the vibration prevention system device described above, it is possible to take a photograph with a long exposure time (since it lessens a fear of the hand vibration regardless of the long exposure time), thereby allowing both the main object and the background to be exposed adequately.

Accordingly, it is conceivable that the camera which is equipped with the vibration prevention system is held by hand for photographing a dark object, but the vibration prevention system has a limited capability, thereby posing a problem that camera may be held for too long a time for photographing due to too much reliance on the vibration prevention system, thereby causing photographing to be failed by the hand vibration.

SUMMARY OF THE INVENTION

In one aspect of the present invention, it provides a camera to which an image blur correction device is applied, comprising:

exposure time calculation means which calculates an exposure time in correspondence to at least any of photometry data, sensitivity data of an image recording medium and brightness of a photographic lens;

strobe photographing designation means which forces the camera to execute strobe photographing when the exposure time calculated by the exposure time calculation means is longer than a first exposure time;

closing time setting means which forcibly fixes an exposure time at a predetermined exposure closing time (Tb or Td) regardless of a calculated result of the exposure time calculating means when the exposure time calculated by the exposure time calculation means is longer than the second exposure time; and changing means which changes a combination of the first exposure time and the second exposure time dependently on whether or not the image blur correction device is used for photographing, thereby configurating the camera by being capable of setting the first exposure time and the second exposure time so as to be matched with photographing with or without the image blur correction device.

BRIEF DESCRIPTION OF THE DRAWINGS

FIG. 3 is a diagram summarizing control examples of photographing conditions of the camera preferred as the first embodiment of the present invention;

FIG. 6 is a diagram summarizing control examples of photographing conditions of the camera preferred as the second embodiment of the present invention;

FIG. 7 is a flowchart showing operations of main members of a camera preferred as a third embodiment of the present invention;

FIG. 8 is a diagram summarizing control examples of photographing conditions of the camera preferred as the third embodiment of the present invention;

FIG. 9 is a block diagram showing an electrical configuration of main members of a camera preferred as each of fourth through sixth embodiments of the present invention;

FIG. 12 is a diagram summarizing control examples of photographing conditions of the camera preferred as the fourth embodiment of the present invention;

FIG. 14 is a diagram summarizing control examples of photographing conditions of the camera preferred as the fifth embodiment of the present invention;

FIG. 25 is a diagram summarizing control examples of photographing conditions of the vari-focal camera preferred as the seventh embodiment of the present invention;

FIGS. 32A and 32B are side views as seen from a direction indicated by an arrow 32A in FIG. 31 and a sectional view taken along a 32B—32B line in FIG. 31.

DETAILED DESCRIPTION OF THE PREFERRED EMBODIMENTS

Now, the present invention will be described in detail with reference to the preferred embodiments illustrated in the accompanying drawings.

Figure 1:
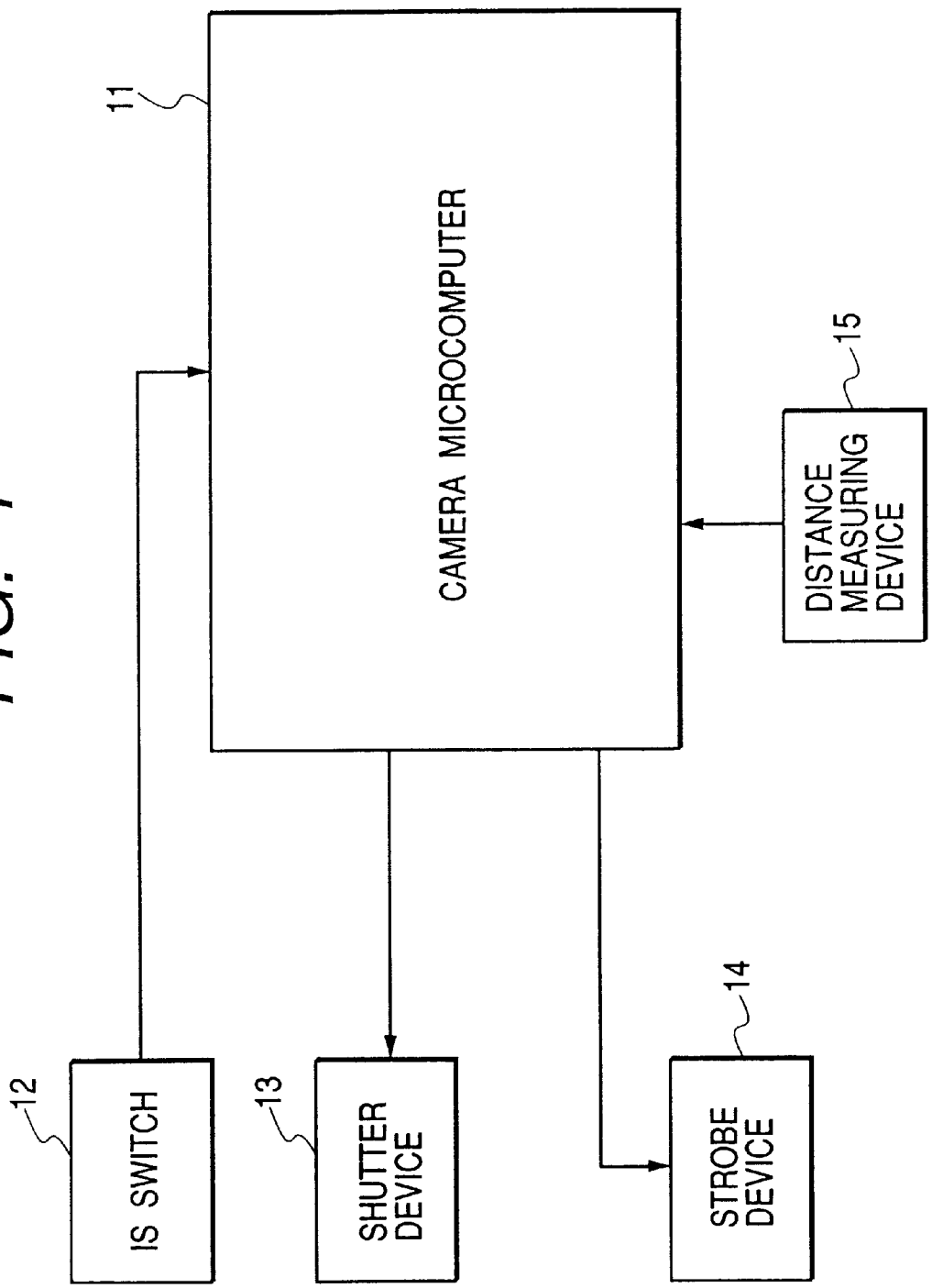
FIG. 1 is a block diagram showing an electrical configuration of main members of a camera preferred as a first embodiment of the present invention.

FIG. 1 is a block diagram showing an electrical configuration of main members of a camera preferred as a first embodiment of the present invention, with other members omitted for simplicity of description. The camera is equipped with a blur prevention device such as that shown in FIG. 29.

In FIG. 1, input into a camera microcomputer 11 from a blur prevention switch 12 (hereinafter referred to as IS switch) is a signal which denotes whether the vibration prevention device is to be set in an operative condition or an inoperative condition during photographing. Furthermore, data of distance from the camera to a main object is inputted into the camera microcomputer 11 from a distance measuring device 15. On the basis of object luminance data, a film sensitivity and brightness (an F value) of a photographic lens which are provided from a photometry device (not shown), the camera microcomputer 11 calculates an exposure time, controls a shutter device 13 as described later on the basis of the exposure time and simultaneously determines whether or not a strobe device 14 is to be used as occasion demands.

Figure 2:
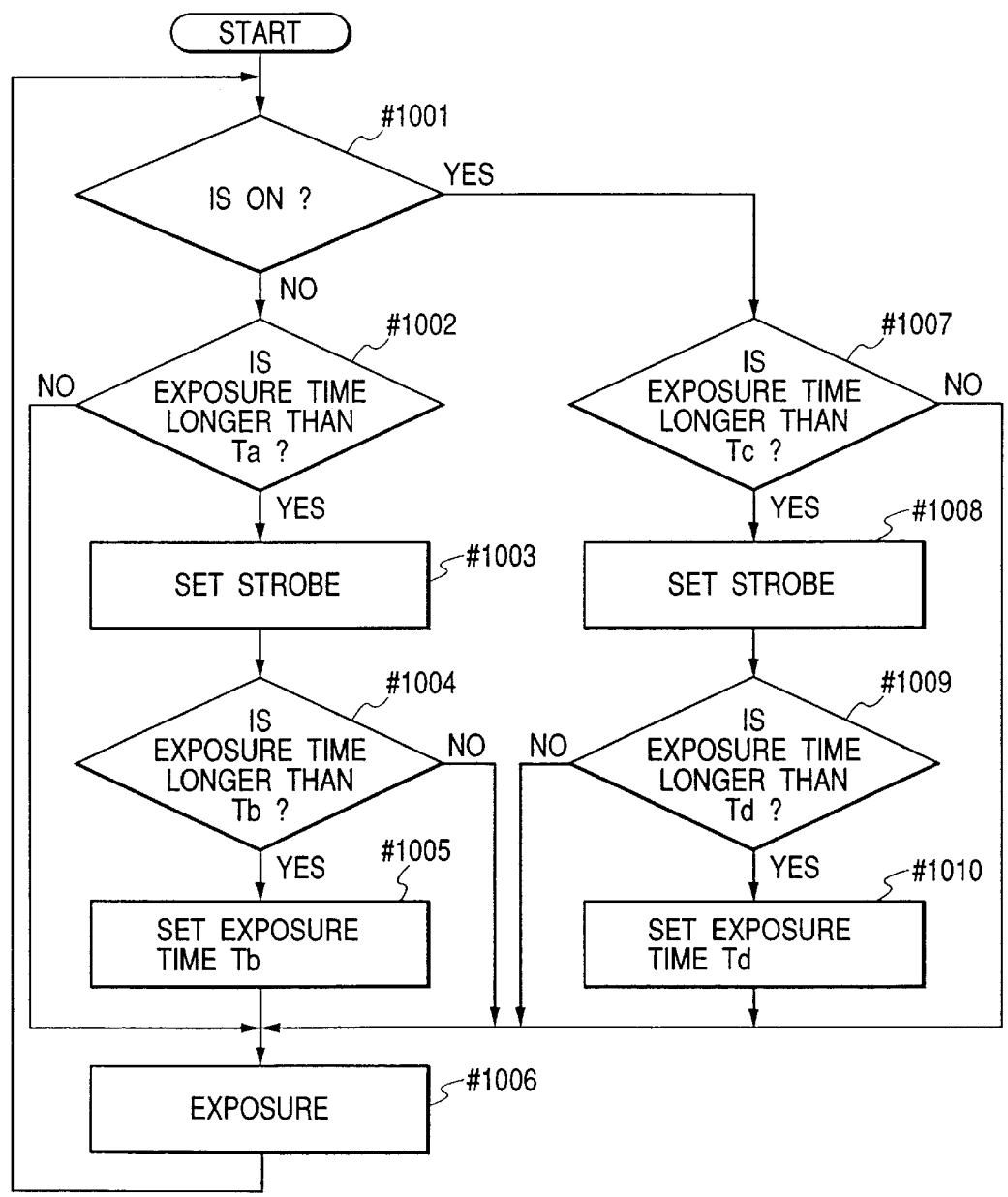
FIG. 2 is a flowchart showing operations of the main members of the camera preferred as the first embodiment of the present invention.

FIG. 2 is a flowchart showing operations of the main members of the camera having the configuration described above. The operations are started upon completing preparations for photographing.

At a first step #1001, it is judged whether or not the IS switch 12 inputs the command signal which commands use of the blur prevention device during photographing and when the use of the blur prevention device is commanded, the flow advances to a step #1007 or otherwise the flow advances to a step #1002. At the step #1002, the exposure time calculated from the object luminance data, the film sensitivity and the brightness (F value) of the photographic lens is compared with a strobe lighting start time Ta and when the exposure time is longer than Ta (1/60 second, for example), the flow advances to a step #1003 or otherwise to a step #1006. In this case where the exposure time calculated from the film sensitivity and the brightness of the photographic lens is shorter than Ta, the camera executes photographing with this exposure time.

At the step #1003, the strobe device 14 is set in a condition where it is ready for lighting at exposuring. At a next step #1004, the exposure time is compared with a shutter closing time Tb (1/60 second, for example) and when the exposure time is longer than Tb, the flow advances to a step #1005 or otherwise to a step #1006. In this case where the exposure time is shorter than Tb, the camera takes a photograph with the obtained exposure time. At the step #1005, the exposure time is fixed at Tb to inhibit photographing with a exposure time longer than Tb. At the successive step #1006, the object is exposed to the film corresponding to a shutter release operation by a photographer.

In the case where the blur prevention device is not used, the flow directly advances to the step #1006 and immediately exposes the object with the exposure time determined above when the object is bright (the exposure time is shorter than 1/60 second) due to be free from the fear of the hand vibration, but fixes the exposure time at Tb and lights the strobe device for correcting exposure when the object is dark (the exposure time is longer than 1/60 second) due to be feared to be blurred by the hand vibration.

In the case where use of the blur prevention device is commanded at the step #1001, the flow advances to the step #1007 as described above at which the exposure time is compared with a strobe lighting start time Tc (1/60 second, for example) and when the exposure time is longer than Tc, the flow advances to a step #1008 or otherwise immediately advances to the step #1006 described above.

At the step #1008, the strobe device 14 is set in the condition where it is ready for lighting, the exposure time is compared with a shutter closing time Td at a subsequent step #1009 and when the exposure time is longer than Td (¼ second, for example), the flow advances to a step #1010 or otherwise to the step #1006 described above. At the step #1010, the exposure time is fixed at Td (¼ second, for example) to inhibit photographing with a longer exposure time.

That is, in the case where the blur prevention device is used, the flow directly advances to the step #1006 and the object is exposed when the object is bright (the exposure time is shorter than 1/60 second) due to be free from the fear of the hand vibration and the blur prevention device operates when the object is dark (the exposure time is 1/60 second or longer) to lessen the fear of the hand vibration, whereby it is enable to prolong the shutter closing time (to ¼ second from 1/60 second in the case where the blur prevention device is not used) and to allow not only the main object but also the background to be exposed adequately.

The shutter closing time is set (at ¼ second, for example) even when the blur prevention device is used because too long an exposure time (1 second, for example) produces a fear of the hand vibration even when the blur prevention device is used.

When the exposure time is Tc or longer, the strobe device 14 is lighted to keep still the object by lighting the strobe (as a measure to prevent the object vibration), and when the blur prevention device is used, the strobe device 14 is lighted at object brightness which provides Tc (1/60 second, for example) and an actual exposure time is determined in correspondence to the object brightness (shutter closing time Td).

The photographing with an exposure time longer than the predetermined strobe lighting start time (Tc) is referred to as "slow synchro photographing" which is capable of adequately exposing not only the main object but also the background to which strobe light cannot reach. (When the blur prevention device is not used, a photograph may be blurred by the hand and the camera must be fixed to a tripod.)

The first embodiment described above makes it possible to easily obtain favorable photographs by controlling the photographing conditions for the camera like those for a camera which is not equipped with the vibration prevention system when the blur prevention device is not used and by executing the slow synchro photographing when the blur prevention device is used.

Ta and Tc (strobe lighting start times) as well as Td and Tb (shutter closing times) described with reference to the flowchart shown in FIG. 2 are not limitative by the condition described above, and Ta for starting the strobe lighting may not be equal to Tc. FIG. 3 exemplifies combinations of Ta, Tc, Td and Tb.

A condition (1) shown in FIG. 3 corresponds to the example of photographing control described above with reference to the flowchart in FIG. 2. Furthermore, the strobe lighting start times Tc and Ta may be changed between photographing with the blur prevention device and photographing without the blur prevention device as shown in a condition (2) in FIG. 3.

In the first embodiment described above, the strobe is lighted with the strobe device 14 upon photographing when the exposure time calculated from the object brightness, etc. is longer than Ta or Tc (for example, 1/60 second or 1/30 second). However, it is judged whether or not the exposure time is longer than Td (¼ second, for example) when the blur prevention device is used in this case, and the strobe photographing is executed with the exposure time fixed at Td when the exposure time is longer than Td or otherwise the strobe photographing is executed with the strobe photographing with Ta or Tc (1/60 second or 1/30 second, for example).

Furthermore, in the first embodiment, it is judged whether or not the exposure time is longer than Tb (1/60 second, for example) when the blur prevention device is not used, and if longer, the strobe photographing is executed with the exposure time fixed at Tb or otherwise the strobe photographing is executed with Tb (1/60 second, for example).

Though the first embodiment provides only an effect which is similar to that available with the conventional camera when the blur prevention device is not used, it controls photographing conditions for the slow synchro photographing when the blur prevention device is used, thereby making it possible to obtain a favorable photograph on which not only the main object but also the background is exposed adequately.

The strobe lighting start times Tc and Ta are changed in response to the conditions of photography with the vibration prevention system and photography without the blur prevention device as in the condition (2) shown in FIG. 3, thereby making it possible to obtain the photograph by better use of characteristics of the vibration prevention system.

Second Embodiment

Figure 4:
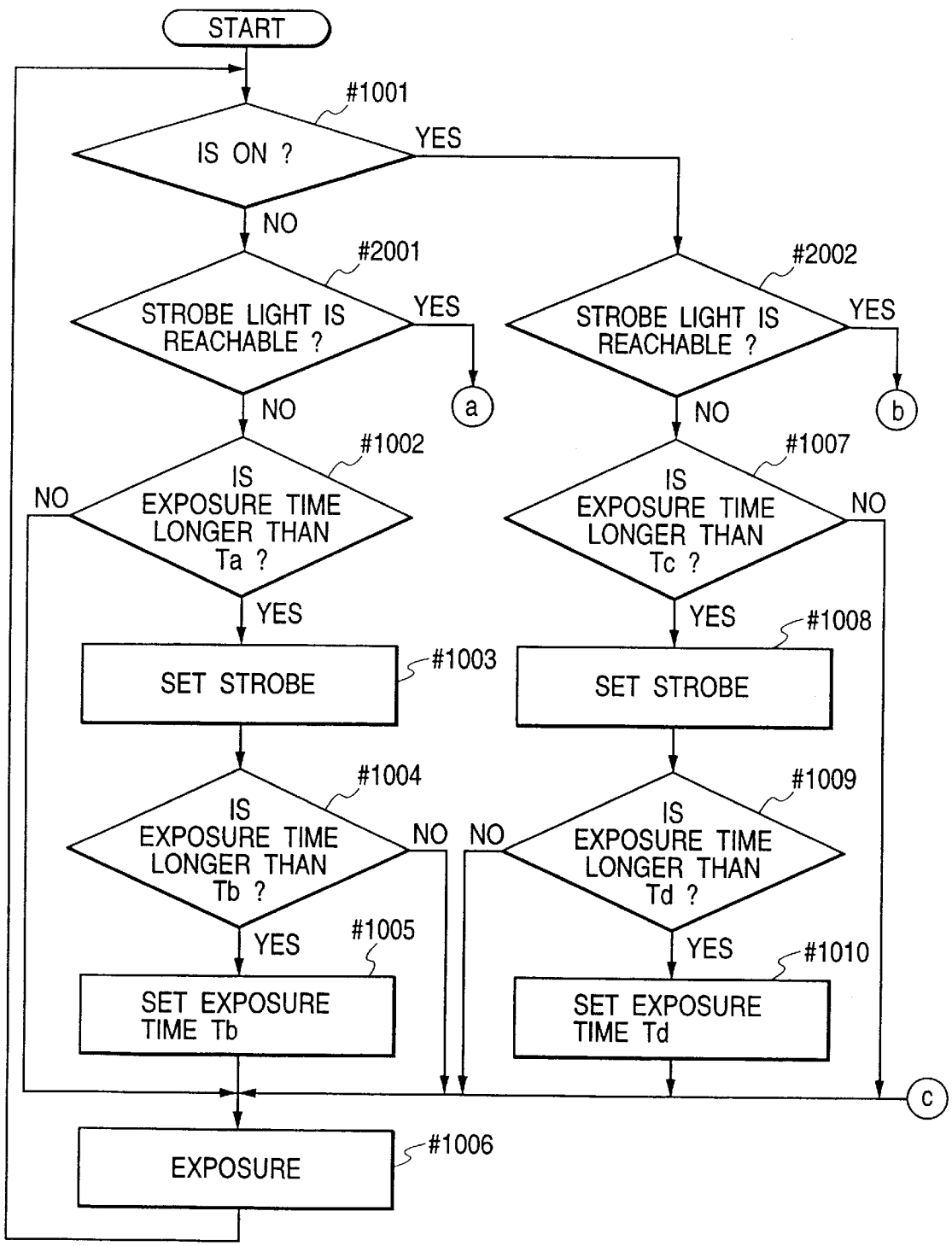
FIG. 4 is a flowchart partially showing operations of main members of a camera preferred as a second embodiment of the present invention.
Figure 5:
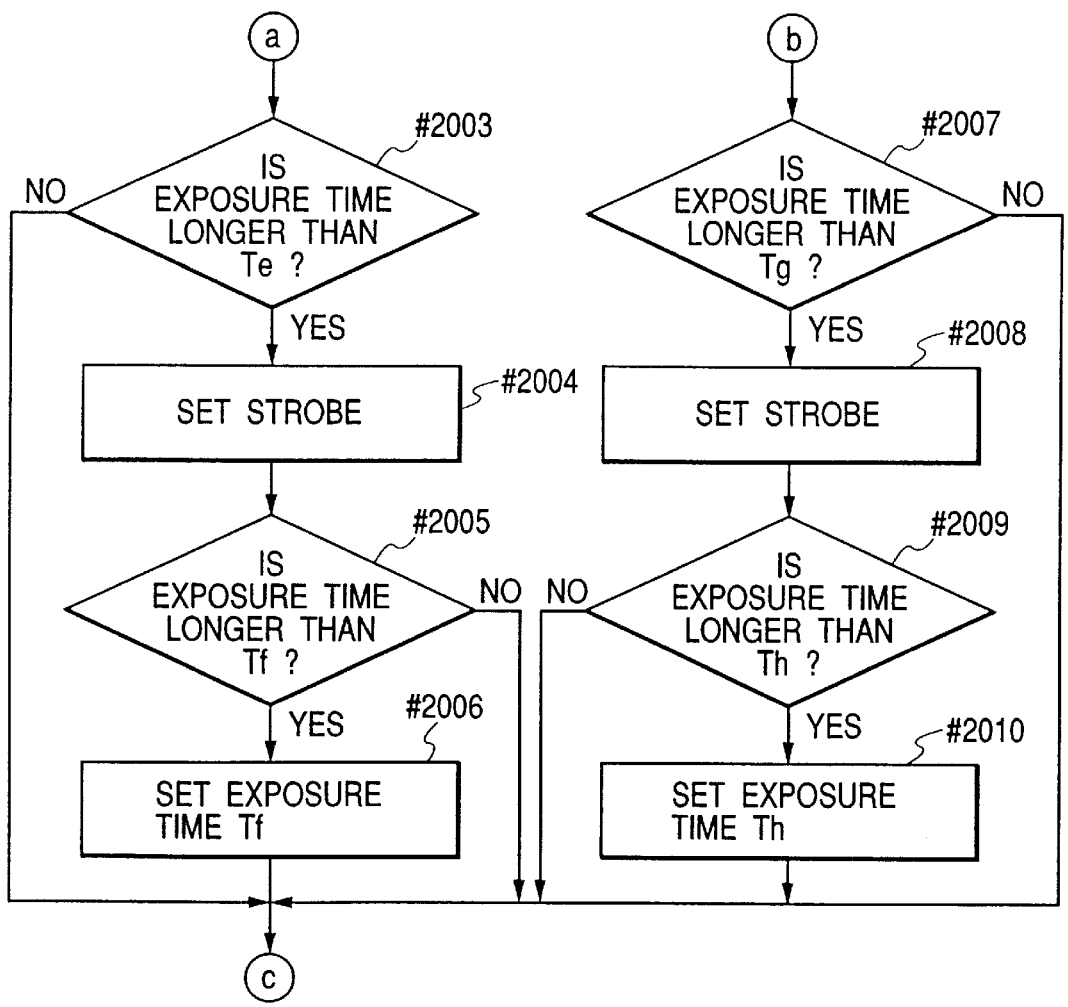
FIG. 5 is a flowchart showing operations of the main members subsequent to those shown in FIG. 4.

FIGS. 4 and 5 are flowcharts showing operations of main members of a camera preferred as a second embodiment of the present invention having a circuit composition which is similar to that of the first embodiment and not described in particular.

In the second embodiment of the present invention, photographing condition is changed between a case where strobe light can reach an object and another case where the strobe light cannot reach the object.

Speaking concretely, the second embodiment includes an arrangement for preventing hand vibration and object vibration using a strobe device when an object is located within an area where strobe light reaches it, and for preventing under-exposure by prolonging a shutter closing time (an exposure time) when an object is located at a distance beyond reach of the strobe light.

The second embodiment includes an arrangement for positively using the strobe device for the object located within the reach of the strobe light even when the blur prevention device is used. Since the blur prevention device suppresses the hand vibration at even when an exposure time is prolonged to a certain degree, it is considered that the strobe device may not be used so often but the movement of the object (object vibration on a screen) is actually produced when the exposure time is prolonged. Accordingly, it is desirable to select an exposure time as short as possible within a range where the object is exposed adequately and the strobe device is lighted to shorten an exposure time even when the blur prevention device is used.

Though the strobe device is used positively even when the blur prevention device is used, the shutter closing time is set later (by prolonging the exposure time) than that when the blur prevention device is not used so that a background which is outside the reach of the strobe light is exposed adequately.

When the object is located at the distance beyond the reach of the strobe light, it is needless to say that the blur prevention device is used, thereby exposing the object adequately and providing a photograph having an image quality not degraded due to the hand vibration. Though the exposure time is prolonged in this a case, the object is located at a long distance from the camera and the image quality is not degraded due to the object movement (the object vibration on the screen). This is because the object vibration is less remarkable as the object is located at a longer distance from the camera.

Now, operations of the main members of the second embodiment of the present invention will be described with reference to the flowcharts shown in FIGS. 4 and 5. Steps at which operations of the second embodiment are the same as those in FIG. 1 are denoted by the same step numbers and not described in particular.

At each of steps #2001 and #2002, it is judged whether or not an object is in the strobe light reachable area. When distance data (data denoting a distance from the camera to the object) is inputted from the distance measuring device 15 shown in FIG. 1 into the camera microcomputer 11, the camera microcomputer 11 calculates the strobe light reachable area (distance) from brightness (F value) of a photographic optical system at a photographing time, a film sensitivity and a strobe guide number, compares the distance with the distance data from the distance measuring device 15 and judges whether or not the strobe light reaches the object.

Actually, the camera microcomputer judges more complicatedly. When a negative film is used, the camera microcomputer 11 judges that the strobe light reaches an object which is located at a distance beyond the reach of the strobe light but is not to be exposed inadequately so much (for example, to be under-exposed at two steps) but when a positive film is used, the camera microcomputer judges that the strobe light does not reach an object located which is located at a distance too long for adequate exposure. (Since the negative film has a large exposure allowance).

When it is judged that the strobe light does not reach the object at the step #2001 or #2002, the flow advances to a step #1002 or #1007 and execute an operation which is the same as that described with reference to FIG. 2.

When it is judged that the strobe light reaches the object, on the other hand, the flow advances to a step #2003 or #2007 shown in FIG. 5. Operations at steps #2003 through #2006 or steps #2007 through #2010 are the same as those at the steps #1002 through #1005 shown in FIG. 4, except for times Te, Tf, Tg and Th which are to be judged.

On the basis of the determination of the use or not use the vibration prevention system and the judgement that the strobe light reaches or does not reach the object as in the flowcharts shown in FIGS. 4 and 5, the strobe lighting start times Ta, Tc, Te and Tg, and the shutter closing times Tb, Td, Tf and Th are set as shown in FIG. 6.

In FIGS. 4 and 5 also, photographing is executed only with the exposure time calculated as described above with reference to the example shown in FIG. 1 when the camera microcomputer 11 skips steps (steps 1005, 1010, 2006, 2010) to fix the exposure time.

FIG. 6 shows an example to control two kinds of photographing conditions. In the photographing conditions shown in FIG. 6, a strobe mode is selectable in an auto mode (a mode in which the camera automatically judges whether or not a strobe is to be used dependently on luminance of an object), but a shutter closing time is controlled as shown in FIG. 6 even in a strobe off mode or a forcible strobe lighting mode.

When the strobe light reaches the object in an example mentioned as condition (1) in FIG. 6, photographing conditions are the same between photographing with the blur prevention system and photographing without the blur prevention device. This is because an exposure time as short as possible is preferable when an object is located at a short distance within the strobe light reachable area and the object movement (object vibration on the screen) during exposuring is remarkable as described above. Accordingly, a short exposure time is selected and the strobe is lighted to compensate for under-exposure though the blur prevention device prevents an influence due to the hand vibration even at a longer exposure time.

When an object is located at a distance beyond the strobe light reachable area, the strobe lighting is actually ineffective, but the strobe is lighted at a low object luminance (when the exposure time is longer than 1/30 second) to compensate for under-exposure even slightly and notify photographing to the object. When the object is located at the distance beyond the strobe light reachable area, the shutter closing time is changed (the strobe lighting start time is kept unchanged) between the photographing with the blur prevention device and the photographing without the blur prevention device. When the blur prevention device is used, the shutter closing time being prolong to 1/4 second for the photographing. This is because it is unnecessary to select a short exposure time and the blur prevention device suppresses the hand vibration when the object is located at the distance beyond the strobe light reachable area and the object vibration is not remarkable.

Upon photographing without the blur prevention device, the reason why the strobe lighting start time is changed between a condition where the strobe light reaches the object and another condition where the strobe light does not reach the object, takes into consideration different influences due to the object vibration described above. Furthermore, the shutter closing time is changed to compensate for under-exposure as far as possible while slightly sacrificing the object vibration.

In an example mentioned as a condition (2) in FIG. 6, the shutter closing time is prolonged for the photographing with the blur prevention device even when the strobe light reaches the object.

In the example mentioned as the condition (1) described above, the strobe light is used to compensate for the under-exposure when the strobe light reaches the object. However, a background which is outside the strobe light reachable area is considerably under-exposed (because the shutter closing time is short). When the blur prevention device is used in the example mentioned as the condition (2), a long shutter closing time is selected to expose the background adequately even in a condition where the object is near and strobe device is usable. Though the exposure time is long in this case, the object is sufficiently exposed by the strobe light and the object is scarcely exposed on the subsequent exposure (while a shutter is kept open after completing the strobe lighting), thereby making the object vibration on the screen unnoticeable (the object vibration on the screen is suppressed by the strobe lighting).

When the strobe light does not reach the object, photographing conditions are controlled as in the example mentioned as the condition (1) described above.

In the second embodiment, when the exposure time calculated from the luminance of the object, etc. is longer than the shutter closing time Td or Th, exposure is executed with the exposure time fixed at the shutter closing time Td or Th, and if the blur prevention device is used in this case, the shutter closing time Td in case that the object is located far from the strobe light reachable area, is set longer than the shutter closing time Th in case that the object is located at the short distance from the camera and within strobe light reachable area.

Accordingly, the hand vibration or the object vibration on the screen is prevented by using the strobe device when the object is located within the strobe light reachable area and it is possible to prevent under-exposure by selecting the long shutter closing time when the object is located outside the strobe light reachable area.

When the calculated exposure time is longer than the strobe lighting start time Tc or Tg, the strobe device is lighted. In this case, when the blur prevention device is used, the strobe lighting start time Tg in case that the object is located at the short distance from the camera or within the strobe light reachable area, is set shorter than the strobe lighting start time Tc in case that the object is located at the long distance from the camera and the strobe light does not reach the object or the object is far from the strobe light reachable area.

Accordingly, the noticeably object vibration on the screen which is produced by the location of the object within the strobe light reachable area, is prevented by, shortening the shutter closing time Th the under-exposure resulting from the shortening of the shutter closing time Th is compensated by using the strobe device positively.

Third Embodiment

FIG. 7 is a flowchart showing operations of main members of the third embodiment of the camera according to the present invention having a circuit composition which is similar to that of the first embodiment described above and not described in particular.

The flowchart shows steps of operations to be executed before the step #1001 of the flowchart shown in FIG. 4 illustrating the second embodiment described above.

In the third embodiment of the present invention, a photographing mode which is selected by a photographing mode dial (not shown) is judged and photographing condition is changed dependently on the selected photographing mode so that a strobe lighting start time and a shutter closing time are not only changed dependently on whether or not the vibration prevention system is used and whether or not the strobe light reaches the object (the object is within the strobe light reachable area) but also delicately controlled the dependently on the photographing mode, thereby allowing any person to easily take a favorable photograph.

After completing preparatory operations for photographing of the camera, the operations which are shown in the flowchart presented as FIG. 7 is started. At a step #3001 first, it is judged whether or not the auto mode is currently selected, the flow advances to a step #3005 when the auto mode is selected, strobe lighting start times Ta, Tc, Te and Tg as well as shutter closing times Tb, Td, Tf and Th (described later in detail with reference to FIG. 8) are set respectively at the steep #3005, and the operations at the steps #1001 and later shown in FIG. 4 are executed.

When the auto mode is not selected, the flow advances from the step #3001 to a step #3002 where it is judged whether or not a sport mode is selected and when the sport mode is selected, the flow advances to a step #3006 where the strobe lighting start times Ta, Tc, Te and Tg as well as the shutter closing times Tb, Td, Tf and Th as shown in FIG. 7 are set respectively, thereafter the operations at the steps #1001 and later shown in FIG. 4 are executed.

When the sport mode is not selected, the flow advances from the step #3002 to a step #3003 where it is judged whether or not a macro mode is selected as a photographing mode, and when the macro mode is selected, the flow advances to a step #3007 where the strobe lighting start times Ta, Tc, Te and Tg as well as the shutter closing times Tb, Td, Tf and Th are set respectively (described later in detail with reference to FIG. 8), thereafter the operations at the steps #1001 and later shown in FIG. 4 are executed.

When the macro mode is not selected, the flow advances from the step #3003 to a step #3004 where it is judged whether or not a night view mode is selected as a photographing mode and when the night view mode is selected, the flow advances to a step #3008 where the strobe lighting start times Ta, Tc, Te and Tg as well as the shutter closing times Tb, Td, Tf and Th (described later in detail with reference to FIG. 8) are set respectively, thereafter the operations at the steps #1001 and later shown in FIG. 4 are executed.

When the night view mode is not selected, the flow advances from the step #3004 to a step #3009 where it is judged that a portrait mode is selected as a rest photographing mode, and the strobe lighting start times Ta, Tc, Te and Tg as well as the shutter closing times Tb, Td, Tf and Th (described later in detail with reference to FIG. 8) are set respectively, thereafter the operations at the steps #1001 and later shown in FIG. 4 are executed.

Operations of the third embodiment will be described with reference to FIG. 8 which summarizes the photographing modes mentioned above and photographing condition control modes corresponding to the photographing modes.

In the auto mode shown in FIG. 8, the auto mode is provided as a mode for little failure in general photographing (for example, snapshot) wherein when it is necessary to make an exposure time longer than an exposure time which may produce a fear of the hand vibration ($1/60$ seconds in the third embodiment) like that obtained by a conventional photographing control method, the exposure time is inhibited to prolong so as to compensate for under-exposure by using the strobe device. Accordingly, a shutter closing time is equal to a strobe lighting start time.

When the blur prevention device is turned on, the long shutter closing time ($1/15$ second) is selected in this figure since this exposure time is less capable of making the hand vibration in condition that the blur prevention device is turned. Actually, it is substantially less possible to produce the hand vibration even for a longer exposure time ($1/8$ second), but the exposure time is calculated so as to have a margin (a short shutter closing time is selected) since the camera may be handled in various ways. Accordingly, a background may be under-exposed when the strobe light reaches an object or an object may also be slightly under-exposed when the strobe light does not reach the object (needless to say, exposure is more adequate than that obtained without using the blur prevention system), but importance is placed not on the exposure but on stability against the hand vibration.

Only the strobe lighting start time is not changed between the photographing with the blur prevention device and the photographing without the blur prevention device since a photographer may be confused by operations of the camera which are largely different apparently between the photographing with the blur prevention device and the photographing without the blur prevention device.

The sport mode is to be used for photographing an object which is moving at a high speed and it is to be noted here that the object movement (the object vibration on the screen) cannot be prevented even when the blur prevention device eliminates the fear of the hand vibration on a long exposure time. For this reason, it is preferable not to unreasonably prolong the exposure time in this mode even when the blur prevention device is used (not to set the shutter closing time at a late timing).

When the strobe light reaches the object, the photography is executed with an exposure time which is as short as possible to cope with the object vibration on the photographing screen and under-exposured state is compensated by lighting the strobe. When the strobe light reaches an object, in the third embodiment, both the shutter closing time and the strobe lighting start time are set at $1/100$ second whether or not the blur prevention device is used. When the strobe light does not reach the object, basically, photographing conditions are substantially set the same as those in the auto mode (an exposure time may not be so short in this case since the object is located at a distance too long for the strobe light to reach the object and the object vibration is not noticeable) but a shutter closing time is set shorter than that in the auto mode. This is because the object vibration is not negligible when the shutter closing time is set to be as long as that in the auto mode.

Figure 28:
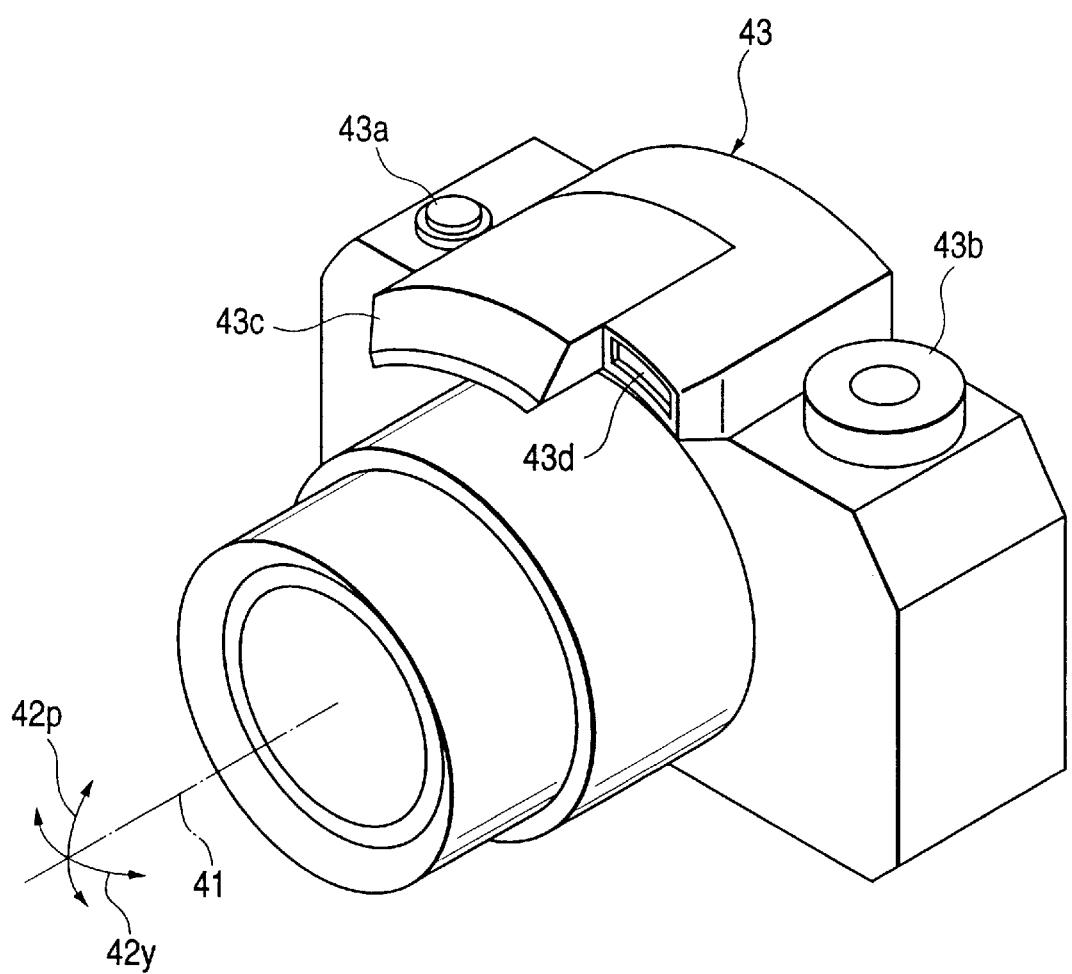
FIG. 28 is an external view of a conventional compact camera equipped with a vibration prevention system.

In the macro mode also, a strobe lighting start time and a short shutter closing time are set short ($1/100$ second) when the strobe light reaches the object. This is because an image is degraded not only due to rotational vibrations (indicated by arrows 42p and 42y in FIG. 28) which can be suppressed with the blur prevention device but also shift vibrations in parallel with a plane which is perpendicular to the optical axis when the camera is brought close to the object for macro photographing. The shift vibrations cannot be corrected since these vibrations cannot be detected with a vibration detection device which detects a rotational angular velocity. Accordingly, to cope with the shift vibrations, a short exposure time is selected.

Considering a fact that a magnification is enhanced and the influence due to the object vibration on the photographing screen is noticeable (for example, a flower swung by a wind) when the camera is brought close to the object for the macro photographing, the short exposure time is set and under-exposure is compensated by the strobe lighting when the strobe light reaches the object. When the strobe light does not reach an object, photographing conditions is controlled as in the auto mode.

In the night view mode (or the slow synchro mode), a strobe lighting start time is set similar to that in the auto mode but a shutter closing time is set at $1/4$ second when the blur prevention device is turned on or $1/15$ seconds when the blur prevention device is turned off. The long shutter closing time is selected to expose a background as adequately as possible, thereby clearly photographing a neon sign and a Christmas tree, for example, existing in the background.

When the blur prevention device is turned on, the shutter closing time is set at $1/4$ seconds. Though the hand vibration may be feared when the camera is handled roughly for photographing with this exposure time, the photographing is rather free from the fear of the hand vibration since it is based on a premise that a photographer intentionally selects the night view mode and firmly holds the camera in this mode. When the blur prevention device is turned off, a shutter closing time is set $1/15$ second which is different from the shutter closing time in the auto mode and the hand vibration is feared. An operation manual for the camera according to the present invention contains a clear description to instruct the photographer to firmly hold the camera or use the tripod in this case like an operation manual for the conventional camera.

Furthermore, the third embodiment may be configured by forcibly turning on the blur prevention device when the night view mode is selected (the camera has no night view mode in which the blur prevention device is not used).

In the portrait mode, the strobe is lighted whether or not the strobe light reaches an onject and whether or not the blur prevention device is turned on. (A strobe lighting start time of $1/250$ second listed in FIG. 8 is substantially the same as the strobe which is always lighted for photographing.) The strobe lighting gives a catch light to an eye of a person as an object, thereby making it possible to take a photograph of the person having a vivid look (since a catch light can be given even when the strobe light cannot sufficiently reach the object).

When the blur prevention device is turned on, the shutter closing time is set at $1/8$ second to expose the background adequately regardless of the strobe light reaches the object. In the portrait mode, the shutter closing time is longer than that in the auto mode so as to obtain a preferable portrait by photographing the background as bright as possible (by exposing the background adequately).

In the portrait mode, the shutter closing time is shorter than that in the night view mode to reduce the hand vibration since an image quality demanded for a photograph obtained in the portrait mode is higher than that for a photograph obtained in the night view mode. When the blur prevention device is turned off, the shutter closing time is controlled as in the auto mode.

Unlike the first embodiment or the second embodiment described above, the third embodiment described above is configured by delicately controlling the strobe lighting start time and the shutter closing time dependently not only on whether or not the blur prevention device is turned on and whether or not the strobe light reaches the object but also on the condition of the photographing mode, thereby allowing a user to easily take a favorable photograph in each of the photographing modes even when he has no specialized knowledge in camera operation or characteristics of set photographing modes.

As understood from the foregoing description, the first through third embodiments of the present invention are capable of providing cameras which can adequately expose not only main objects but also other objects existing in backgrounds by making most of the characteristic of the blur prevention device.

Furthermore, the first through third embodiments of the present invention described above are capable of providing cameras which can prevent the objects from being underexposed even when the objects are located at distance exceeding the reach of the strobe light.

Furthermore, the first through third embodiments of the present invention are capable of providing cameras which can prevent without fail the objects from being vibrated on screens and under-exposed when the object are located within the reach of the strobe light.

Moreover, the first through third embodiments of the present invention described above are capable of providing cameras which allow even beginners to take photographs without fail when any of the photographing modes is selected.

Fourth Embodiment

FIG. 9 is a block diagram illustrating an electrical configuration of main members of a camera preferred as the fourth embodiment of the present invention, with other members omitted for simplicity of description. The camera is equipped with the blur prevention device shown in FIG. 29 or the like.

In FIG. 9, a signal which determines whether or not the blur prevention device is turned on for photographing is inputted from a blur prevention switch 112 (hereinafter referred to as an IS switch) to a camera microcomputer 111. Furthermore, luminance data of a main object is inputted from a photometry circuit 115. On the other hand, the camera microcomputer 111 controls an exposure time for a shutter (not shown) in a shutter device 113 and whether or not a strobe (not shown) is used on the basis of photometric data from the photometry circuit 115, a film sensitivity and brightness (F value) of a lens.

Furthermore, the camera microcomputer controls photographing conditions on the basis of a photographing mode selected condition input from a mode selection member 114. The photographing mode is, for example, a sport mode or a night view mode. In the sport mode which is selected for photographing an object moving at a high speed, a fast shutter speed ($1/100$ second, for example) is selected to prevent vibrations caused by a movement of the object (object vibration on a screen) and under-exposure is compensated by lighting a strobe. In the night view mode, a slow shutter speed is allowed (the night view mode allows a shutter speed of 2 seconds at longest though a shutter speed is not slower than $1/60$ second in an ordinary mode taking a vibration during photographing into consideration) to expose both a main object and a background adequately in a dark photographing condition, and a strobe device is used dependently on luminance of the main object (for the slow synchro photographing).

Furthermore, input into the camera microcomputer 111 are temperature data of an operating environment at a photographing time, camera posture data (informing whether the camera is set in a horizontal or vertical posture) and data informing whether or not the camera is fixed to a tripod from a temperature detection circuit 117, a posture detection circuit 118 and a tripod detection circuit 119 composed of a switch disposed in a tripod hole respectively.

Figure 29:
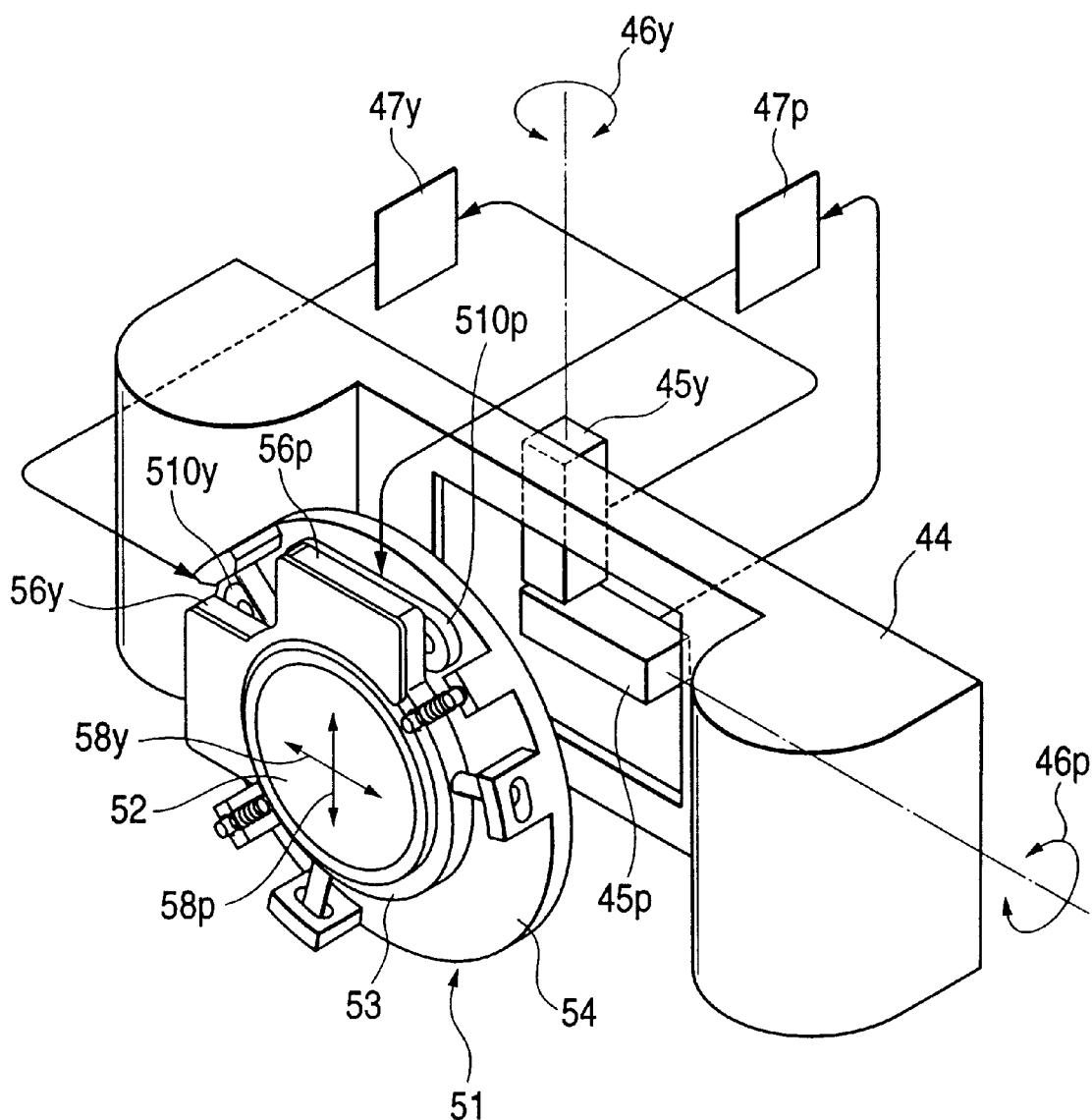
FIG. 29 is a perspective view showing an internal mechanism of the camera shown in FIG. 28.
Figure 30:
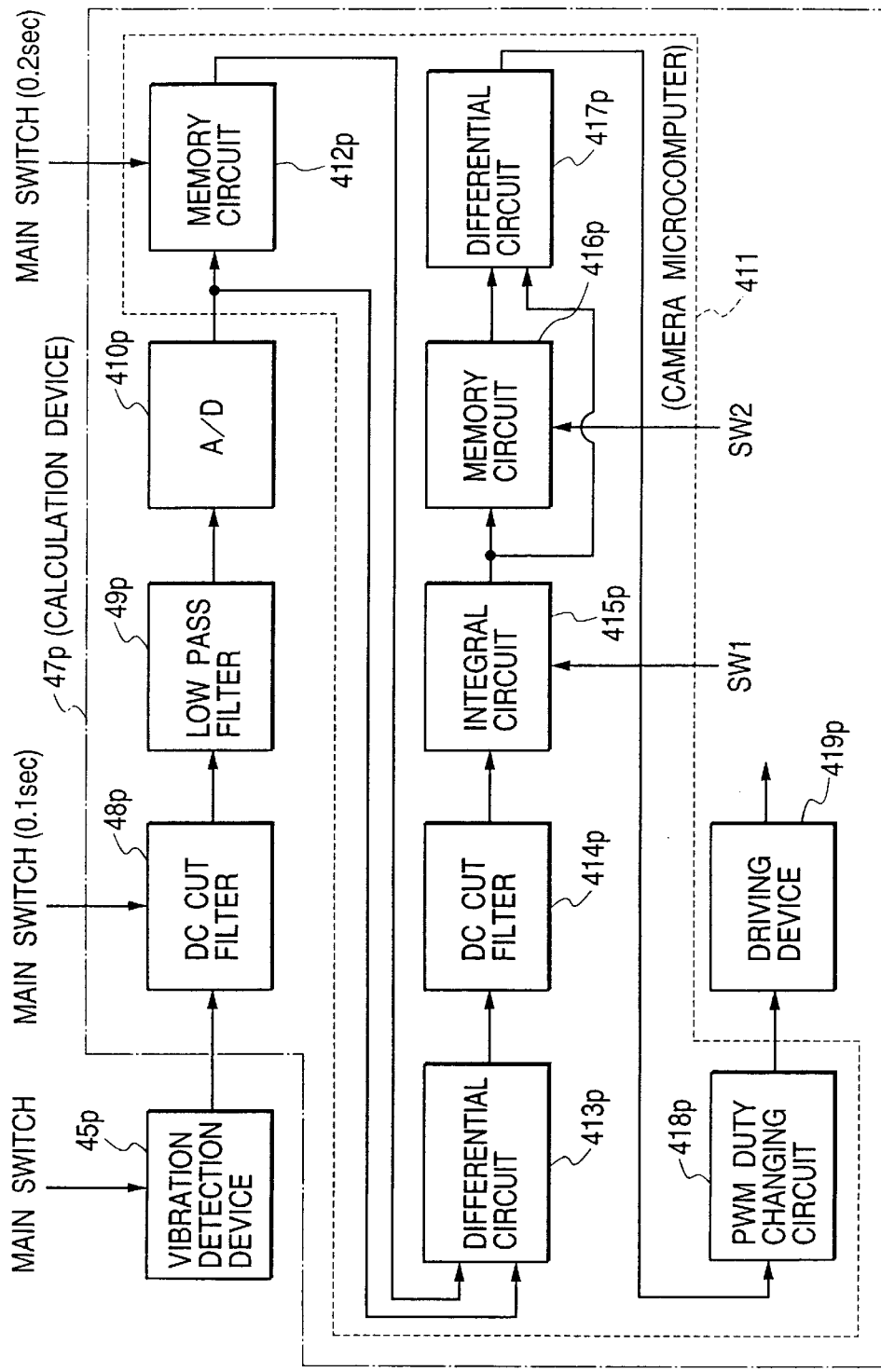
FIG. 30 is a block diagram showing an internal configuration of a calculation device shown in FIG. 29.
Figure 31:
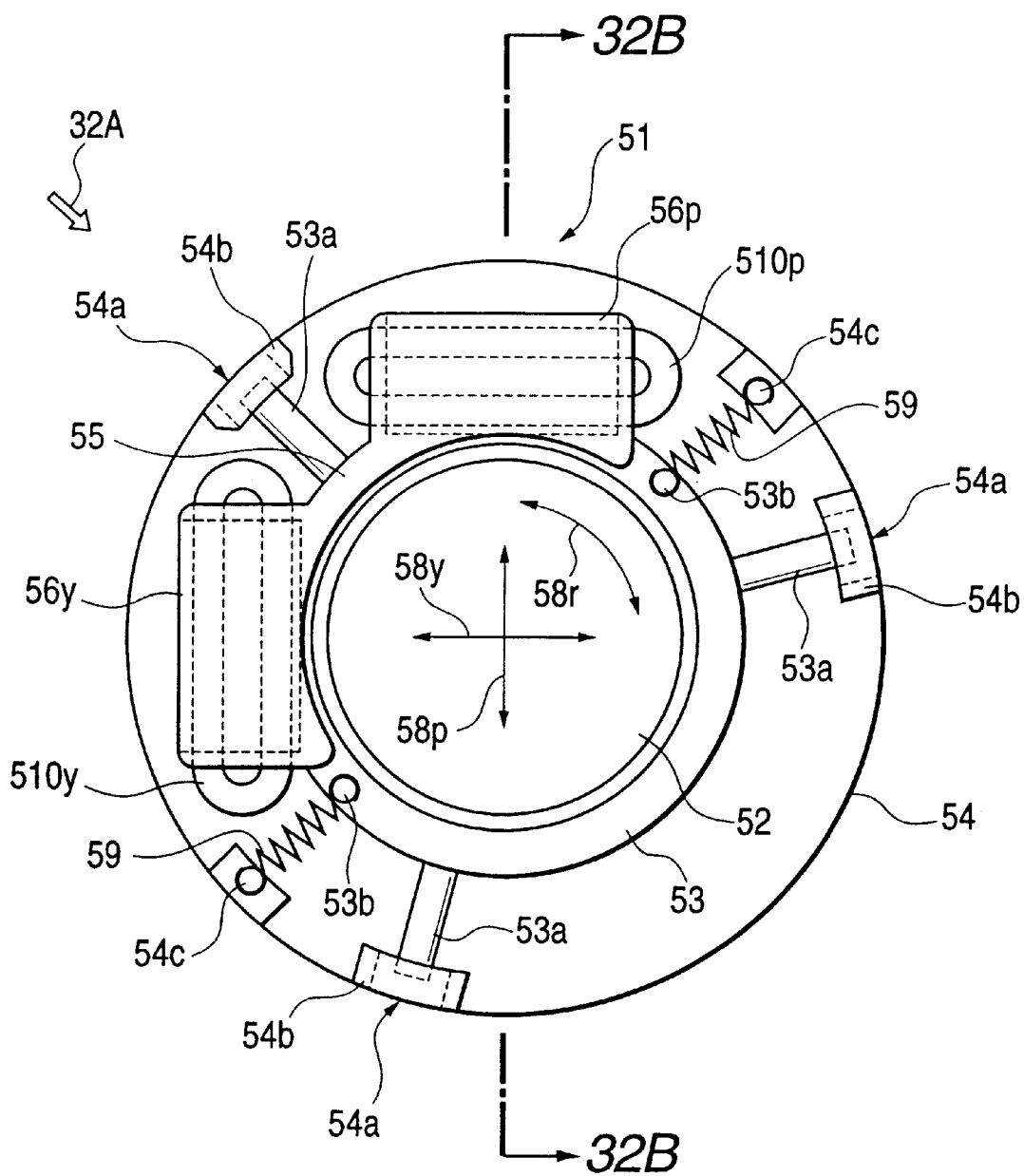
FIG. 31 is a front view of correction means of the camera shown in FIG. 28.
Figure 33:
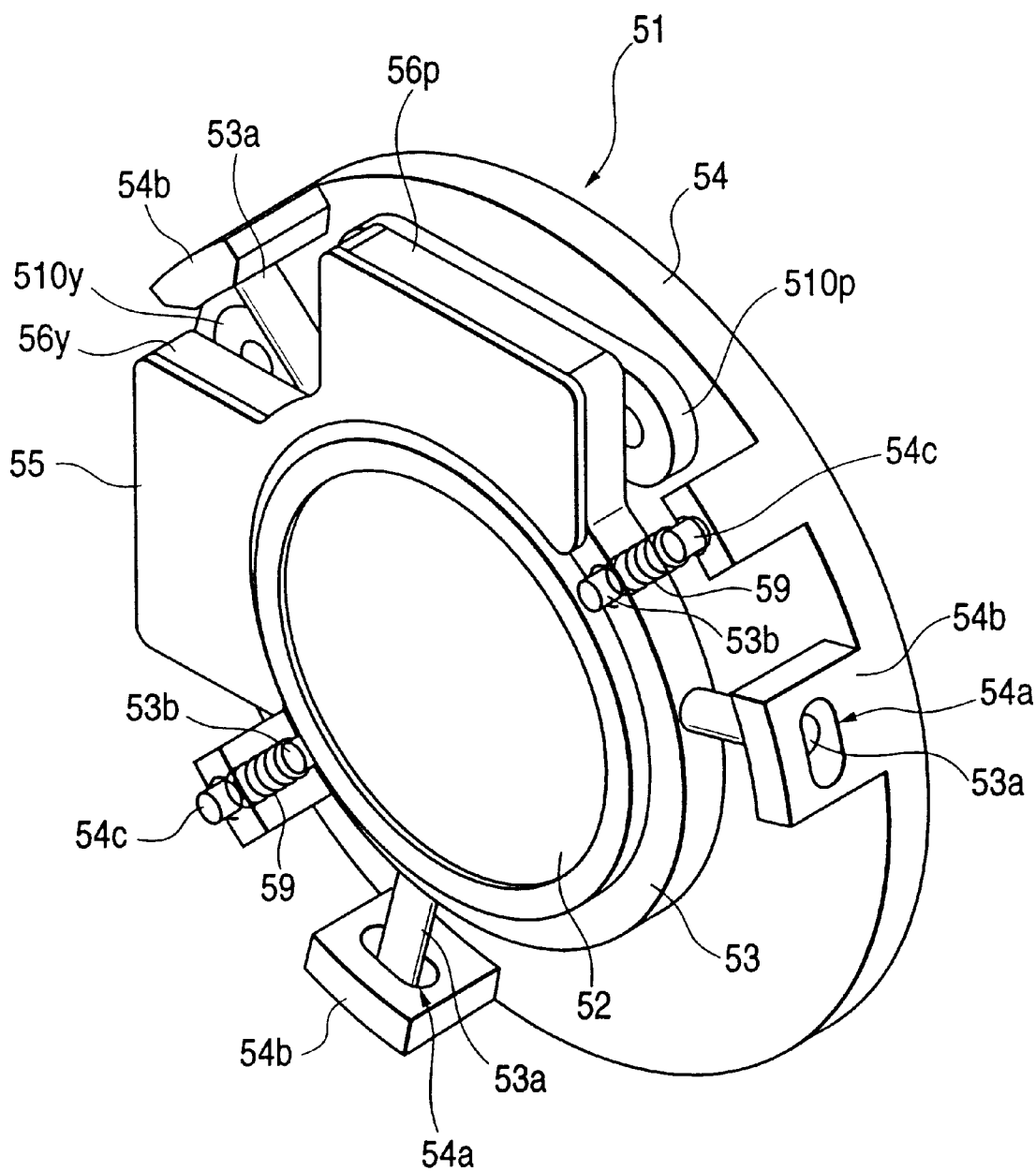
FIG. 33 is a perspective view of the correction means shown in FIG. 31.

Furthermore, vibration data is inputted into the camera microcomputer 111 from a vibration detection device 116 (corresponding to the vibration detection devices 45*p* and 45*y* shown in FIG. 29) so that the vibration data is used not only for vibration prevention control but also for photographing condition control in the fourth embodiment.

Figure 10:
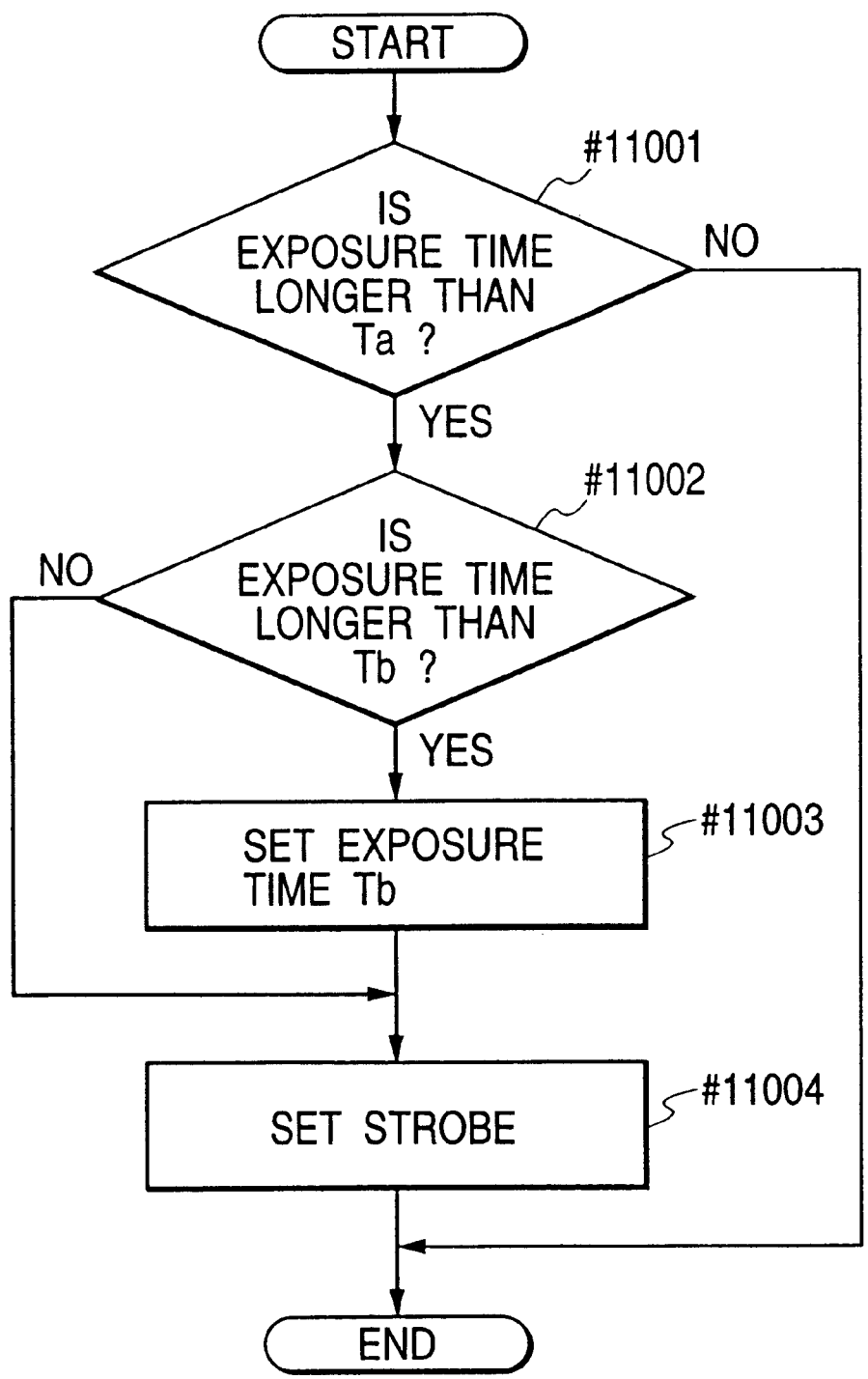
FIG. 10 is a flowchart showing operations of the main members of each of the fourth through sixth embodiments of the present invention.

FIG. 10 is a flowchart descriptive of operations of the main members of the camera having the configuration described above or concrete exposure time control operations for photographing which start upon completing preparations for photographing.

At a step #11001 first, the camera microcomputer 111 judges whether or not an exposure time calculated on the basis of the photometry data from the photometry circuit 115 is longer than Ta ($1/100$ second, for example), terminates this flow when the exposure time is not longer than Ta and executes an exposure operation by controlling the shutter device 113 on the bassis of the calculated exposure time.

When the calculated exposure time is longer than Ta, the camera microcomputer proceeds from the step #11001 to a step #11002 where it judges whether or not the exposure time is longer than Tb ($1/60$ second, for example). When the exposure time is not longer than Tb, the camera microcomputer proceeds directly to a step #11004, but when the exposure time is longer than Tb, the camera microcomputer 111 proceeds to a step #11003 where it fixes the exposure time at Tb so that a longer exposure time is not used for photographing and proceeds to the step #11004. At the step #11004, the camera microcomputer sets the strobe device ready for lighting so that it lights at an exposure time.

That is, when an object is bright (the exposure time is 1/100 second or shorter), the hand vibration is not feared and exposure is executed with the exposure time or when the object is dark (the exposure time is 1/60 second or longer), since the hand vibration is feared, the exposure time is fixed at Tb (fixed Tb is referred to as "a shutter closing time") and the strobe is lighted at a photographing time for correcting under-exposure.

Even in FIG. 10, photographing executed with the calculated exposure time as in the example shown in FIG. 1 when the camera microcomputer does not pass through a step (step #11003) at which the exposure time is fixed.

Figure 11:
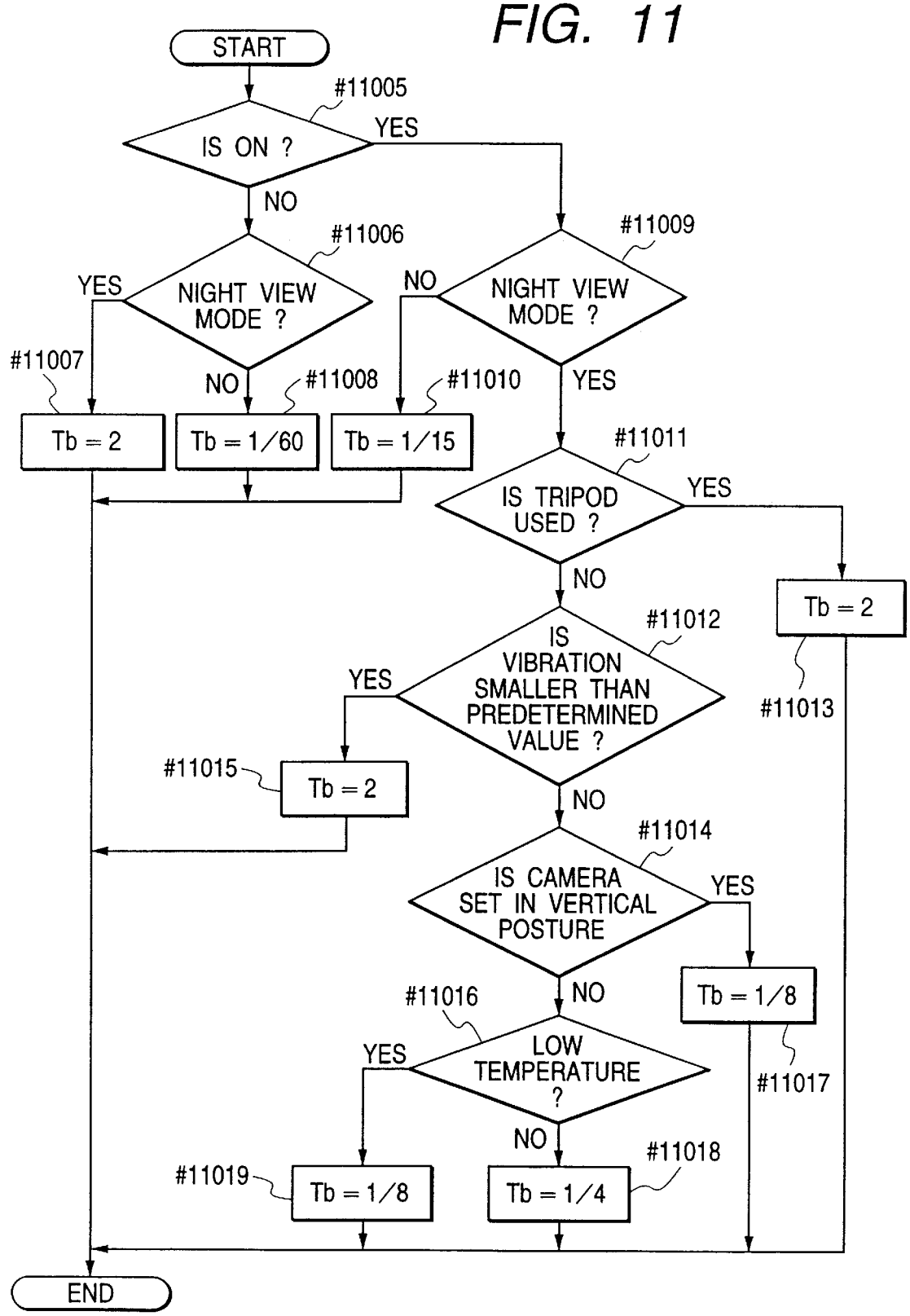
FIG. 11 is a flowchart showing operations to change a shutter closing time for the camera preferred as the fourth embodiment of the present invention.

Values of the Ta and Tb are actually changed dependently on photographing modes and operating conditions of the blur prevention device. FIG. 11 is a flowchart exemplifying steps of operations to change values of the Ta and Tb and description will be made below with reference to this flowchart. These operations are executed after completing preparatory operations for photographing and before starting the flow of operations shown in FIG. 10.

After completing the preparatory operations for photographing in FIG. 11, the camera microcomputer 111 judges at a step #11005 whether or not use of the blur prevention device is denoted by the IS switch 112 and when use of the blur prevention device is not denoted, proceeds to a step #11006 where the camera microcomputer judges whether or not the night view mode is selected by the mode selection member 114. When the night view mode is selected, the camera microcomputer proceeds to a step #11007 where it sets the shutter closing time at Tb to terminate this flow of operations and proceeds to the flow of operations shown in FIG. 10.

In the night view mode where the blur prevention device is not used, the camera microcomputer sets the shutter closing time at 2 seconds like the conventional camera. Since the photographer of course knows in this case that the blur prevention function is inoperative and the night view mode is selected, the photographer pays sufficient attention to the hand vibration during the slow shutter photographing and takes a measure to prevent the vibration, for example, by fixing the camera to a tripod.

When the night view mode is not selected at the step #11006, the camera microcomputer 11 proceeds to a step #11008 where it sets the shutter closing time Tb at 1/60 second to terminate this flow of operations and proceeds to the flow of operations shown in FIG. 10.

Since the photographer does not pay attention to the hand vibration and the blur prevention device is not used for photographing in this case where the night view mode is not selected, the camera microcomputer sets the shutter closing time Tb at 1/60 second or the like and inhibits a longer exposure time from being selected as a measure to prevent the hand vibration during exposure.

When the camera microcomputer judges that use of the blur prevention device is denoted at the step #11005, the camera microcomputer proceeds to a step #11009 where it judges whether or not the night view mode is selected as at the step #11006 and when the night view mode is not selected, the camera microcomputer proceeds to a step #11010 where it sets the shutter closing time Tb at 1/15 second to terminate this flow of operations as at the step #11008 since the night view mode is not selected, thereafter proceeding to the flow of operations shown in FIG. 10. In this case the shutter closing time Tb is set at 1/15 second which is different from the shutter closing time at the step #11008 since the hand vibration is not feared when the blur prevention device is used for photographing.

When the night view mode is selected at the step #11009, the camera microcomputer 111 proceeds to a step #11011 where it judges whether or not the camera is mounted on a tripod (whether or not a tripod is used) on the basis of a signal from the tripod detection circuit 119 and when the tripos is used, the camera microcomputer proceeds to a step #11013 where it sets the shutter closing time Tb at 2 seconds to terminate this flow of operations, thereafter proceeding to the flow of operations shown in FIG. 10.

Since the use of the tripod eliminates the fear of image degradation due to the vibration, the shutter closing time Tb is set at 2 seconds at the step #11013 so that the object is exposed as adequately as possible with the long shutter closing time.

When the camera microcomputer judges that the tripod is not used at the step #11011, it proceeds to a step #11012 where it judges whether or not a vibration is smaller than a predetermined value on the basis of an input from the vibration detection device 116 and proceeds to a step #11015 when the vibration is smaller than the predetermined value. In such a case where a vibration is small as described above, the vibration is extremely small even when the camera is not fixed to a tripod but placed on the ground or pressed to a tree for photographing and the camera microcomputer proceeds to the step #11015.

The camera microcomputer 111 sets the shutter closing time at 2 seconds at the step #11015 as at the step #11013 to terminate this flow of operations and proceeds to the flow of operations shown in FIG. 10. The shutter closing time is set at 2 seconds because the camera eliminates the fear of image degradation due to the vibration when it is fixed for photographing as it is mounted on the tripod.

When the camera microcomputer 111 judges that the vibration is larger than the predetermined value at the step #11012, it proceeds to a step #11014 where it judges whether the camera is set in the horizontal or a vertical posture on the basis of a signal from posture detection circuit 118 and when the camera has the vertical posture, the camera microcomputer 111 proceeds to a step #11017 where it sets the shutter closing time Tb at 1/8 second to terminate this flow of operations, thereafter proceeding to the flow of operations shown in FIG. 10.

Since the camera is designed for easier handling at its horizontal posture, it is liable to be vibrated at its vertical posture. Therefore, the shutter closing time Tb is set shorter for the vertical posture of the camera than that for the vertical posture at the step #11017.

When the camera microcomputer 111 judges that the camera is set in the horizontal posture at the step #11014, it proceeds to a step #11016 where it judges whether or not a temperature is low (0 degree or lower) in an operating environment for photographing on the basis of a signal from the temperature detection circuit 117 and when the temperature is low, the camera microcomputer proceeds to a step #11019 where it sets the shutter closing time Tb at 1/8 second to terminate this flow of operations, thereafter proceeding to the flow of operations shown in FIG. 10.

When the temperature is low in the operating environment for photographing, the shutter closing time Tb is set at short as at the step # 11017 because the numb hands enhance a possibility to cause the hand vibration when the temperature is low in the operating environment.

When it is judged that the temperature is not low in the operating environment for photographing at the step #11016, it proceeds to a step #11018 where it sets the shutter closing time Tb at ¼ second to terminate this flow of operations, thereafter proceeding to the flow of operations shown in FIG. 10.

When the night view mode is selected for photographing with the blur prevention device, the flow often proceeds in an order of the steps #11017, #11018 and #11018 (since t he camera is held by hand for photographing). The shutter closing time Tb for the night view mode without the blur prevention device (2 seconds) is longer than the shutter closing time for the night view mode with the blur prevention device (¼ second or ⅛ second).

Though it may ordinarily be considered that the use of the blur prevention device which lessens the fear of the hand vibration allows a longer shutter closing time to be set, the photographing conditions are controlled as described above to prevent photographing failures from being made due to too much reliance on the blur prevention device which may lead to photographing of quite dark objects while holding the camera by hands.

Needless to say, the photographing is adequately executed by lighting the strobe, and a large vibration generated by the exposure time at 2 seconds can be prevented though the background allows slight under-exposure due to the shutter closing time of ¼ second or ⅛ second which is longer than 2 seconds. The shutter closing time can be prolonged by placing the camera on a tripod or the ground.

The shutter closing times Tb described with reference to FIG. 11 are summarized in FIG. 12.

In the fourth embodiment described above, prevents the hand vibration is prevented without fail by fixing the exposure time at the predetermined shutter closing time (the step #11003 in FIG. 10) when the exposure time calculated from the photometry data (luminance of the object, etc.) is longer than the predetermined shutter closing time (¹⁄₆₀ second, for example) and urging the strobe lighting at a photographing time. Furthermore, in the fourth embodiment, the shutter closing time Tb for the photographing with the blur prevention device is set shorter than that for the photographing without the blur prevention device (the steps #11017, #11018 and #11019 in FIG. 11) (when the night view mode (slow synchro photographing) is selected as a photographing mode in particular), thereby preventing photographing from being failed by taking a photograph a quite dark object while holding the camera by hands through too much reliance on the vibration preventive effect of the blur prevention device.

In the fourth embodiment, the more adequate photography is executed even in the night view mode using the blur prevention device by setting the shutter closing time Tb as long as that for the photography without the blur prevention device (the steps #11013 and #11015 in FIG. 11) when the camera is placed on the ground or the tripod to lower a vibration during the photography. In such a case, even when the above blur prevention device is used, a similar effect can be obtained by making inoperative means which sets a shutter closing time shorter than that for photography without the blur prevention device.

In order to prevent photographing from being failed due to too much reliance on the vibration preventive effect of the blur prevention device, the shutter closing time is set short (the steps #11017 and #11019 in FIG. 11) since the hand vibration is easily generated when the camera has the vertical posture or an ambient temperature is low at a photographing time.

The fourth embodiment which controls these photographing conditions allows any person to easily obtain photographs free from vibrations.

Fifth Embodiment

In contrast to the fourth embodiment in which is judged whether or not the camera is firmly fixed by utilizing the outputs from the tripod detection circuit 119 or the vibration detection device 116 and the shutter closing time Tb is determined based on the result of this judgement, the fifth embodiment of the present invention adopts a configuration which does not use the above-mentioned tripod detection circuit 119 but provides a similar effect to configure a camera more compact. Other components of the fifth embodiment are the same as those of the fourth embodiment described above.

In the fifth embodiment of the present invention, "hand held night view mode" and "tripod night view mode" are selectable as the night view mode with the mode selection member 114. The tripod night view mode only uses a long shutter closing time, whereas the hand held night view modes adopts a shutter closing time which is not so long to cope with the hand vibration.

Figure 13:
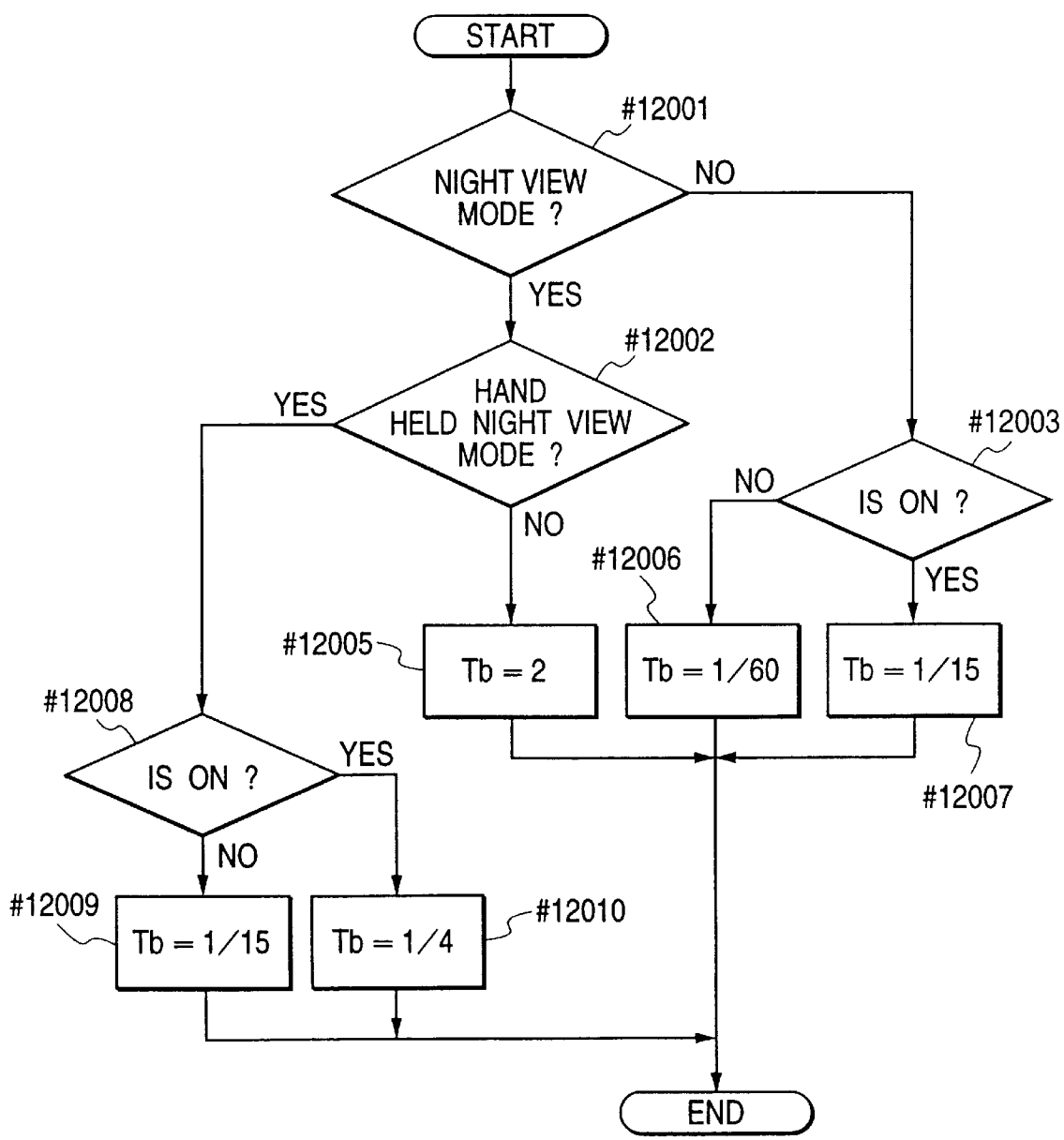
FIG. 13 is a flowchart showing operations to change a shutter closing time for the camera preferred as the fifth embodiment of the present invention.

FIG. 13 is a flowchart showing operations main members (corresponding to the operations shown in the flowchart presented as FIG. 11) of a camera preferred as the fifth embodiment which start upon completing preparatory operations for photography.

At a step #12001 first, the camera microcomputer 111 judges whether or not the night view mode is selected as a photographing mode by the mode selection member 114 and proceeds to a step #12002 when the night view mode is selected or otherwise proceeds to a step #12003.

At the step #12002, the camera microcomputer 111 judges whether the night view mode is the hand held night view mode or the tripod night view mode and when the hand held night view mode is selected, the camera microcomputer 111 proceeds to a step 12008 where it judges whether or not the blur prevention device is used. As a result, when the blur prevention device is used, the camera microcomputer 111 proceeds to a step #12010 where it sets the shutter closing time at ¼ second to terminate this flow of operations, thereafter proceeding to the flow of operations shown in FIG. 10.

Since it is necessary to take a measure to prevent the hand vibration for photographing a night view while holding the camera by hand, a shutter closing time is set not so long but set at ¼ second even when the blur prevention device is used.

When the camera microcomputer 11 judges that the blur prevention device is not used at the step #12008, it proceeds to a step #12009 where it set the shutter closing time Tb at ¹⁄₁₅ second.

Since attention must be paid to the hand vibration when the blur prevention device is not used, the shutter closing time is set at ¹⁄₁₅ second as described above.

When the camera microcomputer 11 judges that the tripod night view mode is selected at the step #12002, it proceeds to a step #12005 where it prolongs the shutter closing time Tb to 2 seconds since the hand vibration is not feared. When the tripod night view mode is selected, the blur prevention device is unnecessary and may be turned off forcibly.

When the camera microcomputer 11 judges that a mode other than the night view mode is selected at the step #12001, it proceeds to the step #12003 as described above where it judges whether or not the blur prevention device is used as at the step #12008 and proceeds to a step #12007 when the blur prevention device is used or otherwise proceeds to a step #12006.

Though it is unnecessary to select a long shutter closing time for the mode other than the night view mode, a shutter closing time is set longer within a range which allows no hand vibration so that a main object and its background are exposed adequately.

At the step 12007, the camera microcomputer 111 sets the shutter closing time at 1/15 second. This is because the hand vibration is not feared up to this shutter closing time when the blur prevention device is not used. At the step #12006, on the other hand, the camera microcomputer 111 sets the shutter closing time at 1/60 second as a measure to prevent the hand vibration while the blur prevention device is not used.

FIG. 14 summarizes relationship among the photographing modes, use of the blur prevention device and the shutter closing times.

In the fifth embodiment described above, the camera includes the hand held night view mode and the tripod night view mode as the night view mode, the shutter closing time of the hand held night view mode is set longer that for the ordinary photographing mode and the shutter closing time of the tripod night view mode is set further longer since the hand vibration is less feared. The fifth embodiment which is configured as described above makes it possible to omit the tripod detection circuit, thereby permitting simplifying a configuration of the camera, configuring the camera more compact and lowering a manufacturing cost of the camera, and allows a photographer to take a measure to prevent the hand vibration by himself while freely selecting a shutter closing time.

Sixth Embodiment

In the fourth and fifth embodiments described above, the shutter closing time Tb is changed dependently on factors such as turning on or off of the vibration prevention device, the photographing modes and camera postures. However, the camera is liable to be vibrated in conditions which are produced by factors other than those mentioned above. When the camera is operated for photography immediately after it is held by a photographer, for example, it is often not held firmly and liable to be vibrated.

In the sixth embodiment of the present invention, a shutter closing time is set short when the camera is operated for photography a short time after it is held as a measure to cope with a vibration and the under-exposure caused due to the short shutter closing time is compensated by lighting the strobe. For example, a timer is started when the release button is half depressed (s1 is turned on) and the shutter closing time Tb is inhibited from being prolonged before a predetermined time elapses.

Figure 15:
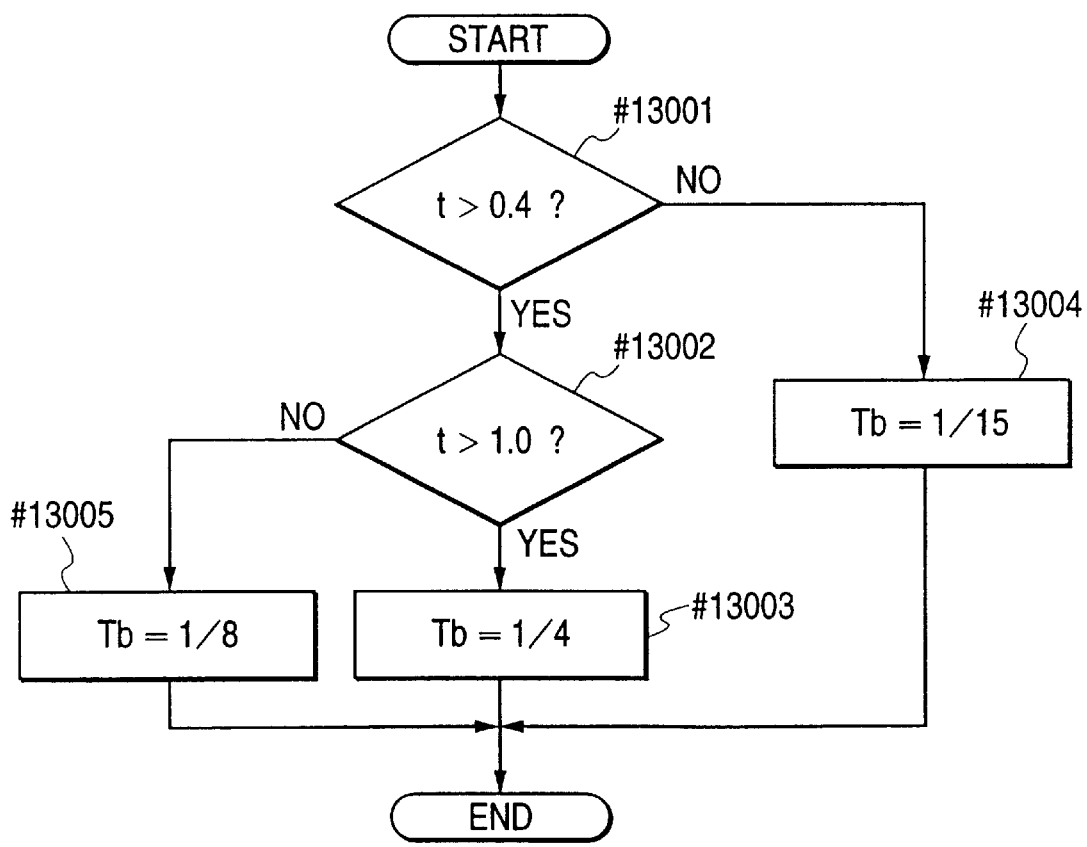
FIG. 15 is a flowchart showing operations to change a shutter closing time for the camera preferred as the sixth embodiment of the present invention.

FIG. 15 is a flowchart showing operations of members which changes a shutter closing time in a camera as the sixth embodiment which start when the release button is depressed completely (s2 is turned on). The timer starts when the release button is half depressed (s1 is turned on).

At a step #13001, the camera microcomputer 111 judges whether or not a count time t on the timer which starts upon the half depression of the release button reaches 0.4 second and when the count t reaches 0.4 second, the camera microcomputer 111 proceeds to a step #13002 where it judged whether or not the count time t on the timer reaches 1 second. When the count time t exceeds 1 second, the camera microcomputer 111 proceeds to a step #13003 where it sets the shutter closing time Tb at ¼ second to terminate this flow of operations. When the count time t does not reach 1 second, the camera microcomputer 111 proceeds to a step #13005 where it sets the shutter closing time Tb at ⅛ second to terminate this flow of operations.

When the count time t does not reach 0.4 second at the step #13001, the camera microcomputer 11 proceeds to a step #13004, where it sets the shutter closing time at 1/15 second to terminate this flow of operations.

On the basis of the flow of operations described with reference to FIG. 10, on the basis of a photographing shutter speed on exposure time or the like calculated from the brightness the shutter closing time Tb determined as described above, it is determined whether or not the strobe is to be used on the basis of the flow described with reference to FIG. 10.

In the sixth embodiment described above, since the shutter closing time Tb is set at a short time (the step #13004 in FIG. 15) the photographing failure due to the hand vibration can be reduced in such a case where the camera is operated for photographing (the release button is depressed completely) immediately after the camera is held (the release button is half depressed).

Though the timer is started when the release button is half depressed in this case, it may be modified to judge that the camera is held, for example, when an output from the vibration detection device becomes within a predetermined range, start the timer, and the shutter closing time Tb is changed dependently on a time elapsed from the start of the timer to the complete depression of the release button. (The timer is reset when the output from the vibration detection device exceeds the predetermined value during the counting operation of the timer.)

Though the flow advances to the step #13004 where it sets the shutter closing time Tb at 1/15 second when the count time t on the timer does not reach 0.4 second, every moment a time elapsed from the start of the timer to the complete depression of the release button are checked and the shutter closing time is prolonged as the elapsed time is longer.

As understood from the foregoing description, the fourth through sixth embodiments of the present invention described above provide cameras which are capable of securely preventing photographing from being failed due to too much reliance on the vibration preventive effect of the blur prevention device.

Furthermore, the fourth through sixth embodiments of the present invention described above provide cameras which are capable of photographing objects while making most of the characteristic of the blur prevention device and exposing the objects more adequately.

Furthermore, the fourth through sixth embodiments of the present invention described above provide cameras which are configured by being compact, manufactured at low costs and capable of photographing night views with adequate exposure not only when the cameras are held by hands but also when the camera are fixed to tripods.

Moreover, the fourth through sixth embodiments of the present invention described above provide cameras which are capable of photographing with suppressed vibration even when photographing operations are started a short time after start of preparatory operations for photographing.

Seventh Embodiment

Figure 16:
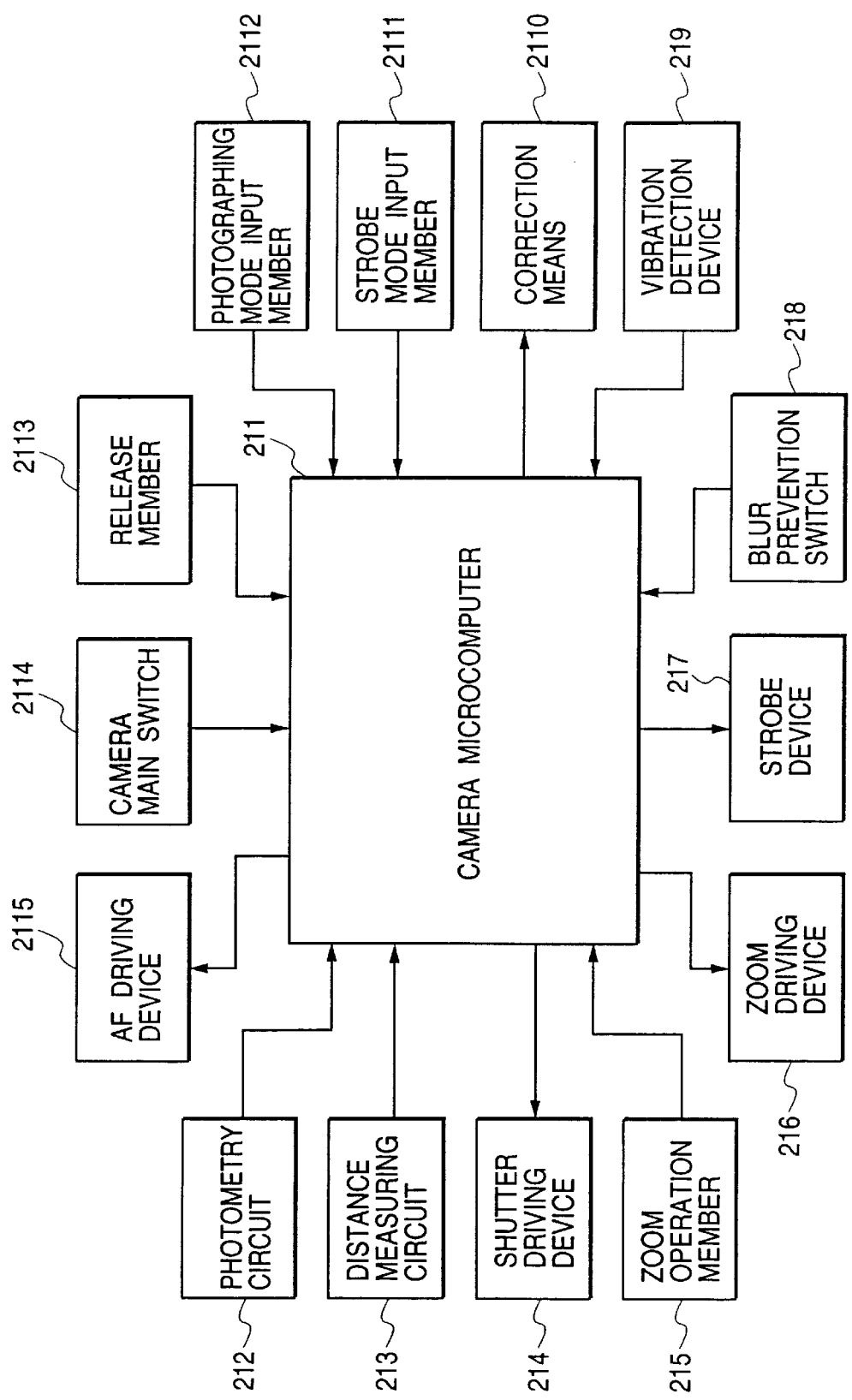
FIG. 16 is a block diagram showing an electrical configuration of main members of a vari-focal camera preferred as a seventh embodiment of the present invention.

FIG. 16 is a block diagram showing an electrical configuration of main members of a vari-focal camera preferred as the seventh embodiment of the present invention wherein other components of the camera are omitted for simplicity of description.

When a signal is inputted from a camera main switch 2114 into a camera microcomputer 211 in FIG. 16, the camera microcomputer 211 moves a photographic lens barrel from a collapsed condition to a condition where an optical system is ready for photographing and opens a lens barrier. Furthermore, the camera microcomputer 211 starts a vibration detection device 219 at this time. A photographing mode selected by a photographer is inputted into the camera microcomputer 211 from a photographing mode input member 2112. The vari-focal camera is equipped with a sport mode suited for photographing an object which is moving, a portrait mode suited for closeup photographing a person, a macro mode suited for closeup photographing an object and a night view mode suited for photographing a night view.

A strobe mode is inputted into the camera microcomputer 211 from a strobe mode input member 2111. The strobe mode includes a strobe off mode which does not use a strobe device, a strobe on mode which forcibly light the strobe device and a strobe auto mode which controls the strobe device so that it is lighted or not dependently on luminance of an object, directions of rays and the like, and is capable of determining to active or inactive a red-eye moderating function during the strobe lighting.

When the photographer manipulates blur a prevention switch 218 to determine whether or not vibration is to be corrected during photographing, data of the determination is inputted into the camera microcomputer 211. When the photographer holds the camera and manipulates a zoom operation member 215, a signal is inputted into the camera microcomputer 211, which controls a zoom driving device 216 to change a photographing focal length. When the photographer half depresses a release member (release button) 2113 after the photographing focal length is determined as described above, the camera microcomputer 211 obtains a distance to an object (distance measuring data) by driving a distance measuring circuit 213 at this timing and controls on the basis of this data an AF driving device 2115, which adjust a focal length of the photographic optical system by driving partially or entirely the photographic lens barrel on the basis of the distance measuring data. Since vibration data is inputted into the camera microcomputer 211 from the vibration detection device 219 at this time, the camera microcomputer 211 judges from the vibration data whether the camera is held by hand or fixed to a tripod or the ground. Though the vibration detection device 219 may be started when the release member 2113 is half depressed, in the seventh embodiment, the vibration detection device 219 is started when the camera main switch is turned on since the vibration detection device 219 exhibits a low vibration detection reliability immediately after it is started.

When the photographer half depresses the release member 2113, the camera microcomputer 211 obtains luminance of the object (photometry data) by driving a photometry circuit 212 at this timing, calculates an exposure time on the basis of photographing data so far obtained such as the photometry data, a sensitivity and a kind of a film, an operating condition of the vibration prevention system, the photographing focal length, brightness of a lens, a photographing mode, a selection of the vibration correction, the distance measuring data and a vibration signal, and determines whether or not the strobe device is to be used.

When the release member 2113 is completely depressed, the camera microcomputer 211 starts correcting a vibration by controlling correction means 2110 having the configuration shown in FIG. 29 on the basis of a vibration signal provided from the vibration detection device 219. Then, the camera microcomputer 211 exposes the film by controlling a shutter driving device 214 and lights the strobe device 217 as occasion demands.

In the seventh embodiment, a film exposure time and the strobe lighting are delicately controlled dependently on photographing conditions for the camera as described below with reference to FIGS. 17 through 24.

Figure 17:
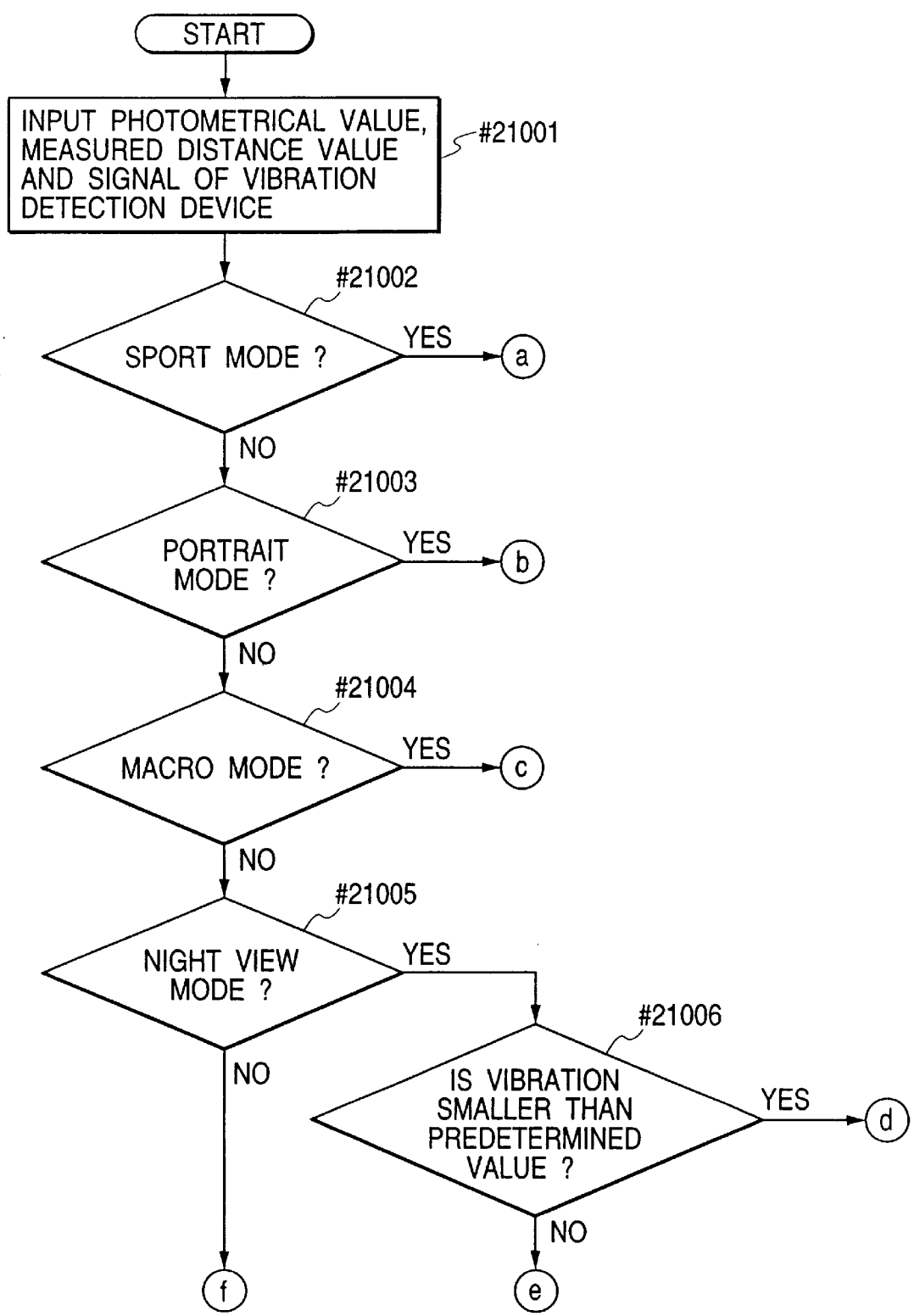
FIG. 17 is a flowchart showing operations of the main member of the vari-focal camera preferred as the seventh embodiment of the present invention.

When the release member 2113 is half depressed, the camera microcomputer starts operations shown in FIG. 17.

At a step #21001 first, drives the photometry circuit 217, the distance measuring circuit 213 and the vibration detection device 219 are driven, thereby obtaining the photometry data, the distance measuring data and the vibration data. At this time, photographing mode data and strobe mode data have already been input from the photographing mode input member 2112 and the strobe mode input member 2111 respectively. Let us assume that photographing focal length data has already been determined.

At a next step #21002, it is judged whether or not the sport mode is selected as a photographing mode and the flow advances to a step #21007 when the sport mode is selected or otherwise advances to a step #21003. At the step #21003, it is judged whether or not the portrait mode is selected as the photographing mode and the flow advances to s step #21018 when the portrait mode is selected or otherwise advances to a step #21004. At the step #21004, it is judged whether or not the macro mode is selected as the photographing mode and the flow advances to a step #21019 shown in FIG. 20 when the macro mode is selected or otherwise advances to a step #21005.

Figure 22:
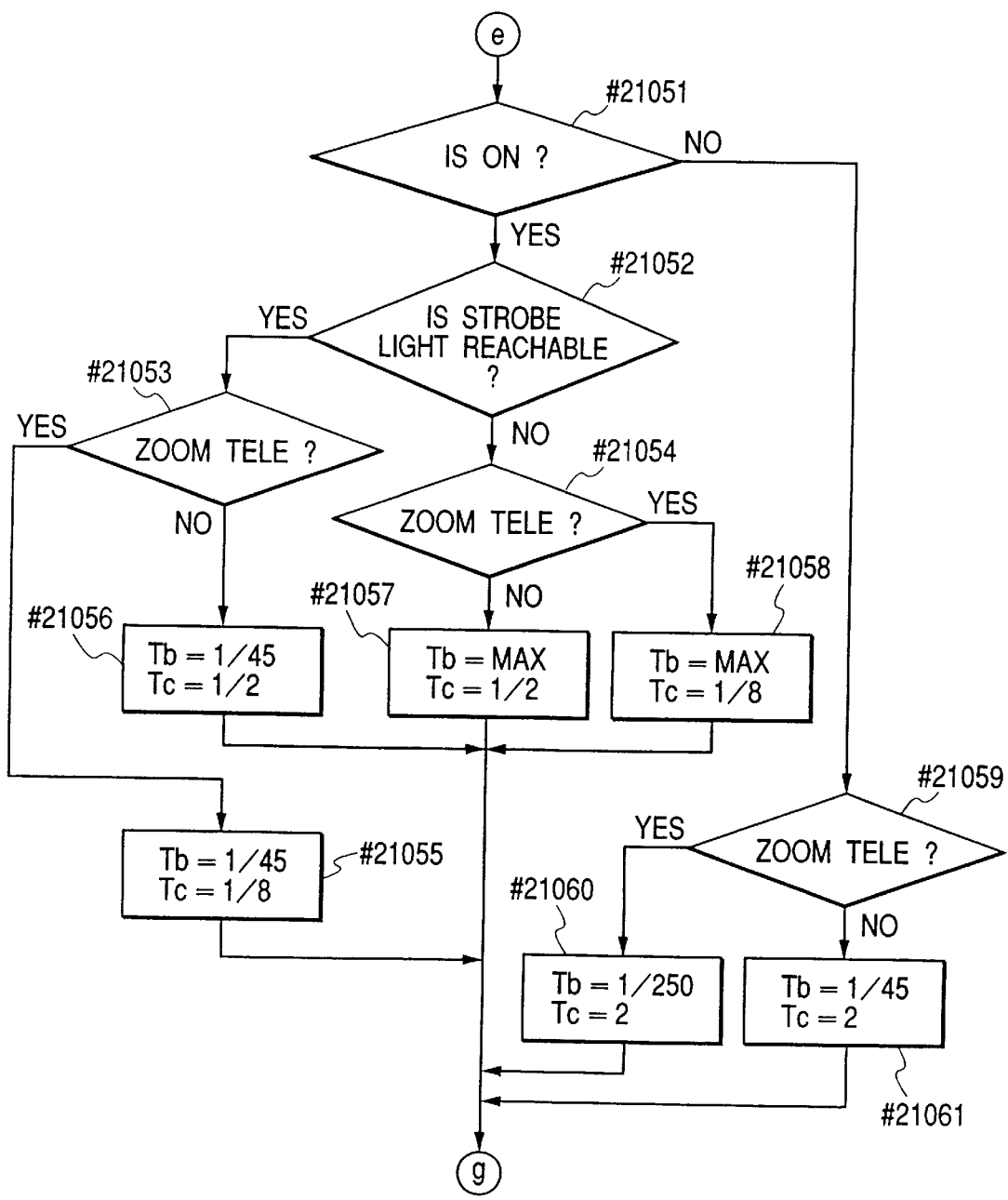
FIG. 22 is a flowchart showing operations which are executed subsequently to those shown in FIG. 17 when the night view mode (large vibration) is judged.
Figure 23:
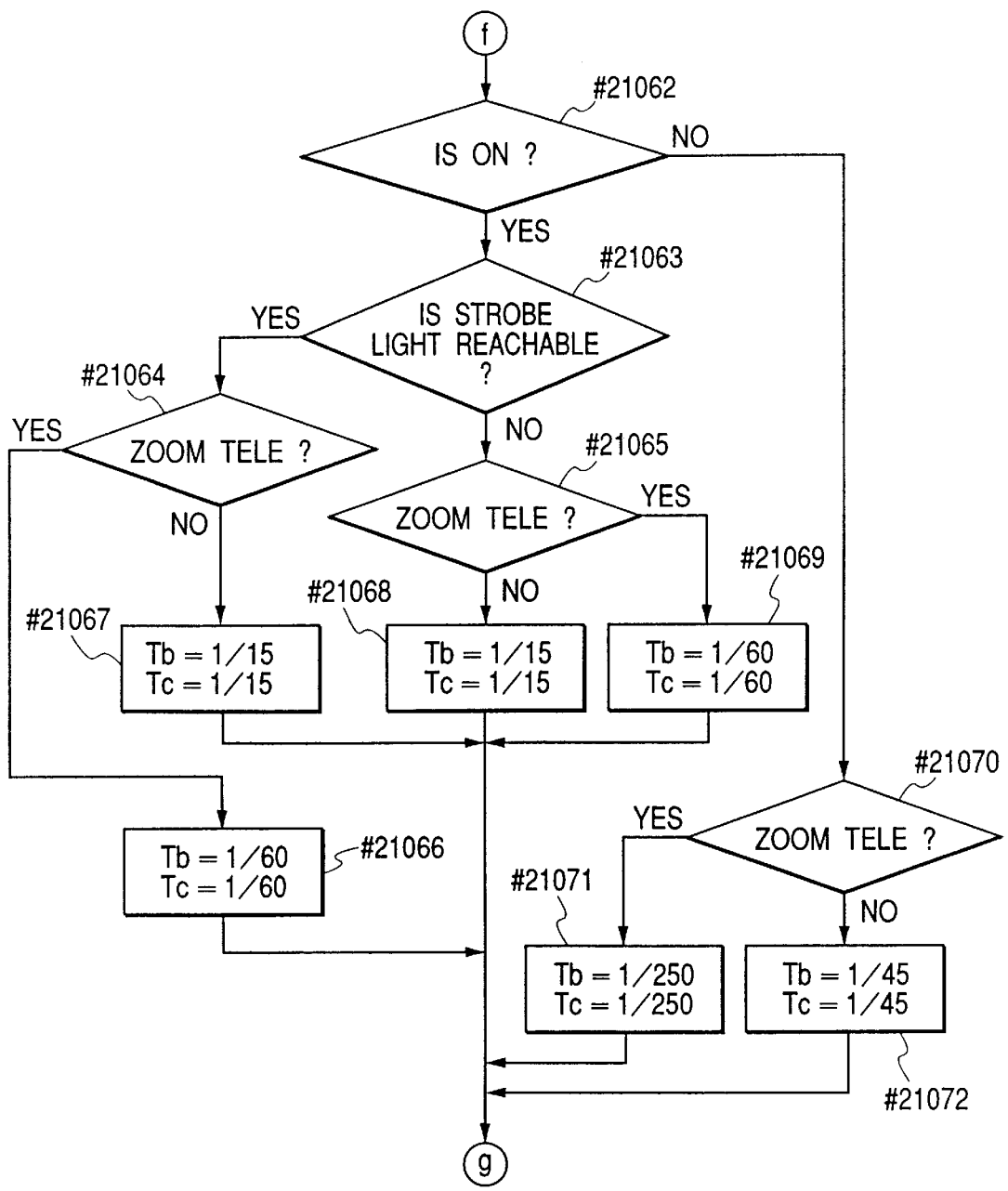
FIG. 23 is a flowchart showing operations which are executed subsequently to those shown in FIG. 17 when an automatic mode is judged.

At the step #21005, it is judged whether or not the night view mode is selected as the photographing mode and the flow advances to a step #21006 when the night view mode is selected or otherwise advances to a step #21062 shown in FIG. 23. At the step #21006, it is judged whether or not a vibration is smaller than a predetermined value and proceeds to a step #21040 shown in FIG. 21 when it judges that the camera is fixed to the tripod or the ground and the vibration is small or the flow advances to a step #21051 shown in FIG. 22 when it is judged that the vibration is larger than the predetermined value and the camera is held by hand.

Operations in each photographing mode will be described below with reference to FIGS. 18 through 23.

First, operations in the sport mode will be described with reference to a flowchart shown in FIG. 18.

Figure 18:
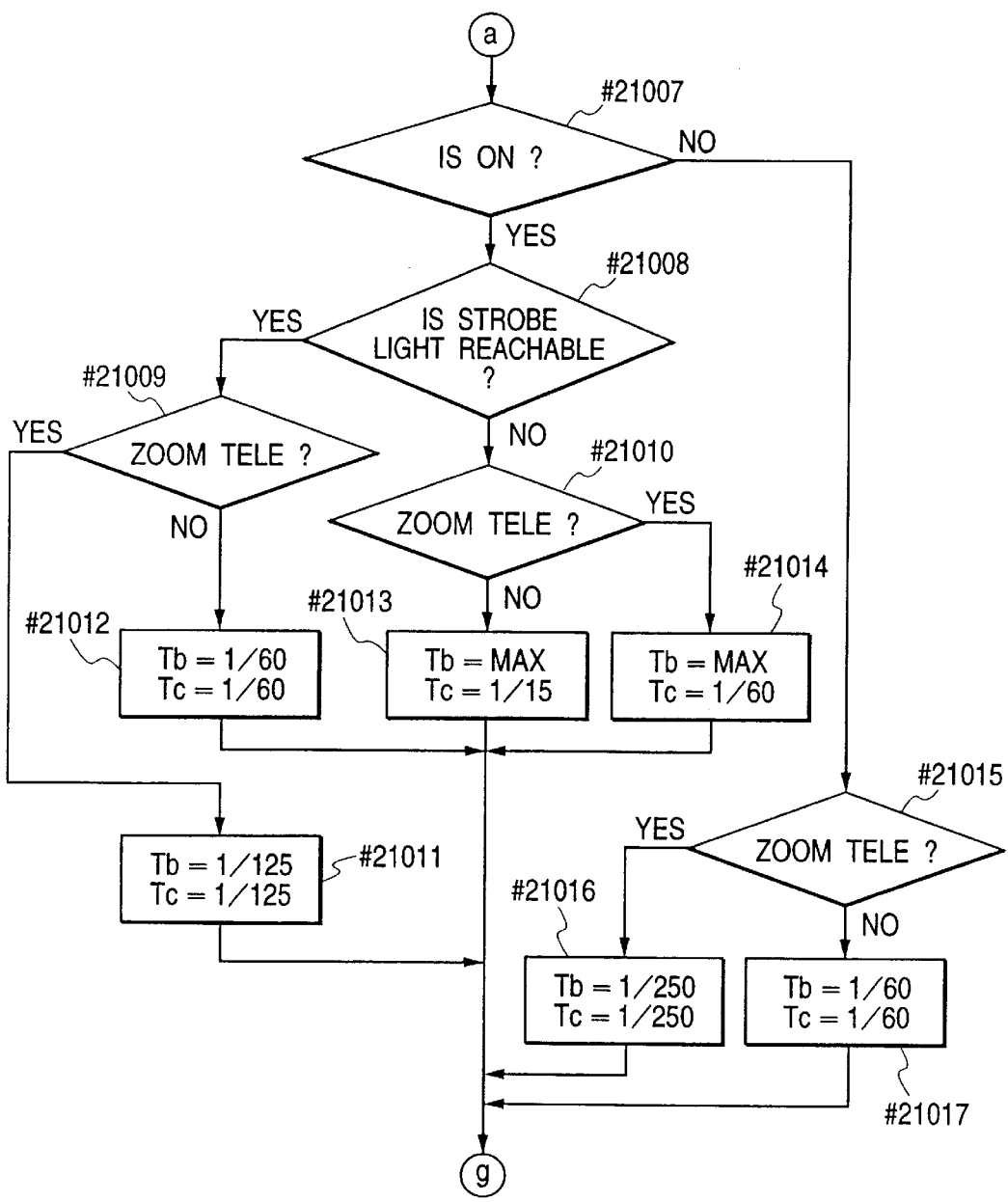
FIG. 18 is a flowchart showing operations which are executed subsequently to those shown in FIG. 17 when a sport mode is judged.

At the step #21007 shown in FIG. 18, it is judged from a state of the blur prevention (IS) switch 218 whether or not the blur prevention device is in an operating condition and the flow advances to a step #21008 when vibration correction is denoted for exposure or otherwise advances to a step #21015.

At the step #21008, it is judged whether or not the strobe light reaches the object from the distance measuring data from the photometry circuit 213 on the basis of a film sensitivity and a photographing focal length at this time and the flow advances to a step #21009 when the strobe light reaches the object or otherwise advances to a step #21010. When the object is not exposed adequately by the strobe light but under-exposed two or three steps, it is judged that the strobe light reaches the object.

At the step #21009, it is judged whether or not the photographing focal length is on a tele side or a wide side taking as a boundary, for example, a boundary of a focal length is 90 mm of with respect to a new photographing system camera (hereinafter referred to as ASP camera), when a photographing focal lengths is within from 30 to 150 mm. The flow advances to a step #21011 when the focal length is longer than 90 mm or otherwise it advances a step #21012.

Figure 24:
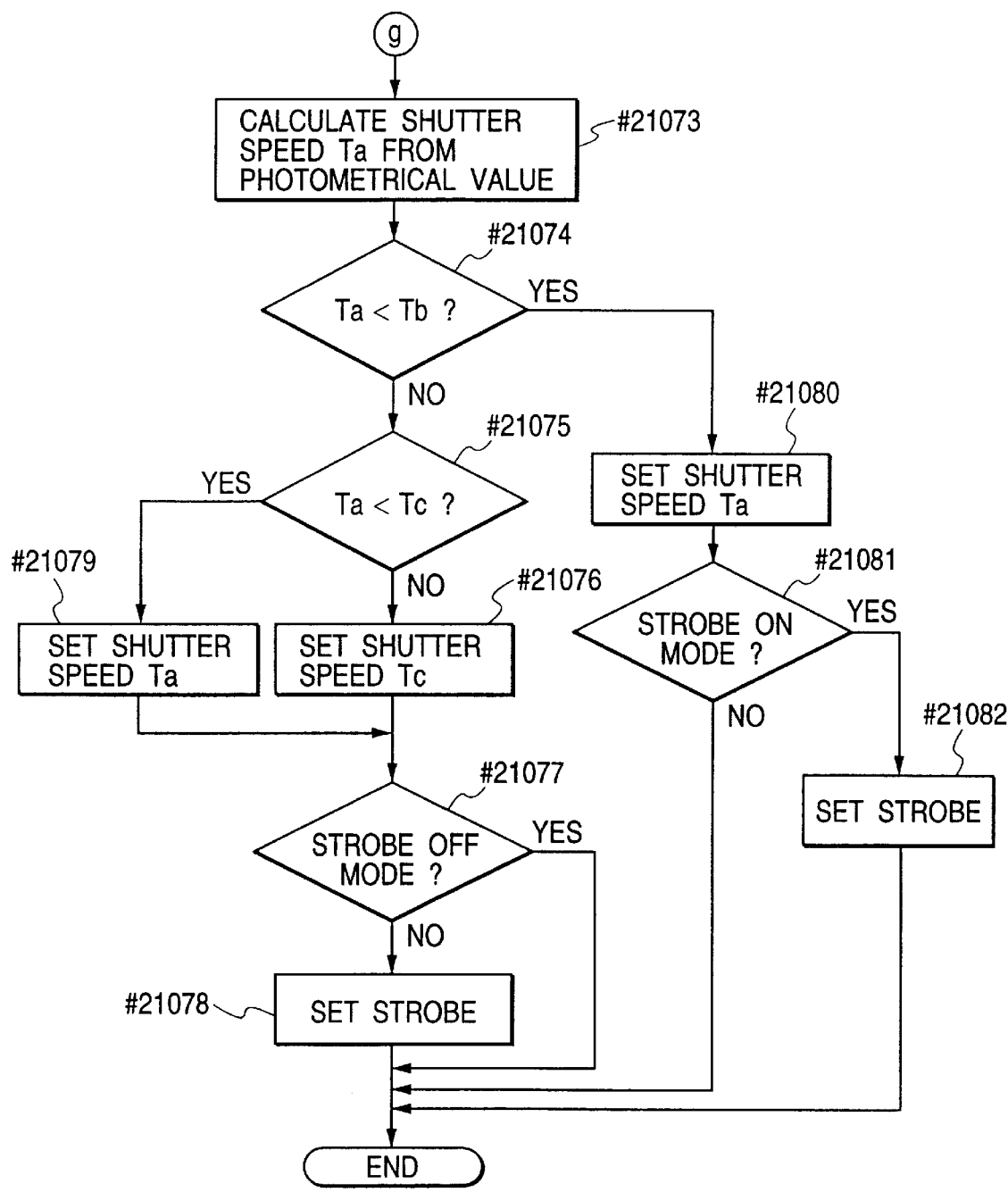
FIG. 24 is a flowchart showing operations which are executed subsequently to those shown in FIGS. 18 through 23.

At the step #21011, the strobe lighting start time and the shutter closing time are set at "Tb=$1/125$ second" and "Tc=$1/125$ second" respectively, and the flow advances to a step #21073 shown in FIG. 24. The strobe lighting start time Tb is used to control the camera so that the strobe is lighted when the shutter speed Ta calculated from the photometry data (object luminance data), the film sensitivity data and the brightness of the lens at the photographing focal length does not exceeds $1/125$ second. The shutter closing time is used to control the camera so that it is inhibited from executing photographing with a shutter speed longer than $1/125$ second but it executes photographing with an exposure time of $1/125$ second when the shutter speed Ta as described above does not exceed $1/125$ second.

At the step #21012, similarly the strobe lighting start time Tb and the shutter closing time Tc are set at "Tb=$1/60$ second" and "Tc=$1/60$ second" respectively, and proceeds to the step #21073 shown in FIG. 24.

In a conventional camera which is not equipped with the blur prevention device, for executing the photographing in condition with the photographing focal lengths from 30 to 150 mm, it is necessary to prevent the hand vibration by controlling a shutter speed as described below.

Assuming that a camera of an ASP format has an aspect ratio which is substantially the same as that of a film of a 135 format, a focal length of the camera is about 1.4 times as long as a focal length expressed in terms of the 135 format. Therefore, the focal lengths of 30 to 150 mm are converted into focal lengths of 42 to 210 mm of a conventional camera. It is generally said that a shutter speed of 1/focal length is required to prevent the hand vibration of a camera of the 135 format and it is desirable to operate a camera which has such focal length s at a shutter speed of $1/45$ to $1/250$ second for photographing. Furthermore, the blur prevention device exhibits an effect to prevent the hand vibration corresponding to two steps in terms of a shutter speed and makes it possible to operate the camera at a shutter speed of $1/10$ to $1/60$ second.

When the blur prevention device is used, it is therefore sufficient to set the shutter closing time Tc at $1/60$ and $1/10$ second in a zoom tele condition and in a zoom wide condition respectively, but in the sport mode where an object moves speedily, the object vibration may be produced though the hand vibration is not produced at a slow (long) shutter speed. This object vibration can be prevented by enhancing the shutter speed and is more liable to be produced at a higher photographing magnification. That is, the object vibration is liable to be produced when an object is close to the camera in the zoom tele condition and when the object moves speedily of course, whereby a shutter speed of $1/60$ to $1/125$ second is required for the camera which has the focal lengths described above.

For this reason, the shutter closing time Tc is not prolonged at the step #21011 or #21012 even when the blur prevention device is used. Furthermore, strobe lighting start time Tb is set short since the object may be under-exposed when the shutter closing time Tc is short and the strobe is lighted early to stop a movement of the object.

When it is judged that the strobe light does not reach the object, the flow advances as described above from the step #21008 to the step #21010 where it is judged whether or not the photographing focal length is on the tele side or the wide side and when the photographing focal length is long, it advances to a step #21014 or otherwise advances to a step #21013.

At the step #21013, the strobe lighting start time Tb is set at MAX since the strobe light does not reach the object. The expression MAX means the time which is set as a shutter time longer than a longest time of the shutter speed Ta set in the camera and "Tb=MAX" means that the strobe is not lighted. Furthermore, the shutter closing time Tc is set at $1/15$ second and the flow advances to the step #21073 shown in FIG. 24. The strobe lighting is inhibited for electric power saving and the shutter closing time is set at $1/15$ second to prevent an object from being under-exposed since the camera is set in the zoom wide condition and the object is located at a long distance beyond the reach of the strobe light when the flow advances to the step #21013. In addition, the long shutter closing time Tc poses no problems since a photographing magnification is low and the object vibration is not feared when camera is in the zoom wide condition and the object is located at the long distance.

At the step #21014, the strobe lighting start time is also set at MAX to inhibit the strobe from being lighted and the shutter closing time Tc is set at "Tc=$1/60$ second", thereafter the flow advances to the step #21073 shown in FIG. 24. In this case, the shutter closing time Tc is set at $1/60$ second since the camera is set in the zoom tele condition and the strobe is not lighted, thereby making it necessary to compensate for under-exposure. In this case also, the object vibration is not feared since the camera is located at the long distance from the object.

When the correction of vibration during exposure is not denoted at the step #21007, the flow advances to a step #21015 where it is judged whether the photographing focal length is on the tele side or the wide side and when the photographing focal length is long, the flow advances to a step #21016 or otherwise the advances to a step #21017.

At the step #21016, the strobe lighting start time Tb and the shutter closing time Tc are set at "Tb=$1/250$ second" and "Tc=$1/250$ second" respectively, thereafter the flow advances to the step #21073 shown in FIG. 24. Since the camera is set in the zoom tele condition for photographing without the blur prevention device, the shutter closing time Tc is set at $1/250$ second and the strobe is lighted to compensate for under-exposure.

At the step #21017, the strobe lighting start time Tb and the shutter closing time Tc are set at "Tb=$1/60$ second" and "Tc=$1/60$ second" respectively, thereafter the flow advances to the step #21073. Since the camera is set in the zoom wide condition for photographing without the blur prevention device, the shutter closing time Tc is set at $1/60$ second to prevent the hand vibration and the object vibration.

Now, description will be made of operations in the portrait mode with reference to a flowchart shown in FIG. 19.

Figure 19:
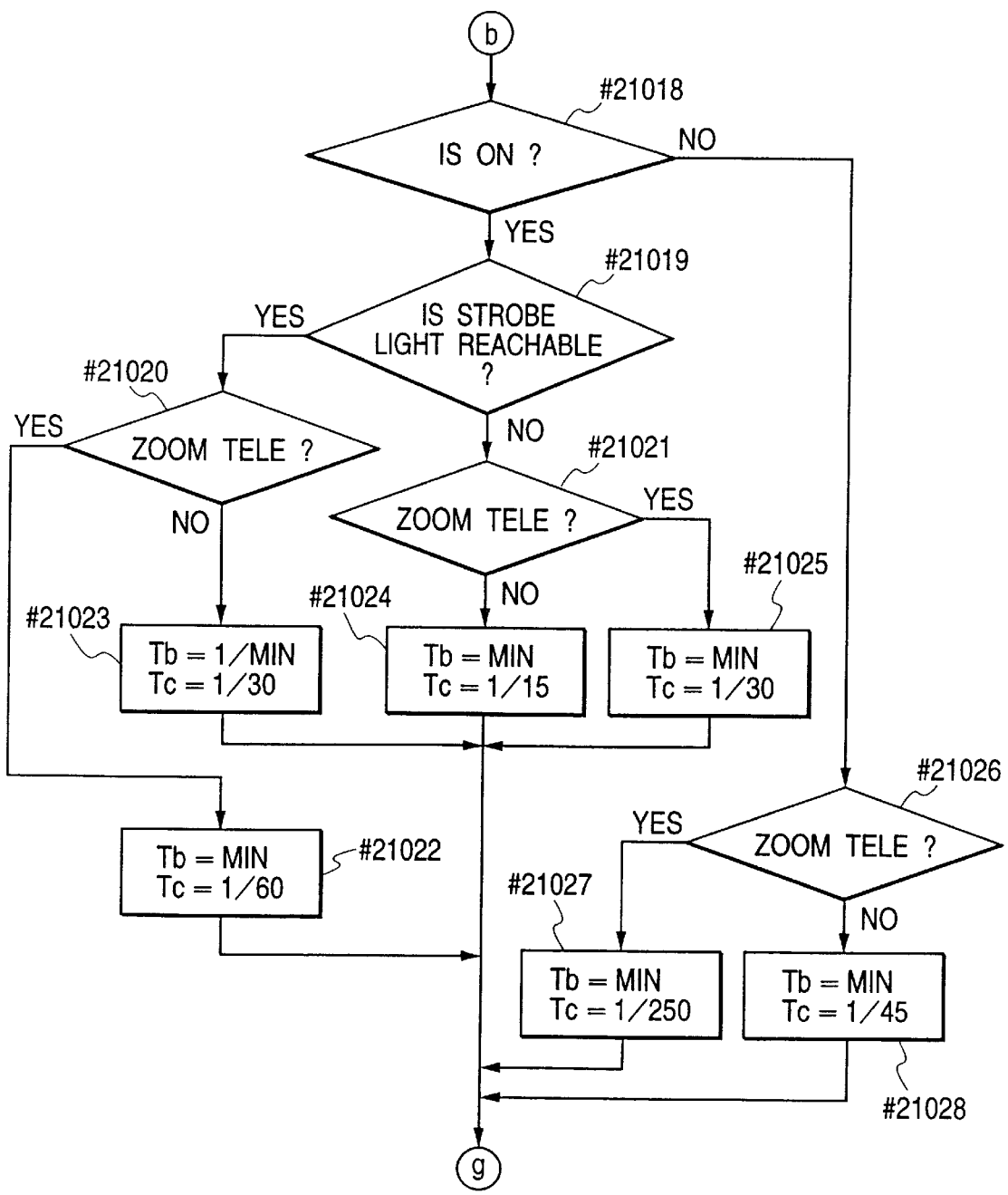
FIG. 19 is a flowchart showing operations which are executed subsequently to those shown in FIG. 17 when a portrait mode is judged.

At a step #21018 shown in FIG. 19, it is judged whether or not the blur prevention device is in an operating condition and when the blur prevention is denoted for exposure, the flow advances to a step #21019 or otherwise advances to a step #21026.

At the step #21019, it is judged whether or not the strobe light reaches the object from the distance measuring data from the distance measuring circuit 213, a film sensitivity and a photographing focal length at that time and when the strobe light reaches the object, the flow advances to a step #21020 or otherwise advances to a step #21021. It is judged that the strobe light reaches the object when the object will not be exposed adequately to the strobe light but underexposed at two or three steps.

At the step #21020, it is judged whether or not the photographing focal length is on the tele side or the wide side and when the photographing focal length is long, the flow advances to a step #21022 or when the photographing focal length is short, the flow advances to a step #21023.

At the step #21022, the strobe lighting start time Tb and the shutter closing time Tc are set at "Tb=MIN" and "Tc=1/60 second", thereafter the flow advances to the step #21073 shown in FIG. 24. The expression MIN means, a shutter time shorter than a longest time of the shutter speed Ta set by the camera and "Tb=MIN" means that the strobe is always lighted.

At the step #21023, similarly the strobe lighting start time and then shutter closing time Tc are set at "Tb=MIN" and "Tc=1/30 second", thereafter the flow advances to the step #21073 shown in FIG. 24.

In the portrait mode, the strobe is always lighted to give a catch light to the object. The shutter closing time Tc is prolonged to a limit level for the photographing with the blur prevention device to adequately expose the background to which the strobe light does not reach. Taking the object vibration into consideration in the portrait mode, the shutter closing time Tc is set not at a longest 1/10 second but at 1/30 second even in the zoom wide condition.

When it is judged that the strobe light does not reach the object, the flow advances as described above from the step #21019 to the step #21021 where it is judged whether the photographing focal length is on the tele side or the wide side and when the photographing focal length is long, the flow advances to a step #21025 or when the photographing focal length is short, advances to a step #21014.

At the step #21024 also, the strobe lighting start time Tb and the shutter closing time Tc are set at MIN and 1/15 second respectively, thereafter the flow advances to the step #21073 shown in FIG. 24. Though the strobe light does not reach the object, the strobe is lighted to obtain a vivid photograph of a person by reflecting the strobe light even slightly on an eye of the person. Furthermore, the shutter closing time Tc is set at 1/15 second since the object is located at a long distance and the object vibration is not feared.

At the step #21025 also, the strobe lighting start time Tb is set at MIN so that the strobe is always lighted and the shutter closing time Tc is set at 1/30 second, thereafter the flow advances to the step #21073 shown in FIG. 24. To expose the person as adequately as possible in the portrait mode, the shutter closing time Tc is set at 1/30 second which is one step longer than the shutter time of 1/60 second which is a limit of the hand vibration in the zoom tele condition.

When the vibration correction during exposure is not denoted, the flow advances as described above from the step #21018 to the step #21026 where it is judged whether the photographing focal length is on the tele side or the wide side and when the photographing focal length is long, the flow advances to a step #21027 or otherwise advances to a step #21028.

At the step #21027, the strobe lighting start time Tb and the shutter closing time Tc are set at "Tb=MIN" and "Tc=1/250 second" respectively, thereafter the flow advances to the step #21073 shown in FIG. 24. Since the photography is executed in the zoom tele condition without using the blur prevention device in this case, the shutter closing time Tc is set at 1/250 second as a measure to prevent the hand vibration and the strobe is always lighted to obtain a catch light.

At the step #21028, the strobe lighting start time and the shutter closing time Tc are set at "Tb=MIN" and "Tc=1/45 second" respectively, thereafter the flow advances to the step #21073 shown in FIG. 24. Since the photography is executed in the zoom wide condition without using the blur prevention device in this case, the shutter closing time Tc is set at 1/45 second as a measured to prevent the hand vibration.

Now, description will be made of operations in the macro mode with reference to a flowchart shown in FIG. 20.

Figure 20:
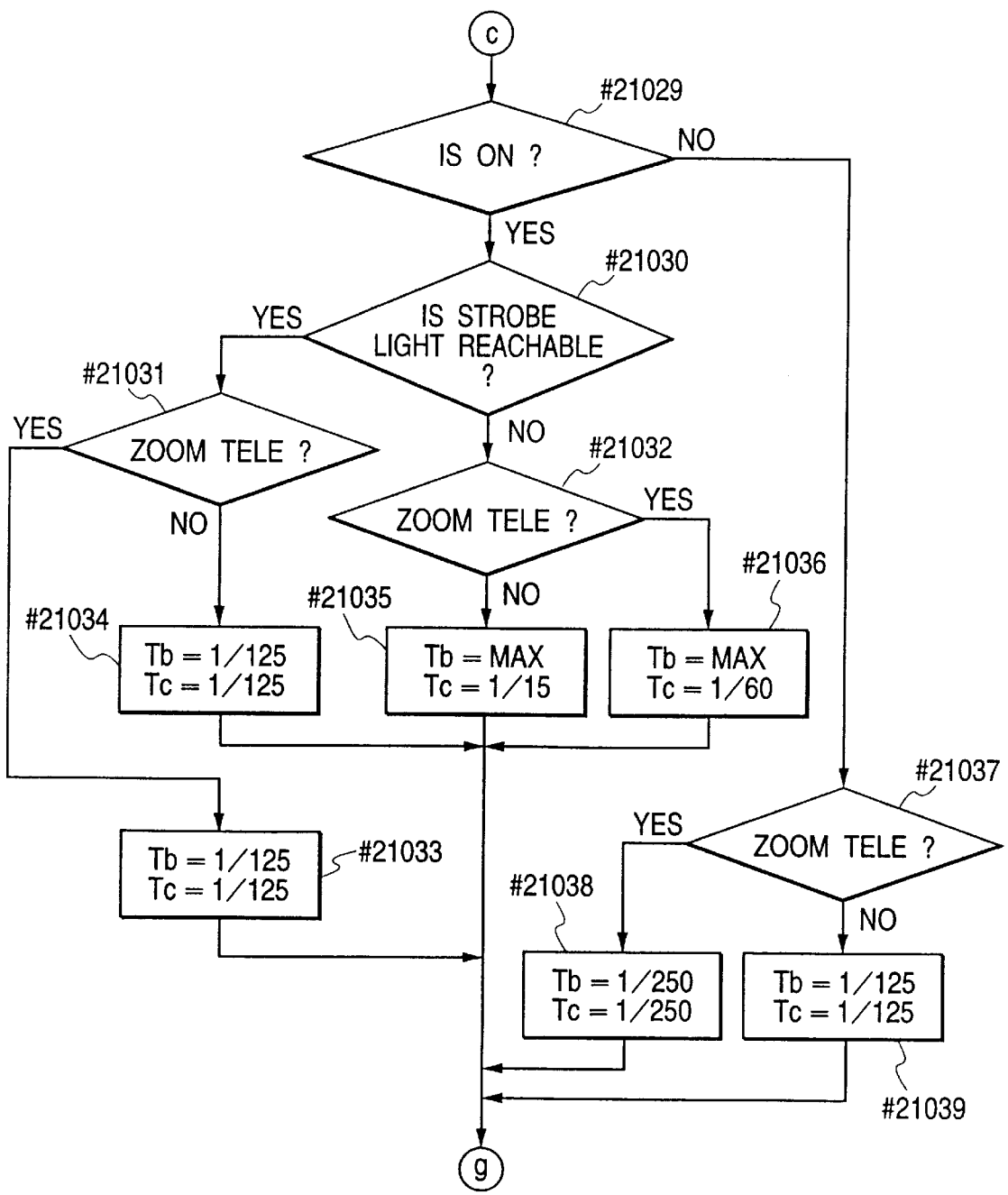
FIG. 20 is a flowchart showing operations which are executed subsequently to those shown in FIG. 17 when a macro mode is judged.

At a step #21029 shown in FIG. 20, it is judged whether or not the blur prevention device is in the operating condition and when the vibration correction is denoted for exposure, the flow advances to a step #21030 or otherwise advances to a step #21037.

At the step #21030, it is judged whether or not the strobe light reaches the object from the distance measuring data from the distance measuring circuit 213 as well as a film sensitivity and a photographing focal length at that time and when the strobe light reaches the object, the flow advances to a step #21031 or otherwise advances to a step #21032. It is judged that the strobe light reaches the object when the object will be under-exposed at two or three steps though it will not be exposed adequately to the strobe light.

At the step #21031, it is judged whether the photographing focal length is on the tele side or the wide side and when the photographing focal length is long, the flow advances to s step #21033 or when the photographing focal length is short, the flow advances to a step #21034.

At the step #21033, the strobe lighting start time Tb and the shutter closing time Tc are set at "Tb=1/125 second" and "Tc=1/125 second" respectively, thereafter the flow advances to the step #21073 shown in FIG. 24. At the step #21034, the strobe lighting start time Tb and the shutter closing time Tc are also set at "Tb=1/125 second" and "Tc=1/125 second" respectively, thereafter the flow advances to the step #21073 shown in FIG. 24.

The shutter closing time Tc is set at 1/125 second in both the zoom tele condition and the zoom wide condition because the shift vibration governs the camera vibration when the object is rather close to the camera as in the macro mode.

As already described above, the blur prevention device corrects the vibration by detecting rotational vibrations around the vertical and horizontal axes of the camera with the vibration sensor. However, the camera is subjected not only the rotational vibrations but also the shift vibrations which are in directions in parallel with the plane perpendicular to the optical axis such as those produced by pushing the release member 2113. Though it is sufficient to correct only the rotational vibrations in an ordinary photographing condition where the rotational vibrations govern the vibrations applied to the camera, influences due to the shift vibrations are more remarkable as the object is closer to the camera. In the macro mode, image blur due to the shift vibrations are not negligible in the macro mode. This blur cannot be corrected because this shift vibration cannot be detected by the vibration sensor using an angular velocity unit. Therefore a countermeasure of shortening the shutter speed is provided to prevent the shift vibration. Furthermore, vibrations of an object, for example, vibrations of a flower swung by wind are problematic since a magnification is rather high in the macro mode. The shutter closing time Tc is set short also as a measure to prevent such vibrations of an object.

When it is judged that the strobe light does not reach the object at the step #21030, the flow advances as described to the step #21032 where it is judged whether the photographing focal length is on the tele side or the wide side and when the photographing focal length is long, the flow advances to a step #21036 or otherwise advances to a step #21035.

At the step #21035, the strobe lighting start time Tb is set at MAX to inhibit the strobe from being lighted and the shutter closing time Tc is set at 1/15 second, thereafter the flow advances to the step #21073 shown in FIG. 24. The strobe is inhibited from being lighted since the strobe light does not reach the object and the strobe lighting is useless. The shutter closing time Tc is set at 1/15 second since the object is located at a long distance and the shift vibrations are not feared.

At the step #21036 also, the strobe lighting start time is set at MAX to inhibit the strobe from being lighted and the shutter closing time is set at 1/60 seconds, thereafter the flow advance to the step #21073 shown in FIG. 24.

When the correction of vibration is not denoted for exposure, the flow advances as described above from the step #21029 to the step #21037 where it is judged whether the photographing focal length is on the tele wide or the wide side and when the photographing focal length is long, the flow advances to a step #21038 or otherwise to a step #21039.

At the step #21038, the strobe lighting start time Tb and the shutter closing time Tc are set at "Tb=1/250 second" and "Tc=1/250 second" respectively, thereafter the flow advances to the step #21073 shown in FIG. 24. Since the blur prevention device is not used in the zoom tele condition, the shutter closing time Tc is set at 1/250 second as a measure to prevent the hand vibration and the strobe is lighted to compensate for under-exposure.

At the step #21039, the strobe lighting start time Tb and the shutter closing time Tc are set at "Tb=1/125 second" and "Tc=1/125 second" respectively, thereafter the flow advances to the step #21073 shown in FIG. 24. Since the blur prevention device is not used in the zoom wide condition and a magnification may be high in the macro mode, the shutter closing time Tc is set at 1/125 second as a measure to prevent the object vibration.

Referring to a flowchart shown in FIG. 21, description will be made below of operations in the night view mode in a case where the camera is set in a posture subjected to small vibrations (when it is judged that the camera is fixed to a tripod or the ground).

Figure 21:
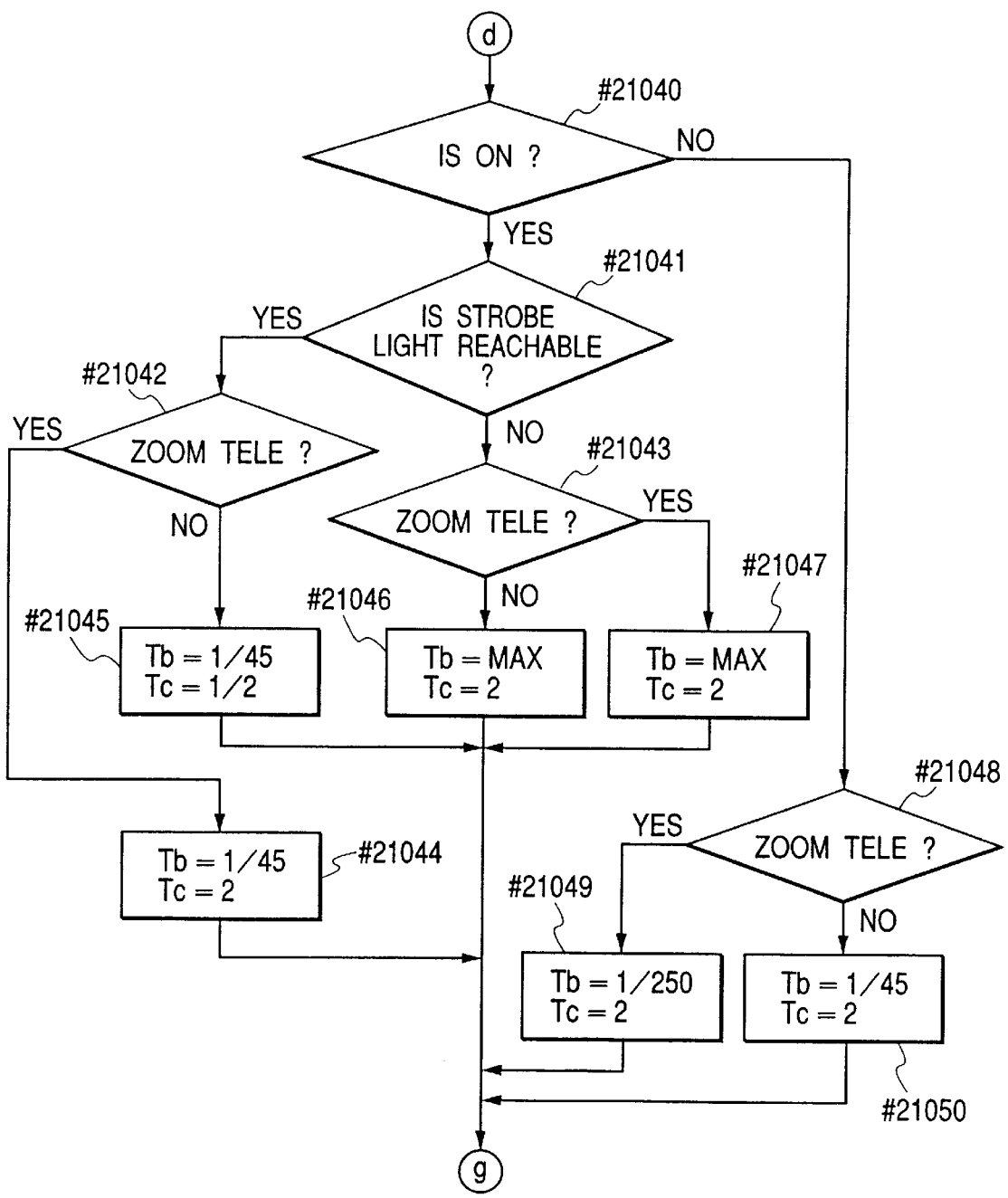
FIG. 21 is a flowchart showing operations which are executed subsequently to those shown in FIG. 17 when a night view mode (small vibration) is judged.

At a step #21040 shown in FIG. 21, it is judged whether or not the blur prevention device in the operating condition and when the correction of vibration for exposure is denoted, the flow advances to a step #21041 or otherwise advances to a step #21048.

At the step #21041, it is judged whether or not the strobe light reaches the object from the distance measuring data from the distance measuring circuit 213 as well as a film sensitivity and a photographing focal length at that time, and when the strobe light reaches the object, the flow advances to a step #21042 or otherwise advances to a step #21043. Unlike the photographing modes which have been described above, in the night view mode, it is judged that the strobe light reaches the object when the object will be under-exposed at three or four steps though it will not be adequately exposed to the strobe light. This is because under-exposure can be compensated for even slightly for an object so far as it is located at a distance which is nearly infinite (10 m, for example).

At the step #21042, it is judged whether the photographing focal length is on the tele side or the wide side and when the photographing focal length is long, the flow advances a step #21044 or otherwise advances to a step #21045.

At the step #21044, the strobe lighting start time Tb and the shutter closing time Tc are set at "Tb=1/45 second" and "Tc=2 seconds" respectively, thereafter the flow advances to the step #21073 shown in FIG. 24. At the step #21045, similarly the strobe lighting start time Tb and the shutter closing time Tc are set at "Tb=1/45 second" and "Tc=2 seconds" respectively, thereafter the flow advances to the step #21073 shown in FIG. 24.

The strobe lighting start time Tb is set at 1/45 in both the zoom tele condition and the zoom wide condition because no lighting of the strobe provides a photograph having a better atmosphere rather than lighting of the strobe even in the night view mode. Furthermore, since the camera is fixed to the tripod or the ground (to reduce vibrations), the hand vibration is not feared and the object is exposed adequately even with the long shutter closing time Tc. Accordingly, a photograph having brilliant colors by irradiating the object with the strobe light is obtained when the strobe light reaches to the object and select a long exposure time which is so-called slow synchro photographing is executed for obtaining adequately exposure for a background located outside the reach of the strobe light.

When it is judged that the strobe light does not reach the object at the step #21041, the flow advances to the step #21043 where it is judged whether the photographing focal length is on the tele side or the wide side and when the photographing focal length is long, the flow advances to a step #21047 or otherwise advances to a step #21046.

At the step #21046, the strobe lighting start time Tb is set at MAX to inhibit the strobe from being lighted and the shutter closing time Tc is set at 2 second, thereafter the flow advances to the step #21073 shown in FIG. 24. The strobe lighting is inhibited because a close-range view will be photographed, thereby making it impossible to favorably photograph a distant view if the strobe is lighted in this flow of operations set for photographing the distant view.

At the step #21047 also, the strobe lighting start time Tb is set at MAX to inhibit the strobe lighting and the shutter closing time Tc is set at 2 seconds, thereafter the flow advances to the step #21073 shown in FIG. 24.

At the steps #21046 and #21047, the shutter closing time Tc is set at 2 seconds because the camera is scarcely subjected to vibrations, free from image blur due to the vibrations even with the long exposure time and used to photograph a distant view with adequate exposure.

When the vibration correction for exposure is not denoted, the flow advances as described above to the step #21048 where it is judged whether the photographing focal length is on the tele side or the wide side and when the photographing focal length is long, the flow advances to a step #21049 or otherwise advances to a step #21050.

At the step #21049, the strobe lighting start time Tb and the shutter closing time Tc are set at "Tc=1/250 second" and "TC=2 seconds" respectively, thereafter the flow advances to the step #21073 shown in FIG. 24. Since the photography in the zoom tele condition is executed without using the blur prevention device in this case, the strobe lighting start time Tc is set at 1/250 second as a measure to prevent the hand vibration and the shutter closing time Tc is set at 2 seconds to adequately expose the background.

At the step #21050, the strobe lighting start time and the shutter closing time Tc are set at "Tb=1/45 second" and "Tc=2 seconds" respectively, thereafter the flow advances to the step #21073 shown in FIG. 24. Though the photography in the zoom wide condition without using the blur prevention device in this case, the strobe lighting start time is set at 1/45 second as a measure to prevent the hand vibration.

Referring to a flowchart shown in FIG. 22, description will be made of operations for photographing in the night view mode when the camera is set in a posture subjected to large hand vibration.

At a step #21051 shown in FIG. 22, it is judged whether or not the blur prevention device is in the operation condition and when the vibration correction for exposure is denoted, the flow advances to a step #21052 or otherwise advances to a step #21059.

At the step #21052, it is judged whether or not the strobe light reaches the object from the distance measuring data from the photometry circuit 213 as well as a film sensitivity and a photographing focal length at that time, and when the strobe light reaches the object, the flow advances to a step #21053 or otherwise advances to a step #21054. As in the night view mode where the hand vibration is small, it is judged that the strobe light reaches the object when the object will be under-exposed three or four steps though it will not be exposed adequately to the strobe light.

At the step #21053, it is judged whether the photographing focal length is on the tele side or the wide side and when the photographing focal length is long, the flow advances to a step #21055 or otherwise advances to step #21056.

At the step #21055, the strobe lighting start Tb and the shutter closing time Tc are set at "Tb=$1/45$ second" and "Tc=$1/8$ second" respectively, thereafter the flow advances to the step #21073 shown in FIG. 24. At the step #21056, the strobe lighting start time Tb is also set at "Tb=$1/45$ second" and the shutter closing time Tc is set at "Tc=$1/2$ second", thereafter the flow advances to the step #21073 shown in FIG. 24.

Though it is necessary to set the shutter closing time at $1/60$ second in the tele condition or $1/10$ second in the wide condition to prevent the hand vibration when the camera is held by hand, the shutter closing time Tc is set at $1/8$ second in the tele condition or $1/2$ second in the wide condition to photograph the background more clearly by prolonging the shutter closing time Tc since the object vibration can be prevented at certain degrees by the strobe lighting and the background which is dark is negligibly affected by slight hand vibration.

When it is judged that the strobe light does not reach the object at the step #21052, the flow advances to a step #21054 where it is judged whether the photographing focal length is on the tele side or the wide side and when the photographing focal length is long, the flow advances to a step #21058 or otherwise advances to a step #21057.

At the step #21057, the strobe lighting start time Tb is set at MAX to inhibit the strobe lighting and the shutter closing time Tc is set at $1/2$ second, thereafter the flow advances to the step #21073 shown in FIG. 24. The strobe lighting is inhibited since a short-range view is photographed when the strobe is lighted, thereby making it impossible to favorably photograph a distant view which is a target in this flow of operations.

At the step #21058 also, the strobe lighting start time Tb is set at MAX to inhibit the strobe lighting and the shutter closing time Tc is set at $1/8$ second, thereafter the flow advances to the step #21073 shown in FIG. 24.

When the vibration correction for exposure is not denoted, the flow advances as described above from the step #21051 to the step #21059 where it is judged whether the photographing focal length is on the tele side or the wide side and when the photographing focal length is long, the flow advances to a step #21060 or otherwise advances to a step #21061.

At the step #21060, the strobe lighting start time Tb and the shutter closing time Tc are set at "Tb=$1/250$ second" and "Tc=2 seconds" respectively, thereafter the flow advances to the step #21073 shown in FIG. 24. Since the photography in the zoom tele condition is executed without using the blur prevention device in this case, the strobe lighting start time Tb is set at "$1/250$ second" as a measure to prevent the hand vibration and the shutter closing time Tc is set at 2 seconds to expose the background adequately.

At the step #21061, the strobe lighting start time Tb and the shutter closing time Tc are set at "Tb=$1/45$ second" and "Tc=2 seconds" respectively, thereafter the flow advances to the step #21073 shown in FIG. 24. Though the photography in the zoom wide condition is executed without using the blur prevention device in this case, the strobe lighting start time Tb is set at $1/45$ second as a measure to prevent the hand vibration. The photographing conditions is the same as those in the night view mode where the hand vibration is small.

Now, description will be made of operations in the auto mode with reference to a flowchart shown in FIG. 23.

The auto mode is a standard mode for general snapshot and when the auto mode is selected, the flow advances as described above from the step #21005 shown in FIG. 17 to a step #21062 shown in FIG. 23. At the step #21062, it is judged whether or not the blur prevention device is in the operating condition and when the vibration correction for exposure is to be executed, the flow advances to a step #21063 or otherwise advances to a step #21070.

At the step #21063, it is judged whether or not the strobe light reaches the object from the distance measuring data from the photometry circuit 213 as well as a film sensitivity and a photographing focal length at that time and when the strobe light reaches the object, the flow advances to a step #21064 or otherwise advances to a step #21065.

At the step #21064, it is judged whether the photographing focal length is on the tele side or the wide side and when the photographing focal length is long, the flow advances to a step #21066 or otherwise advances to a step #21067.

At the step #21066, the strobe lighting start time Tb and the shutter closing time Tc are set at "Tb=$1/60$ second" and "Tc=$1/60$ second", thereafter the flow advances to the step #21073 shown in FIG. 24. At the step #21067 also, the strobe lighting start time and the shutter closing time Tc are set at "Tb=$1/15$ second" and "Tc=$1/15$ second", thereafter the flow advances to the step #21073 shown in FIG. 24.

Since the photography is executed with the blur prevention device in this flow of operations, the shutter closing time Tc is set at $1/60$ second in the tele condition or $1/15$ second in the wide condition and the strobe lighting start time Tb which is equal to the strobe lighting start time is set to compensate for under-exposure.

When it is judged that the strobe light does not reach the object at the step #21063, the flow advances as describe above to the step #21065 where it is judged whether the photographing focal length is on the tele side or the wide side and when the photographing focal length is long, the flow advances to a step #21069 or otherwise advances to a step #21068.

At the step #21068, the strobe lighting start time Tb and the shutter closing time Tc are set at "Tb=$1/15$ second" and "Tc=$1/15$ second", thereafter the flow advances to the step #21073 shown in FIG. 24. At the step #21069 also, the strobe lighting start time and the shutter closing time Tc are set at "Tb=$1/60$ second" and "Tc=$1/60$ second", thereafter the flow advances to the step #21073 shown in FIG. 24.

When the vibration correction for exposure is not denoted, the flow advances as described above from the step

21062 to the step #21070 where it is judged whether the photographing focal length is on the tele side or the wide side and when the photographing focal length is long, the flow advances to a step #21071 or otherwise advances to a step #21072.

At the step #21071, the strobe lighting start time Tb and the shutter closing time Tc are set at "Tb=1/250 second" and "Tc=1/250 second", thereafter the flow advances to the step #21073 shown in FIG. 24. Since the photography in the zoom tele condition is executed without using the blur prevention device in this case, the strobe lighting start time Tb is set at 1/250 second to prevent the hand vibration and the strobe is lighted to compensate for under-exposure when object brightness corresponds to a shutter closing time longer than 1/250 second.

At the step #21072, the strobe lighting start time Tb and the shutter closing time Tc are set at "Tb=1/45 second" and "Tc=1/45 second" respectively, thereafter the flow advances to the step #21073 shown in FIG. 24. Though the photography in the zoom wide condition is executed without using the blur prevention device, the strobe lighting start time Tb is set at 1/45 second to prevent the hand vibration so that the strobe is lighted to compensate for under-exposure when object luminance corresponds to a strobe lighting start time which is longer than 1/45 second.

After the photographing conditions have been set as described above in each photographing mode, the flow advances to the step #21073 shown in FIG. 24.

At the step #21073 in FIG. 24, the shutter speed Ta is calculated from the photometry data obtained with the photometry circuit 212 as well as brightness of the photometric lens and a film sensitivity at that time. At a next step #21074, the shutter speed Ta is compared with the strobe lighting start time Tb and when the shutter speed Ta is longer than the strobe lighting start time Tb, the flow advances to a step #21075 or otherwise advances to a step #21080.

At the step #21075, the shutter speed Ta is compared with the shutter closing time Tc and when the shutter speed Ta is longer than the shutter closing time Tc, the flow advances to a step #21076 or otherwise advances to a step #21079.

At the step #21076, an exposure time is fixed to be actually used for photographing at the shutter closing time Tc and the flow advances to a step #21077. At the step #21079, an exposure time is fixed to be actually used for photographing at the shutter speed Ta and the flow advances to the step #21077. That is, the exposure time is set to be actually used for photographing at the shutter speed Ta or the shutter closing time Tc whichever is the shorter.

At the step #21077, it is judged a strobe mode and this flow of operations is terminated when the strobe off mode is selected. That is, the use of the strobe is inhibited for photographing. When the strobe mode is not the strobe off mode, the flow advances to a step #21078 where the strobe is set so that it is lighted for photographing, thereby terminating this flow of operations.

Accordingly, the strobe is lighted for photographing when the strobe mode is not the strobe off mode and the shutter speed Ta is longer than the strobe lighting start time Tb.

When the shutter speed Ta is shorter than the strobe lighting start time Tb at the step #21074, the flow advances as described above to the step #21080 where an exposure time is fixed to be used actually for photographing at the shutter speed Ta and the flow advances to a step #21081. At the step #21081, it is judged whether not the strobe on mode is selected and when this mode is selected, the flow advances to a step #21082 or otherwise this flow of operations is terminated. At the step #21082, the strobe is set so that it is lighted for photographing, thereby terminating this flow of operations.

Accordingly, the strobe is not lighted when a mode other than the strobe on mode is selected and the shutter speed Ta is shorter than the strobe lighting start time Tb.

FIG. 25 summarizes the strobe lighting start times Tb and the shutter closing times Tc in the photographing conditions of the camera described above.

In the seventh embodiment described above, the photographing conditions are changed dependently on whether or not the blur prevention device is in the operating condition and using a combination of a plurality of photographing focal lengths.

Speaking concretely, an object is exposed with an exposure time fixed at the shutter closing time Tc when the object has luminance which provides an exposure time calculated on the basis of the object luminance or the like, longer than the shutter closing time Tc; the shutter closing time Tc is prolonged when the blur prevention device is used or when the photographing focal length is short; the strobe lighting is executed when the exposure time is longer than the strobe lighting start time Tb; and the strobe lighting start time Tb is prolonged when the blur prevention device is used or when the photographing focal length is long. Furthermore, the shutter closing time Tc is set longer than the strobe lighting start time Tb when the blur prevention device is used and the photographing focal length is short.

Furthermore, the photographing conditions is changed by using combinations of the reach of the strobe light and photographing focal lengths.

Speaking concretely, the strobe lighting is executed when the exposure time calculated from the object luminance, etc. is longer than the strobe lighting start time Tb, the strobe lighting start time Tb is set longer than that for a long photographing focal length when the object is outside the reach of the strobe light and the photographing focal length is short, and the strobe lighting start time Tb is prolonged when the blur prevention device is used. Furthermore, an exposure time is fixed at the shutter closing time Tc when the blur prevention device is used and the exposure time is longer than the shutter closing time Tc, and the shutter closing time Tc is prolonged when a main object is outside the reach of the strobe light.

Moreover, the photographing conditions may be changed by using combinations of the operating conditions of the blur prevention device, the photographing modes and the photographing focal lengths.

Accordingly, in the seventh embodiment, it is made possible to obtain a favorable photograph by delicately controlling the photographing conditions and prevent photographing from being failed due to too much reliance on the blur preventive device.

Eighth Embodiment

In the seventh embodiment described above, the strobe lighting start time Tb and the shutter closing time Tc are changed dependently on the photographing focal length, a distance from the camera to the main object (whether or not the strobe light reaches the main object), operating condition of the blur prevention device and photographing mode.

Though the control of the shutter closing time Tc described above is effective to prevent the hand vibration, a dark object (which makes the shutter closing time Tc operative) may not be exposed adequately.

Though an exposure inadequate at a certain degree can be corrected at a print stage in case of a photographing which uses a negative film, an inadequate exposure produces a remarkable influence on a photographing result in case of a photographing which uses a positive film.

In the eighth embodiment of the present invention, the shutter closing time Tc is changed dependently on a kind of a film (whether the film is positive or negative) so that the shutter closing time Tc is made inoperative as far as possible when the camera uses a positive film which makes even slightly inadequate exposure problematic.

Figure 26:
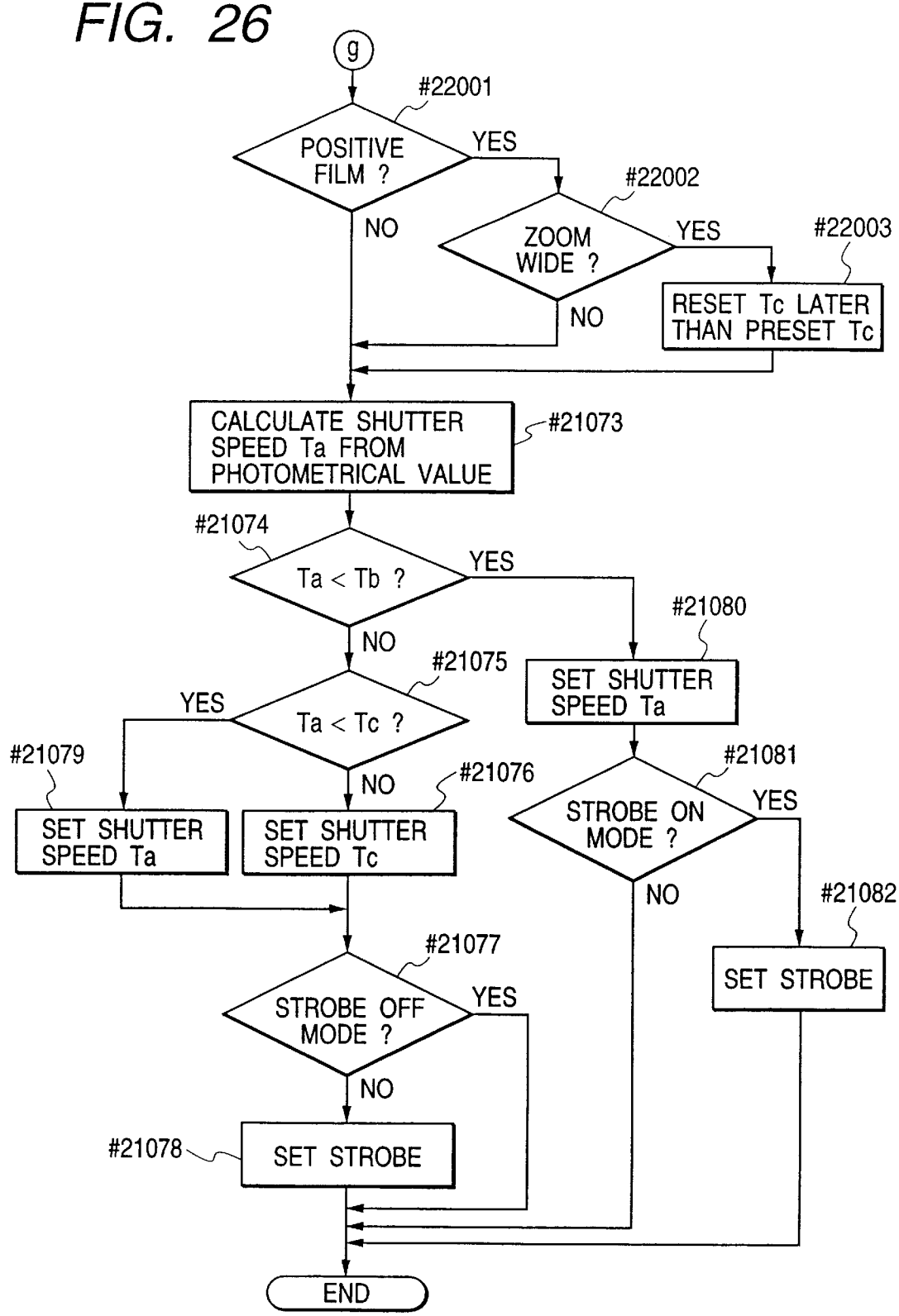
FIG. 26 is a flowchart showing operations of main members of a vari-focal camera preferred as an eighth embodiment of the present invention.

FIG. 26 is a flowchart showing operations of main members of a vari-focal camera preferred as the eighth embodiment of the present invention which are to be executed successively to the operations shown in FIGS. 18 through 23 described with reference to the seventh embodiment described above. That is, the operations shown in FIG. 26 are executed in place of those shown in FIG. 24. Operations at steps #21073 and later shown in FIG. 26 are similar to those shown in FIG. 24 and will not be described in particular.

At a step #22001, it is judged whether or not a charged film is positive or negative and when the film is positive, the flow advances to a step #22002 or otherwise to the step #21073. At the step #22002, it is judged whether or not a photographing length is the zoom wide and when the zoom wide is selected, the flow advances to a step #22003 or otherwise the camera microcomputer proceeds to the #21073. At the step #22003, the shutter closing time Tc determined in FIGS. 18 through 23 is set at a level one step longer and the flow advances to the step #21073.

For example, the shutter closing time Tc is set at 1/30 second when the shutter closing time is set at 1/60 second in the preceding flow or at 4 seconds when the shutter closing time Tc is set at 2 seconds in the preceding flow of operations.

By executing the operations described above, the shutter closing time Tc is set at the level one step longer in the zoom wide condition only for photographing with the positive film. Accordingly, the occasions where exposure is made inadequate is relatively reduced by the operation of the shutter closing time Tc, thereby making it possible to execute photographing favorably with the positive film.

Though the influence due to the hand vibration is more remarkable when the shutter closing time Tc is set at the level one step longer, it is preferable to give a higher priority to the under-exposure preventive measure since most of photographers who use positive films are mostly accustomed to handling of cameras, have certain degree of knowledge in the hand vibration by themselves and firmly hold the cameras to prevent the hand vibration.

In the zoom tele condition where the hand vibration poses a serious problem in image blur, however, the shutter closing time Tc is not changed at the longer level even when the positive film is used.

In the eighth embodiment described above, an exposure time is fixed at the shutter closing time Tc when the exposure time calculated dependently on object luminance, etc. is longer than the shutter closing time Tc, and the shutter closing time Tc is prolonged when the photographing focal length is short and the positive film is used, thereby making it possible to moderate the problem that inadequate exposure affects an image surface when the positive film is used.

Ninth Embodiment

In the eighth embodiment described above, the shutter closing time Tc is changed dependently on the photographing focal length and the kind of the film. Paying attention to a fact that the image blur due to vibration can be suppressed at a certain degree at rather slow shutter speeds when the photographers are skilled in photographing with the blur prevention device, the shutter closing time Tc may be changed dependently on the kind of film and a condition of the blur prevention device.

Since most of the photographers who use the positive films are accustomed to handling of the cameras as described above, the photographers themselves have the certain degree of knowledge in the hand vibration and can take photographs scarcely affected by vibration even rather slow shutter speeds using the blur prevention device.

When a positive film is charged in a camera which is equipped with the blur prevention device, it is therefore possible to reduce the image deterioration due to under-exposure by setting a longer shutter closing time Tc.

Figure 27:
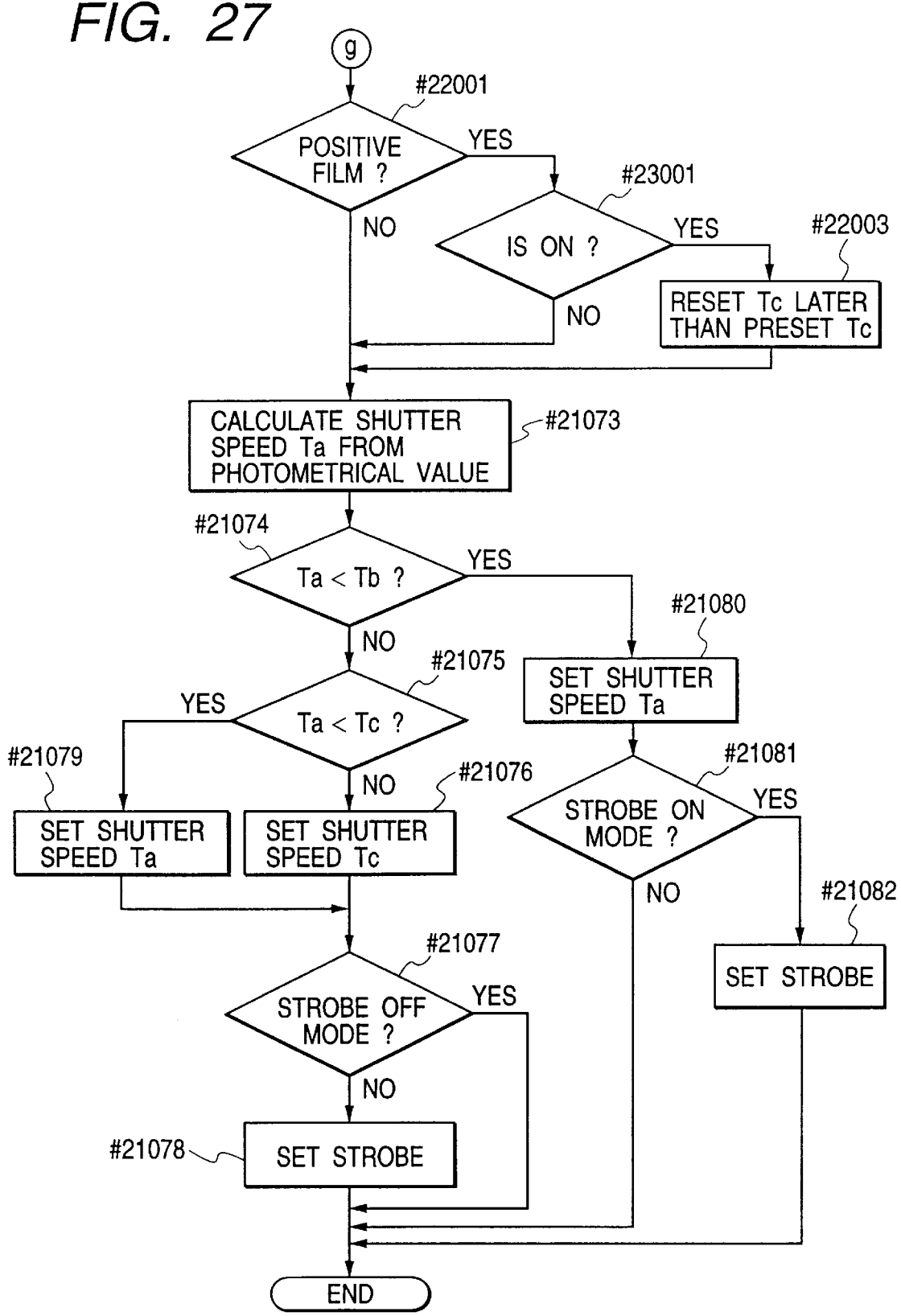
FIG. 27 is a flowchart showing operations of the main members f a vari-focal camera preferred as a ninth embodiment of the present invention.

FIG. 27 is a flowchart showing operations of main members of a vari-focal camera preferred as the ninth embodiment of the present invention which are to be executed successively to those shown in FIGS. 18 through 23 described with reference to the seventh embodiment. That is, the operations shown in FIG. 27 are executed in place of those shown in FIG. 24. Operations at steps #21073 in FIG. 27 are similar to those shown in FIG. 24 and will not be described in particular.

At a step #22001, it is judged whether or not a charged film is positive or negative and when the film is positive, the flow advances to a step #23001 or otherwise advances to the step #21073. At the step #23001, it is judged whether or not the blur prevention device is used and when the blur prevention device is used, the flow advances to a step #23003 or otherwise advances to the step #21073.

Accordingly, the operation of the shutter closing time Tc makes exposure inadequate relatively less frequently and favorable photographing is executed even with the positive film.

Though the longer shutter closing time Tc allows the influence due to the hand vibration to be more remarkable, an under-exposure preventive measure is made prior since most of photographers are accustomed to handling of cameras and can reduce image blur due to the hand vibration even at rather slow shutter speeds using the blur prevention device.

The case wherein the shutter closing time Tc is reset when the positive film is used is not limited by the shutter closing time Tc in the zoom wide condition described in the ninth embodiment, like in the eighth embodiment described above. For example, the Tc may reset not only when the blur prevention device is used but also only when an object is located at a distance beyond the reach of the strobe light (since a photograph is not under-exposed when the strobe light reaches the object) and the shutter closing time Tc may be reset by using combinations of the photographing focal lengths, the operating conditions of the blur prevention device and the kinds of the films.

In the ninth embodiment described above, an exposure time is fixed at the shutter closing time Tc when a exposure time calculated from object luminance is longer than the shutter closing time Tc and the shutter closing time Tc is prolonged when the blur prevention device is operated and the positive film is used, thereby making it possible to take a favorable photograph by solving the problem that the positive film makes under-exposure more remarkable.

As understood from the foregoing description, the seventh through ninth embodiments described above provide the vari-focal cameras which are capable of preventing photographing from being failed due to too much reliance on the blur prevention device and executing photographing with adequate exposure regardless of selected photographing modes or kinds of films.

As described above, the present invention of the seventh to the ninth embodiments provides such a vari-focal camera as to prevent any photographing failure caused by overestimating the blur prevention device and as to take a photograph in proper exposure.

Though each of the embodiments described above is configured on an assumption that the present invention is applied to a lens shutter camera, the blur prevention device is applicable also to various kinds of cameras such as a single-lens reflex camera and an electronic still camera.

Furthermore, though the blur prevention device is configured by having the mechanism which prevents blur by displacing the correction lens in a direction perpendicular to the optical axis as shown in FIG. 29, this mechanism is not limitative but the blur prevention device may be configured by preventing blur by utilizing a prism which has a variable vertex angle or by electrical processing.

Furthermore, the camera according to the present invention may have a configuration which is obtained by combining the embodiments described above or technological concepts disclosed by the embodiments.

Further while the present invention has been described with respect to what is presently considered to be the preferred embodiments, it is to be understood that the present invention is not limited to the disclosed embodiments. To the contrary, the invention is intended to cover various modification and equivalent arrangements included within the spirit and scope of the appended claims. The scope of the following claims is to be accorded the broadest interpretation so as to encompass all such modifications and equivalent structures and functions.

Furthermore, the individual components shown in schematic or block form in the drawings are all well-known in the camera arts and their specific construction and operation are not critical to the operation or best mode for carrying out the invention.

Moreover, the camera according to the present invention may be configured by combining the embodiments described above or technical components described therein as occasion demands.

Moreover, a partial or entire configuration of an embodiment of the present invention may be configured as an independent camera, combined with a camera or used as a component of a camera.

In addition, the present invention is applicable not only various kinds of cameras such as a single-lens reflex camera, a lens shutter camera and video camera but also optical instruments other than the cameras and other appliances, devices to be applied to the cameras, the optical instruments and other appliances, and components composing these appliances.

The attach claim sheet including parenthesis is for your reference but is not included in the actual application.

What is claimed is:

1. A camera operable with or without an image blur correction device, comprising:
   exposure time setting means for setting an exposure time in accordance with at least photometry data, sensitivity data of an image recording medium and F number of a photographic lens;
   strobe lighting designating means for forcibly illuminating a strobe when the exposure time set by said exposure time setting means is longer than a first exposure time;
   shutter closing time setting means for forcibly terminating an exposure for photographing at a second exposure time regardless of a result of said exposure time setting means when the exposure time set by said exposure time setting means is longer than the second exposure time; and
   means for selectively setting the first exposure time and the second exposure time, wherein when the camera is operated without the image blur correction device, the first exposure time and the second exposure time are set substantially equal to each other, and when the camera is operated with the image blur correction device, the first exposure time is set different from the second exposure time.

2. The camera according to claim 1, wherein said selective setting means changes a combination of the first exposure time and the second exposure time based on an object distance.

3. The camera according to claim 1, wherein said selective setting means changes a combination of the first exposure time and the second exposure time based on a selected photographing mode other than selection of whether or not said image blur correction device is to be operated for photographing.

4. The camera according to claim 3, wherein, in a first photographing mode, said selective setting means sets a second exposure time for photographing without the image blur correction device which is longer than that for photographing with the image blur correction device, and in a second photographing mode, said selective setting means sets a second exposure time for photographing without said image blur correction device which is shorter than that for photographing with the image blur correction device.

5. The camera according to claim 4,
   the second exposure time is set longer in the second photographing mode than in the first photographing mode.

6. The camera according to claim 5,
   wherein the second photographing mode is a mode for photographing a night view.

7. The camera according to claim 1, wherein said selective setting means changes a combination of the first exposure time and the second exposure time based on a focal length.

8. The camera according to claim 1, wherein said shutter closing time setting means forcibly terminates exposure at a time close to the second exposure time.

9. The camera according to claim 1,
   wherein the image blur correction device optically corrects image blur.

10. The camera according to claim 9, wherein said image blur correction device corrects image blur by deflecting a light bundle.

11. The camera according to claim 1, wherein said selective setting means sets the second exposure time longer than the first exposure time in the case of photographing with operation of the image blur correction device.

* * * * *

UNITED STATES PATENT AND TRADEMARK OFFICE
CERTIFICATE OF CORRECTION

PATENT NO. : 6,272,289 B1
DATED : August 7, 2001
INVENTOR(S) : Koichi Washisu

It is certified that error appears in the above-identified patent and that said Letters Patent is hereby corrected as shown below:

Column 2,
Line 5, "above described" should read -- above-described --.

Column 3,
Line 20, "depresses" should read -- depress --.

Column 4,
Line 48, "itself. Resetting" should read -- itself, providing resetting --.

Column 6,
Line 31, "of" (first occurrence) should read -- to --.

Column 7,
Line 17, "dently" should read -- ding --.

Column 8,
Line 40, "f a" should read -- of a --.

Column 9,
Line 35, "exposuring." should read -- exposure. --.

Column 10,
Line 13, "enable" should read -- enabled --.

Column 13,
Line 21, "being prolong" should read -- is prolonged --.

Column 14,
Line 19, "noticeably" should read -- noticeable --;
Lines 39, 41 and 45, "dependently" should read -- depending --;
Line 44, "the" should be deleted.

Column 17,
Line 6, "onject" should read -- object --.

UNITED STATES PATENT AND TRADEMARK OFFICE
CERTIFICATE OF CORRECTION

PATENT NO. : 6,272,289 B1
DATED : August 7, 2001
INVENTOR(S) : Koichi Washisu

It is certified that error appears in the above-identified patent and that said Letters Patent is hereby corrected as shown below:

Column 18,
Line 31, "dependently" should read -- depending --; and
Line 59, "bassis" should read -- basis --.

Column 19,
Line 9, "f eared," should read -- feared, --.

Column 20,
Line 64, "at" should read -- as --.

Column 21,
Line 9, "t he" should read -- the --; and
Line 32, "prevents" should be deleted.

Column 22,
Line 22, "modes" should read -- mode --.

Column 23,
Line 23, "that" should read -- than --;
Line 37, "dependently" should read -- depending --; and
Line 64, "it" should read -- it is --.

Column 24,
Line 57, "camera" should read -- cameras --.

Column 25,
Line 23, "dependently" should read -- dependent --; and
Line 26, "active or inactive" should read -- activate of inactivate --.

Column 26,
Line 8, "dependently" should read -- depending --.

Column 27,
Line 2, "of" should be deleted; and
Line 39, "length s" should read -- lengths --.

UNITED STATES PATENT AND TRADEMARK OFFICE
CERTIFICATE OF CORRECTION

PATENT NO. : 6,272,289 B1
DATED : August 7, 2001
INVENTOR(S) : Koichi Washisu

It is certified that error appears in the above-identified patent and that said Letters Patent is hereby corrected as shown below:

Column 30,
Line 7, "measured" should read -- measure --;
Line 36, "FIG. 24.." should read -- FIG. 24. --; and
Line 45, "subjected" should read -- subjected to --.

Column 32,
Line 18, "to" should be deleted, and "select" should read -- selects --.

Column 34,
Line 52, "describe" should read -- described --.

Column 36,
Line 11, "dependently" should read -- depending --.

Column 37,
Lines 58 and 66, "dependently" should read -- depending --.

Column 38,
Line 6, "dependently" should read -- depending --.

Column 39,
Line 27, "Further" should read -- Further, --;
Line 51, "only" should read -- only to --; and
Line 53, "also" should read -- also to --.

Column 40,
Line 41, "the" (first occurrence) should read -- wherein the --.

Signed and Sealed this

Thirtieth Day of April, 2002

*Attest:*

*Attesting Officer*

JAMES E. ROGAN
*Director of the United States Patent and Trademark Office*